United States Patent
Sethi et al.

(10) Patent No.: US 10,815,409 B2
(45) Date of Patent: *Oct. 27, 2020

(54) HEAT TRANSFER COMPOSITIONS, METHODS AND SYSTEMS

(71) Applicant: HONEYWELL INTERNATIONAL INC., Morris Plains, NJ (US)

(72) Inventors: Ankit Sethi, Buffalo, NY (US); Samuel F. Yana Motta, East Amherst, NY (US); Ryan Hulse, Getzville, NY (US); Robert Gerard Richard, Hamburg, NY (US); Gregory Laurence Smith, Niagara Falls (CA); Henna Tangri, Williamsville, NY (US); Elizabet del Carmen Vera Becerra, Amherst, NY (US); Yang Zou, Williamsville, NY (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,733

(22) Filed: Oct. 6, 2018

(65) Prior Publication Data

US 2019/0177589 A1 Jun. 13, 2019

Related U.S. Application Data

(60) Provisional application No. 62/569,419, filed on Oct. 6, 2017.

(51) Int. Cl.
*C09K 5/04* (2006.01)

(52) U.S. Cl.
CPC ........ *C09K 5/045* (2013.01); *C09K 2205/122* (2013.01); *C09K 2205/22* (2013.01); *C09K 2205/40* (2013.01)

(58) Field of Classification Search
CPC .............. C09K 5/045; C09K 2205/122; C09K 2205/22; C09K 2205/40; C09K 5/044

USPC ..................................................... 252/67, 68
See application file for complete search history.

(56) References Cited

U.S. PATENT DOCUMENTS

| | | | | |
|---|---|---|---|---|
| 10,246,621 B2 * | 4/2019 | Sethi | C09K 5/045 |
| 2006/0025322 A1 * | 2/2006 | Wilson | C08J 9/143 |
| | | | | 510/408 |
| 2006/0033071 A1 * | 2/2006 | Wilson | C09K 3/30 |
| | | | | 252/67 |
| 2009/0127497 A1 * | 5/2009 | Spatz | C09K 5/045 |
| | | | | 252/68 |
| 2010/0038583 A1 * | 2/2010 | Shimomura | C09K 5/044 |
| | | | | 252/68 |
| 2010/0257881 A1 * | 10/2010 | Perti | A61L 2/206 |
| | | | | 62/115 |
| 2011/0219815 A1 * | 9/2011 | Yana Motta | C09K 5/045 |
| | | | | 62/498 |
| 2016/0024361 A1 * | 1/2016 | Yana Motta | C09K 3/30 |
| | | | | 252/67 |
| 2019/0153283 A1 * | 5/2019 | Yana Motta | C09K 5/045 |
| 2019/0161663 A1 * | 5/2019 | Sethi | C09K 5/045 |
| 2019/0233698 A1 * | 8/2019 | Yana Motta | C09K 5/044 |
| 2020/0131417 A1 * | 4/2020 | Smith | C09K 5/045 |
| 2020/0131418 A1 * | 4/2020 | Smith | F25B 45/00 |

FOREIGN PATENT DOCUMENTS

WO  WO-2018022949 A2 *  2/2018  ............... C09K 5/04

* cited by examiner

*Primary Examiner* — Douglas J McGinty
(74) *Attorney, Agent, or Firm* — Colleen D. Szuch

(57) ABSTRACT

The present invention relates to a refrigerant composition, including difluoromethane (HFC-32), pentafluoroethane (HFC-125), and trifluoroiodomethane ($CF_3I$) for use in a heat exchange system, including air conditioning and refrigeration applications and in particular aspects to the use of such compositions as a replacement of the refrigerant R-410A for heating and cooling applications and to retrofitting heat exchange systems, including systems designed for use with R-410A.

16 Claims, No Drawings

HEAT TRANSFER COMPOSITIONS, METHODS AND SYSTEMS

CROSS REFERENCE TO RELATED APPLICATIONS

The present application claims the priority benefit of U.S. Provisional 62/569,419, filed Oct. 6, 2017, which is incorporated herein by reference.

FIELD OF THE INVENTION

The present invention relates to compositions, methods and systems having utility in heat exchange applications, including in air conditioning and refrigeration applications. In particular aspects the invention relates to compositions useful in heat transfer systems of the type in which the refrigerant R-410A would have been used. The compositions of the invention are useful in particular as a replacement of the refrigerant R-410A for heating and cooling applications and to retrofitting heat exchange systems, including systems designed for use with R-410A.

BACKGROUND

Mechanical refrigeration systems, and related heat transfer devices, such as heat pumps and air conditioners are well known in the art for industrial, commercial and domestic uses. Chlorofluorocarbons (CFCs) were developed in the 1930s as refrigerants for such systems. However, since the 1980s, the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and scheduled the phase-out of HCFCs, including HCFC-22.

In response to the need for a non-flammable, non-toxic alternative to the CFCs and HCFCs, industry has developed a number of hydrofluorocarbons (HFCs) which have zero ozone depletion potential. R-410A (a 50:50 w/w blend of difluoromethane (HFC-32) and pentafluoroethane (HFC-125)) was adopted as the industry replacement for HCFC-22 in air conditioning and chiller applications as it does not contribute to ozone depletion. However, R-410A is not a drop-in replacement for R-22. Thus, the replacement of R-22 with R-410A required the redesign of major components within heat exchange systems, including the replacement and redesign of the compressor to accommodate the substantially higher operating pressure and volumetric capacity of R-410A, when compared with R-22.

While R-410A has a more acceptable Ozone Depleting Potential (ODP) than R-22, the continued use of R-410A is problematic since it has a high Global Warming Potential of 2088. There is therefore a need in the art for the replacement of R-410A with a more environmentally acceptable alternative.

It is understood in the art that it is highly desirable for a replacement heat transfer fluid to possess a difficult to achieve mosaic of properties including excellent heat transfer properties (and in particular heat transfer properties that are well matched to the needs of the particular application), chemical stability, low or no toxicity, non-flammability, lubricant miscibility and/or lubricant compatibility amongst others. In addition, any replacement for R-410A would ideally be a good match for the operating conditions of R-410A in order to avoid modification or redesign of the system. The development of a heat transfer fluid meeting all of these requirements, many of which are unpredictable, is a significant challenge.

With regard to efficiency in use, it is important to note that a loss of refrigerant thermodynamic performance or energy efficiency may result in an increase in fossil fuel usage as a result of the increased demand for electrical energy. The use of such a refrigerant will therefore have a negative secondary environmental impact.

Flammability is considered to be an important property for many heat transfer applications. As used herein, the term "non-flammable" refers to compounds or compositions which are determined to be non-flammable in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference and referred to herein for convenience as "Non-Flammability Test".

It is critical for maintenance of system efficiency and proper and reliable functioning of the compressor, that lubricant circulating in a vapour compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system.

R-410A is currently commonly used with polyol ester (POE) lubricating oil in air conditioning applications, as R-410A is miscible with POE at temperatures experienced during use of such systems. However, R-410A is immiscible with POE at temperatures typically experienced during operation of low temperature refrigeration systems, and heat pump systems. Therefore, unless steps are taken to mitigate against this immiscibility, POE and R-410A cannot be used in low temperature refrigeration or heat pump systems.

Applicants have come to appreciate that it is desirable to be able to provide compositions which are capable of being used as a replacement for R-410A in air conditioning applications, and in particular in residential air conditioning and commercial air conditioning applications, which include, rooftop air conditioning, variable refrigerant flow (VRF) air conditioning and chiller air conditioning applications. Applicants have also come to appreciate that the compositions, methods and systems of the invention have advantage in, for example, heat pump and low temperature refrigeration systems, wherein the drawback of immiscibility with POE at temperatures experienced during operation of these systems is eliminated.

SUMMARY

The present invention provides refrigerant compositions which can be used as a replacements for R-410A and which exhibit in preferred embodiments the desired mosaic of properties of excellent heat transfer properties, chemical stability, low or no toxicity, non-flammability, lubricant miscibility and lubricant compatibility in combination with low Global Warming Potential (GWP) and near zero ODP.

The present invention includes refrigerant comprising at least about 97% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I). The refrigerant according to this paragraph is sometimes referred to herein for convenience as Refrigerant 1. As used herein with respect to percentages based on a list of identified compounds, the term "relative percentage" means the percentage of the identified compound based on the total weight of the listed compounds.

As used herein with respect to weight percentages, the term "about" with respect to an amount of an identified component means the amount of the identified component can vary by an amount of +/−2% by weight. The refrigerants and heat transfer compositions of the invention include amounts of an identified compound specified as being "about" wherein the amount is the identified amount+/−1% by weight, and even more preferably +/−0.5% by weight.

The present invention includes refrigerant comprising at least about 98.5% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I). The refrigerant according to this paragraph is sometimes referred to herein for convenience as Refrigerant 2.

The present invention includes refrigerant comprising at least about 99.5% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I). The refrigerant according to this paragraph is sometimes referred to herein for convenience as Refrigerant 3.

The present invention includes refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I). The refrigerant according to this paragraph is sometimes referred to herein for convenience as Refrigerant 4.

The present invention includes refrigerant consisting of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I). The refrigerant according to this paragraph is sometimes referred to herein for convenience as Refrigerant 5.

The present invention includes refrigerant consisting essentially of the following three compounds, with each compound being present in the following relative percentages:
about 49% by weight difluoromethane (HFC-32),
from 11.6% to 11.9% by weight pentafluoroethane (HFC-125), and 39% to 40% by weight trifluoroiodomethane (CF3I). The refrigerant according to this paragraph is sometimes referred to herein for convenience as Refrigerant 6.

The present invention includes refrigerant consisting of the following three compounds, with each compound being present in the following relative percentages:
about 49% by weight difluoromethane (HFC-32),
from 11.6% to 11.9% by weight pentafluoroethane (HFC-125), and 39% to 40% by weight trifluoroiodomethane (CF3I). The refrigerant according to this paragraph is sometimes referred to herein for convenience as Refrigerant 7.

The present invention includes refrigerants consisting essentially of the following three compounds, with each compound being present in the following relative percentages:
about 49% by weight difluoromethane (HFC-32),
about 11.5% by weight pentafluoroethane (HFC-125), and
from 39 to 39.4% by weight trifluoroiodomethane (CF$_3$I) and wherein the refrigerant does not comprise less than about 39.0 relative percent by weight of CF3I based on the total weight of said three compounds. The refrigerant according to this paragraph is sometimes referred to herein for convenience as Refrigerant 8.

The present invention includes refrigerants consisting of the following three compounds, with each compound being present in the following relative percentages:
about 49% by weight difluoromethane (HFC-32),
about 11.5% by weight pentafluoroethane (HFC-125), and
from 39 to 39.4% by weight trifluoroiodomethane (CF$_3$I), and wherein the refrigerant does not comprise less than about 39.0 relative percent by weight of CF3I based on the total weight of said three compounds. The refrigerant according to this paragraph is sometimes referred to herein for convenience as Refrigerant 9.

The present invention includes refrigerants consisting essentially of the following three compounds, with each compound being present in the following relative percentages:
about 49% by weight difluoromethane (HFC-32),
about 11.5% by weight pentafluoroethane (HFC-125), and
39.1% to 40% by weight trifluoroiodomethane (CF3I)
and wherein the refrigerant does not comprise 39.5% relative percent by weight of CF3I based on the total weight of said three compounds. The refrigerant according to this paragraph is sometimes referred to herein for convenience as Refrigerant 10.

The present invention includes refrigerants consisting of the following three compounds, with each compound being present in the following relative percentages:
about 49% by weight difluoromethane (HFC-32),
about 11.5% by weight pentafluoroethane (HFC-125), and
39.1% to 40% by weight trifluoroiodomethane (CF3I)
and wherein the refrigerant does not comprise 39.5% relative percent by weight of CF3I based on the total weight of said three compounds. The refrigerant according to this paragraph is sometimes referred to herein for convenience as Refrigerant 11.

The present invention includes refrigerants consisting essentially of the following three compounds, with each compound being present in the following relative percentages:
about 49% by weight difluoromethane (HFC-32),
from 11.1% to 12% by weight pentafluoroethane (HFC-125), and
39% to 40% by weight trifluoroiodomethane (CF$_3$I). The refrigerant according to this paragraph is sometimes referred to herein for convenience as Refrigerant 12.

The present invention includes refrigerants consisting of the following three compounds, with each compound being present in the following relative percentages:

about 49% by weight difluoromethane (HFC-32),
from 11.1% to 12% by weight pentafluoroethane (HFC-125), and
39% to 40% by weight trifluoroiodomethane (CF$_3$I). The refrigerant according to this paragraph is sometimes referred to herein for convenience as Refrigerant 13.

The present invention includes refrigerants consisting essentially of the following three compounds, with each compound being present in the following relative percentages:
about 49% by weight difluoromethane (HFC-32),
from 11.1 to 12% by weight pentafluoroethane (HFC-125), and
from 39% to 40% by weight trifluoroiodomethane (CF3I) and wherein the refrigerant does not comprise 11.5% relative percent by weight of HFC-125 based on the total weight of said three compounds. The refrigerant according to this paragraph is sometimes referred to herein for convenience as Refrigerant 14.

The present invention includes refrigerants consisting of the following three compounds, with each compound being present in the following relative percentages:
about 49% by weight difluoromethane (HFC-32),
from 11.1 to 12% by weight pentafluoroethane (HFC-125), and
from 39% to 40% by weight trifluoroiodomethane (CF3I) and wherein the refrigerant does not comprise 11.5% relative percent by weight of HFC-125 based on the total weight of said three compounds. The refrigerant according to this paragraph is sometimes referred to herein for convenience as Refrigerant 15.

The present invention includes refrigerants consisting essentially of the following three compounds, with each compound being present in the following relative percentages:
about 49% by weight difluoromethane (HFC-32),
from 11.1 to 12% by weight pentafluoroethane (HFC-125), and
from 39.1% to 40% by weight trifluoroiodomethane (CF3I) and wherein the refrigerant does not comprise 11.5% relative percent by weight of HFC-125 and does not comprise 39.5% of CF3I based on the total weight of said three compounds. The refrigerant according to this paragraph is sometimes referred to herein for convenience as Refrigerant 16.

The present invention includes refrigerants consisting of the following three compounds, with each compound being present in the following relative percentages:
about 49% by weight difluoromethane (HFC-32),
from 11.1 to 12% by weight pentafluoroethane (HFC-125), and
from 39.1% to 40% by weight trifluoroiodomethane (CF3I) and wherein the refrigerant does not comprise 11.5% relative percent by weight of HFC-125 and does not comprise 39.5% of CF3I based on the total weight of said three compounds. The refrigerant according to this paragraph is sometimes referred to herein for convenience as Refrigerant 17.

The present invention includes refrigerants consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane (CF$_3$I). The refrigerant according to this paragraph is sometimes referred to herein for convenience as Refrigerant 18.

The present invention includes refrigerants consisting of the following three compounds, with each compound being present in the following relative percentages:
49%+/−0.3% by weight by weight difluoromethane (HFC-32),
11.5%+/−0.3% by weight pentafluoroethane (HFC-125), and
39.5%+/−0.3% by weight trifluoroiodomethane (CF3I). The refrigerant according to this paragraph is sometimes referred to herein for convenience as Refrigerant 19.

The present invention includes refrigerants comprising at least about 97% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I),
wherein the refrigerant satisfies the Non-Flammability Test. The refrigerant according to this paragraph is sometimes referred to herein for convenience as Refrigerant 20.

The present invention includes refrigerants comprising at least about 98.5% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I),
wherein the refrigerant satisfies the Non-Flammability Test. The refrigerant according to this paragraph is sometimes referred to herein for convenience as Refrigerant 21.

The present invention includes refrigerants comprising at least about 99.5% by weight of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I),
wherein the refrigerant satisfies the Non-Flammability Test. The refrigerant according to this paragraph is sometimes referred to herein for convenience as Refrigerant 22.

The present invention includes refrigerants consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I),
wherein the refrigerant satisfies the Non-Flammability Test. The refrigerant according to this paragraph is sometimes referred to herein for convenience as Refrigerant 23.

The present invention includes refrigerants consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I),
wherein the refrigerant satisfies the Non-Flammability Test. The refrigerant according to this paragraph is sometimes referred to herein for convenience as Refrigerant 24.

The present invention includes refrigerants consisting essentially of:
49% by weight difluoromethane (HFC-32),
11.5% by weight pentafluoroethane (HFC-125), and 39.5% by weight trifluoroiodomethane (CF$_3$I), with the percentages being based on the total weight of these three compounds. The refrigerant according to this paragraph is sometimes referred to herein for convenience as Refrigerant 25.

The present invention relates to a refrigerant consisting of:
49% by weight difluoromethane (HFC-32),
11.5% by weight pentafluoroethane (HFC-125), and
39.5% by weight trifluoroiodomethane (CF$_3$I), with the percentages being based on the total weight of these three compounds. The refrigerant according to this paragraph is sometimes referred to herein for convenience as Refrigerant 26.

DESCRIPTION

Definitions

For the purposes of this invention, the term "about" in relation to temperatures in degrees centigrade (° C.) means that the stated temperature can vary by an amount of +/−5° C. In preferred embodiments, temperature specified as being about is preferably +/−2° C., more preferably +/−1° C., and even more preferably +/−0.5° C. of the identified temperature.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See www.epa.gov.

The term "mass flow rate" is the mass of refrigerant passing through a conduit per unit of time.

The term "Occupational Exposure Limit (OEL)" is determined in accordance with ASHRAE Standard 34-2016 Designation and Safety Classification of Refrigerants.

As the term is used herein, "replacement for" with respect to a particular heat transfer composition or refrigerant of the present invention as a "replacement for" a particular prior refrigerant means the use of the indicated composition of the present invention in a heat transfer system that heretofore had been commonly used with that prior refrigerant. By way of example, when a refrigerant or heat transfer composition of the present invention is used in a heat transfer system that has heretofore been designed for and/or commonly used with R410A, such as residential air conditioning and commercial air conditioning (including roof top systems, variable refrigerant flow (VRF) systems and chiller systems) then the present refrigerant is a replacement for R410A is such systems. The phrase "thermodynamic glide" applies to zeotropic refrigerant mixtures that have varying temperatures during phase change processes in the evaporator or condenser at constant pressure.

Refrigerants and Heat Transfer Compositions

Applicants have found that the refrigerants of the present invention, including each of Refrigerants 1-39 as described herein, are capable of providing exceptionally advantageous properties and in particular non-flammability, especially with the use of the refrigerant of the present invention as a replacement for R-410A and especially in prior 410A residential air conditioning systems, and prior R-410A commercial air conditioning systems (including prior R-410A roof top systems, prior R-410A variable refrigerant flow (VRF) systems and prior R-410A chiller systems).

A particular advantage of the refrigerants of the present invention is that they are non-flammable when tested in accordance with the Non-Flammability Test, and as mentioned above there has been a desire in the art to provide refrigerant which can be used as a replacement for R-410A in various systems, and which has excellent heat transfer properties, low environmental impact (including particularly low GWP and near zero ODP) chemical stability, low or no toxicity, and/or lubricant compatibility and which maintains non-flammability in use. This desirable advantage can be achieved by refrigerants of the present invention.

The present invention includes refrigerants consisting essentially of the following three compounds, with each compound being present in the following relative percentages:
about 49% by weight difluoromethane (HFC-32),
from 11.6% to 11.9% by weight pentafluoroethane (HFC-125), and
39% to 40% by weight trifluoroiodomethane (CF$_3$I), and wherein the refrigerant does not comprise 11.5% by weight of HFC-125 and does not comprise 12% relative percent by weight or greater of HFC-125 based on the total weight of said three compounds. The refrigerant according to this paragraph is sometimes referred to herein for convenience as Refrigerant 27.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 11.5% by weight of HFC-125 and does not comprise 12% relative percent by weight or greater of HFC-125 based on the total weight of said three compounds. The refrigerant according to this paragraph is sometimes referred to herein for convenience as Refrigerant 28.

The present invention includes refrigerant consisting essentially of the following three compounds, with each compound being present in the following relative percentages:
from 47% to 49.5% by weight difluoromethane (HFC-32),
from 11% to 13.5% by weight pentafluoroethane (HFC-125), and
from 39% to 41.5% by weight trifluoroiodomethane (CF$_3$I).
The refrigerant according to this paragraph is sometimes referred to herein for convenience as Refrigerant 29.

The present invention includes refrigerant consisting of the following three compounds, with each compound being present in the following relative percentages:
from 47% to 49.5% by weight difluoromethane (HFC-32),
from 11% to 13.5% by weight pentafluoroethane (HFC-125), and
from 39% to 41.5% by weight trifluoroiodomethane (CF$_3$I).
The refrigerant according to this paragraph is sometimes referred to herein for convenience as Refrigerant 30.

The present invention includes refrigerant consisting essentially of the following three compounds, with each compound being present in the following relative percentages:
from 47% to 49.5% by weight difluoromethane (HFC-32),
from 11% to 13.5% by weight pentafluoroethane (HFC-125), and
from 39% to 41.5% by weight trifluoroiodomethane (CF$_3$I),
and wherein the refrigerant does not comprise 11.5% by weight of HFC-125 and does not comprise 12% relative percent by weight or greater of HFC-125 based on the total weight of said three compounds. The refrigerant according to this paragraph is sometimes referred to herein for convenience as Refrigerant 31.

The present invention includes refrigerant consisting of the following three compounds, with each compound being present in the following relative percentages:
from 47% to 49.5% by weight difluoromethane (HFC-32),
from 11% to 13.5% by weight pentafluoroethane (HFC-125), and
from 39% to 41.5% by weight trifluoroiodomethane (CF$_3$I),
and wherein the refrigerant does not comprise 11.5% by weight of HFC-125 and does not comprise 12% relative percent by weight or greater of HFC-125 based on the total weight of said three compounds. The refrigerant according to this paragraph is sometimes referred to herein for convenience as Refrigerant 32.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.0% by weight of CF3I and does not comprise 39.5% relative percent by weight or greater of CF3I based on the total weight of said three compounds. The refrigerant according to this paragraph is sometimes referred to herein for convenience as Refrigerant 33.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.0% by weight of CF3I and does not comprise 39.5% relative percent by weight or greater of CF3I based on the total weight of said three compounds. The refrigerant according to this paragraph is sometimes referred to herein for convenience as Refrigerant 34.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.0% by weight of CF3I based on the total weight of said three compounds. The refrigerant according to this paragraph is sometimes referred to herein for convenience as Refrigerant 35.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.0% by weight of CF3I based on the total weight of said three compounds. The refrigerant according to this paragraph is sometimes referred to herein for convenience as Refrigerant 36.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.5% relative percent by weight or greater of CF3I based on the total weight of said three compounds. The refrigerant according to this paragraph is sometimes referred to herein for convenience as Refrigerant 37.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane (CF$_3$I),
and wherein the refrigerant does not comprise 39.5% relative percent by weight or greater of CF3I based on the total weight of said three compounds. The refrigerant according to this paragraph is sometimes referred to herein for convenience as Refrigerant 38.

The present invention includes refrigerants consisting of the following three compounds, with each compound being present in the following relative percentages:
about 49% by weight difluoromethane (HFC-32),
from 11.6% to 11.9% by weight pentafluoroethane (HFC-125), and
39.0% to 40% by weight trifluoroiodomethane ($CF_3I$), wherein said refrigerant satisfies the Non-Flammability Test. The refrigerant according to this paragraph is sometimes referred to herein for convenience as Refrigerant 39.

Preferably, the heat transfer compositions comprise any refrigerant of the present invention, including each of Refrigerants 1-39, in an amount of greater than 40% by weight of the heat transfer composition.

Preferably, the heat transfer compositions comprise any refrigerant of the present invention, including each of Refrigerants 1-39, in an amount of greater than about 50% by weight of the heat transfer composition.

Preferably, the heat transfer compositions comprise any refrigerant of the present invention, including each of Refrigerants 1-39, in an amount of greater than 70% by weight of the heat transfer composition.

Preferably, the heat transfer compositions comprise any refrigerant of the present invention, including each of Refrigerants 1-39, in an amount of greater than 80% by weight of the heat transfer composition.

Preferably, the heat transfer compositions comprise any refrigerant of the present invention, including each of Refrigerants 1-39, in an amount of greater than 90% by weight of the heat transfer composition.

Preferably, the heat transfer compositions consist essentially of any refrigerant of the present invention, including each of Refrigerants 1-39.

Preferably, the heat transfer compositions of the present invention consist of any refrigerant of the present invention, including each of Refrigerants 1-39.

The heat transfer compositions of the invention may include other components for the purpose of enhancing or providing certain functionality to the compositions. Such other components or additives may include one or more of lubricants, dyes, solubilizing agents, compatibilizers, stabilizers, antioxidants, corrosion inhibitors, extreme pressure additives and anti-wear additives.

Stabilizers:

The heat transfer compositions of the invention include a refrigerant as discussed herein, including each of Refrigerants 1-39, above and a stabilizer.

The stabilizer component(s) preferably are provided in the heat transfer composition in an amount of greater than 0 to about 15% by weight of the heat transfer composition, or from about 0.5 to about 10, with the percentages being based on the total weight of all stabilizers in the heat transfer composition divided by the total of all components in the heat transfer composition.

The stabilizer for use in the heat transfer compositions of the present invention includes at least one of: (i) alkylated naphthalene compound(s); (ii) phenol-based compound(s); and (iii) diene-based compound(s). The stabilizer according to this paragraph is sometimes referred to herein for convenience as Stabilizer 1.

The stabilizer for use in the heat transfer compositions of the present invention includes a combination of: (i) at least one alkylated naphthalene compound and (ii) at least one phenol-based compound. The stabilizer according to this paragraph is sometimes referred to herein for convenience as Stabilizer 2.

The stabilizer for use in the heat transfer compositions of the present invention includes a combination of: (i) at least one alkylated naphthalene compound and (ii) at least diene-based compound. The stabilizer according to this paragraph is sometimes referred to herein for convenience as Stabilizer 3.

The stabilizer for use in the heat transfer compositions of the present invention includes a combination of: (i) at least one alkylated naphthalene compound and (ii) isobutylene compound. The stabilizer according to this paragraph is sometimes referred to herein for convenience as Stabilizer 4.

The stabilizer for use in the heat transfer compositions of the present invention includes a combination of: (i) at least one alkylated naphthalene compound and (ii) at least one phenol-based compound; and (iii) at least one diene-based compound. The stabilizer according to this paragraph is sometimes referred to herein for convenience as Stabilizer 5.

The stabilizer may include also phosphorus compound(s) and/or nitrogen compound(s) and/or epoxide(s), wherein if present the epoxice is preferably selected from the group consisting of aromatic epoxides, alkyl epoxides, alkyenyl epoxides.

The stabilizer may consist essentially of one or more alkylated naphthalenes and one or more phenol-based compounds. The stabilizer according to this paragraph is sometimes referred to herein for convenience as Stabilizer 6.

The stabilizer may consist essentially of one or more alkylated naphthalenes and one or more diene-based compounds. The stabilizer according to this paragraph is sometimes referred to herein for convenience as Stabilizer 7.

The stabilizer may consist essentially of one or more alkylated naphthalenes, one or more diene-based compounds and one or more phenol-based compounds. The stabilizer according to this paragraph is sometimes referred to herein for convenience as Stabilizer 8.

Alkylated Naphthalenes

Applicants have surprisingly and unexpectedly found that alkylated napthalenes are highly effective as stabilizers for the heat transfer compositions of the present invention. As used herein, the term "alkylated naphthalene" refers to compounds having the following structure:

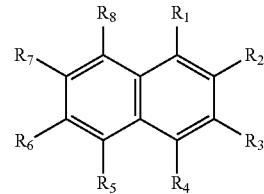

where each $R_1$-$R_8$ is independently selected from linear alkyl group, a branched alkyl group and hydrogen. The particular length of the alkyl chains and the mixtures or branched and straight chains and hydrogens can vary within the scope of the present invention, and it will be appreciated and understood by those skilled in the art that such variation is reflected the physical properties of the alkylated naphthalene, including in particular the viscosity of the alkylated compound, and producers of such materials frequently define the materials by reference to one or more of such properties as an alternative the specification of the particular R groups.

Applicants have found unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 1-Alkylated Napthalene 4 as indicated respectively in rows 1-5 in the Table AN1 below:

TABLE AN1

| Property | Alkylated Napthalene 1 | Alkylated Napthalene 2 | Alkylated Napthalene 3 | Alkylated Napthalene 4 | Alkylated Napthalene 5 |
|---|---|---|---|---|---|
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 |

As used herein in connection with viscosity at 40° C. measured according to ASTM D445, the term "about" means +/−4 cSt.

As used herein in connection with viscosity at 100° C. measured according to ASTM D445, the term "about" means +/−0.4 cSt.

As used herein in connection with pour point as measured according to ASTM D97, the term "about" means +/−5° C.

Applicants have also found that unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 6-Alkylated Napthalene 10 as indicated respectively in rows 6-10 in the Table AN2 below:

TABLE AN2

| Property | Alkylated Napthalene 6 | Alkylated Napthalene 7 | Alkylated Napthalene 8 | Alkylated Napthalene 9 | Alkylated Napthalene 10 |
|---|---|---|---|---|---|
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |
| Noack Volatility CEC L40 (ASTM D6375), wt % | 1-50 | 5-30 | 5-15 | 10-15 | about 12 |
| Pour Point (ASTM D97), ° C. | −50 to −20 | −45 to −25 | −40 to −30 | −35 to −30 | about −33 |
| Flash Point (ASTM D92)), ° C. | 200-300 | 200-270 | 220-250 | 230-240 | about 236 |

Examples of alkylated napthalenes within the meaning of Alkylated Naphthalene 1 and Alkylated Naphthalene 6 include those sold by King Industries under the trade designations NA-LUBE KR-007A; KR-008, KR-009; KR-015; KR-019; KR-005FG; KR-015FG; and KR-029FG.

Examples of alkylated naphthalenes within the meaning of Alkylated Naphthalene 2 and Alkylated Naphthalene 7 include those sold by King Industries under the trade designations NA-LUBE KR-007A; KR-008, KR-009; and KR-005FG.

An example of an alkylated naphthalene that is within the meaning of Alkylated Naphthalene 5 and Alkylated Naphthalene 10 includes the product sold by King Industries under the trade designation NA-LUBE KR-008.

The alkylated naphthalene is preferably in the heat transfer compositions of the present invention that include a refrigerant of the present invention, including each of Refrigerants 1-39, wherein the alkylated naphthalene is present in an amount of from 0.01% to about 10%, or from about 1.5% to about 4.5%, or from about 2.5% to about 3.5%, where amounts are in percent by weight based on the amount of alkylated naphthalene plus refrigerant in the system.

The alkylated naphthalene is preferably in the heat transfer compositions of the present invention that include a lubricant and a refrigerant of the present invention, including each of Refrigerants 1-39, wherein the alkylated naphthalene is present in an amount of from 0.1% to about 20%, or from about 5% to about al 5%, or from about 8% to about 12%, where amounts are in percent by weight based on the amount of alkylated naphthalene plus lubricant in the system.

The alkylated naphthalene is preferably in the heat transfer compositions of the present invention that include a POE lubricant and a refrigerant of the present invention, including each of Refrigerants 1-39, wherein the alkylated naphthalene is present in an amount of from 0.1% to about 20%, or from about 5% to about a15%, or from about 8% to about 12%, where amounts are in percent by weight based on the amount of alkylated naphthalene plus lubricant in the system.

The alkylated naphthalene is preferably in the heat transfer compositions of the present invention that include a POE lubricant having a viscosity at 40° C. measured according to ASTM D445C of from about 30 cSt to about 70 cSt and a refrigerant of the present invention, including each of Refrigerants 1-39, wherein the alkylated naphthalene is present in an amount of from 0.1% to about 20%, or from about 5% to about a15%, or from about 8% to about 12%, where amounts are in percent by weight based on the amount of alkylated naphthalene plus lubricant in the system.

Diene-Based Compounds

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference.

In addition, the diene based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

Phenol-Based Compounds

The phenol-based compound can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis (4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

The Phosphorus-Based Compounds

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite. The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the heat transfer composition.

The Nitrogen Compound

When the stabilizer is a nitrogen compound, the stabilizer may comprise an amine based compound such as one or more secondary or tertiary amines selected from diphenylamine, p-phenylenediamine, triethylamine, tributylamine, diisopropylamine, triisopropylamine and triisobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS®1944 (Mayzo Inc) and BLS® 1770 (Mayzo Inc). For the purposes of this invention, the amine based compound also can be an alkyldiphenyl amine such as bis (nonylphenyl amine), dialkylamine such as (N-(1-methylethyl)-2-propylamine, or. one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer. The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the heat transfer composition.

Epoxides and Others

Useful epoxides include aromatic epoxides, alkyl epoxides, and alkyenyl epoxides.

Isobutylene may also be used as a stabilizer according to the present invention.

Preferably, the heat transfer composition comprises a refrigerant of the present invention, including each of Refrigerants 1-39, and a stabilizer composition comprising farnesene and a alkylated naphthalene selected from Alkylated Napthalenes 1-5. For the purposes of the uses, methods and systems described herein, the stabilizer composition can comprise farnesene, Alkylated Naphthalene 5, and BHT. Preferably, the stabilizer composition consists essentially of farnesene, Alkylated Naphthalene 5, and BHT. Preferably, the stabilizer composition consists of farnesene, Alkylated Naphthalene 5 and BHT Preferably, the heat transfer composition comprises a refrigerant of the present invention, including each of Refrigerants 1-39, and a stabilizer composition comprising isobutylene and a alkylated naphthalene selected from Alkylated Napthalenes 1-5. For the purposes of the uses, methods and systems described herein, the stabilizer composition can comprise isobutylene, Alkylated Naphthalene 5, and BHT. Preferably, the stabilizer composition consists essentially of isobutylene, Alkylated Naphthalene 5, and BHT. Preferably, the stabilizer composition consists of isobutylene, Alkylated Naphthalene 5 and BHT.

The heat transfer composition includes a refrigerant of the present invention, including each of Refrigerants 1-39, and a stabilizer composition comprising Alkylated Naphthalene 4.

The heat transfer composition includes a refrigerant of the present invention, including each of Refrigerants 1-39, and a stabilizer composition comprising Alkylated Naphthalene 5.

The stabilizer can comprise, consist essentially of, or consist of farnesene and Alkylated Naphthalene 5.

The stabilizer can comprise, consist essentially of, or consist of isobutylene and Alkylated Naphthalene 5.

The heat transfer composition of the invention can preferably comprise Refrigerant 1 and Stabilizer 1.

The heat transfer composition of the invention can preferably comprise Refrigerant 2 and Stabilizer 1.

The heat transfer composition of the invention can preferably comprise Refrigerant 3 and Stabilizer 1.

The heat transfer composition of the invention can preferably comprise Refrigerant 4 and Stabilizer 1.

The heat transfer composition of the invention can preferably comprise Refrigerant 5 and Stabilizer 1.

The heat transfer composition of the invention can preferably comprise Refrigerant 6 and Stabilizer 1.

The heat transfer composition of the invention can preferably comprise Refrigerant 7 and Stabilizer 1.

The heat transfer composition of the invention can preferably comprise Refrigerant 8 and Stabilizer 1.

The heat transfer composition of the invention can preferably comprise Refrigerant 9 and Stabilizer 1.

The heat transfer composition of the invention can preferably comprise Refrigerant 10 and Stabilizer 1.

The heat transfer composition of the invention can preferably comprise Refrigerant 11 and Stabilizer 1.

The heat transfer composition of the invention can preferably comprise Refrigerant 12 and Stabilizer 1.

The heat transfer composition of the invention can preferably comprise Refrigerant 13 and Stabilizer 1.

The heat transfer composition of the invention can preferably comprise Refrigerant 14 and Stabilizer 1.

The heat transfer composition of the invention can preferably comprise Refrigerant 15 and Stabilizer 1.

The heat transfer composition of the invention can preferably comprise Refrigerant 16 and Stabilizer 1.

The heat transfer composition of the invention can preferably comprise Refrigerant 17 and Stabilizer 1.

The heat transfer composition of the invention can preferably comprise Refrigerant 18 and Stabilizer 1.

The heat transfer composition of the invention can preferably comprise Refrigerant 19 and Stabilizer 1.

The heat transfer composition of the invention can preferably comprise Refrigerant 20 and Stabilizer 1.

The heat transfer composition of the invention can preferably comprise Refrigerant 21 and Stabilizer 1.

The heat transfer composition of the invention can preferably comprise Refrigerant 22 and Stabilizer 1.

The heat transfer composition of the invention can preferably comprise Refrigerant 23 and Stabilizer 1.

The heat transfer composition of the invention can preferably comprise Refrigerant 24 and Stabilizer 1.

The heat transfer composition of the invention can preferably comprise Refrigerant 25 and Stabilizer 1.

The heat transfer composition of the invention can preferably comprise Refrigerant 26 and Stabilizer 1.

The heat transfer composition of the invention can preferably comprise Refrigerant 27 and Stabilizer 1.

The heat transfer composition of the invention can preferably comprise Refrigerant 28 and Stabilizer 1.

The heat transfer composition of the invention can preferably comprise Refrigerant 29 and Stabilizer 1.

The heat transfer composition of the invention can preferably comprise Refrigerant 30 and Stabilizer 1.

The heat transfer composition of the invention can preferably comprise Refrigerant 31 and Stabilizer 1.

The heat transfer composition of the invention can preferably comprise Refrigerant 32 and Stabilizer 1.

The heat transfer composition of the invention can preferably comprise Refrigerant 33 and Stabilizer 1.

The heat transfer composition of the invention can preferably comprise Refrigerant 34 and Stabilizer 1.

The heat transfer composition of the invention can preferably comprise Refrigerant 35 and Stabilizer 1.

The heat transfer composition of the invention can preferably comprise Refrigerant 36 and Stabilizer 1.

The heat transfer composition of the invention can preferably comprise Refrigerant 37 and Stabilizer 1.

The heat transfer composition of the invention can preferably comprise Refrigerant 38 and Stabilizer 1.

The heat transfer composition of the invention can preferably comprise Refrigerant 39 and Stabilizer 1.

The heat transfer composition of the invention can preferably comprise Refrigerant 1 and a stabilizer composition comprising BHT, wherein said BHT is present in an amount of from about 0.0001% by weight to about 5% by weight based on the weight of heat transfer composition. BHT in an amount of from 0.0001% by weight to about 5% by weight based on the weight of the heat transfer composition is sometimes referred to for convenience as Stabilizer 10.

The heat transfer composition of the invention can preferably comprise Refrigerant 2 and Stabilizer 2.

The heat transfer composition of the invention can preferably comprise Refrigerant 2 and Stabilizer 2.

The heat transfer composition of the invention can preferably comprise Refrigerant 3 and Stabilizer 2.

The heat transfer composition of the invention can preferably comprise Refrigerant 4 and Stabilizer 2.

The heat transfer composition of the invention can preferably comprise Refrigerant 5 and Stabilizer 2.

The heat transfer composition of the invention can preferably comprise Refrigerant 6 and Stabilizer 2.

The heat transfer composition of the invention can preferably comprise Refrigerant 7 and Stabilizer 2.

The heat transfer composition of the invention can preferably comprise Refrigerant 8 and Stabilizer 2.

The heat transfer composition of the invention can preferably comprise Refrigerant 9 and Stabilizer 2.

The heat transfer composition of the invention can preferably comprise Refrigerant 10 and Stabilizer 2.

The heat transfer composition of the invention can preferably comprise Refrigerant 11 and Stabilizer 2.

The heat transfer composition of the invention can preferably comprise Refrigerant 12 and Stabilizer 2.

The heat transfer composition of the invention can preferably comprise Refrigerant 13 and Stabilizer 2.

The heat transfer composition of the invention can preferably comprise Refrigerant 14 and Stabilizer 2.

The heat transfer composition of the invention can preferably comprise Refrigerant 15 and Stabilizer 2.

The heat transfer composition of the invention can preferably comprise Refrigerant 16 and Stabilizer 2.

The heat transfer composition of the invention can preferably comprise Refrigerant 17 and Stabilizer 2.

The heat transfer composition of the invention can preferably comprise Refrigerant 18 and Stabilizer 2.

The heat transfer composition of the invention can preferably comprise Refrigerant 19 and Stabilizer 2.

The heat transfer composition of the invention can preferably comprise Refrigerant 20 and Stabilizer 2.

The heat transfer composition of the invention can preferably comprise Refrigerant 21 and Stabilizer 2.

The heat transfer composition of the invention can preferably comprise Refrigerant 22 and Stabilizer 2.

The heat transfer composition of the invention can preferably comprise Refrigerant 23 and Stabilizer 2.

The heat transfer composition of the invention can preferably comprise Refrigerant 24 and Stabilizer 2.

The heat transfer composition of the invention can preferably comprise Refrigerant 25 and Stabilizer 2.

The heat transfer composition of the invention can preferably comprise Refrigerant 26 and Stabilizer 2.

The heat transfer composition of the invention can preferably comprise Refrigerant 27 and Stabilizer 2.

The heat transfer composition of the invention can preferably comprise Refrigerant 28 and Stabilizer 2.

The heat transfer composition of the invention can preferably comprise Refrigerant 29 and Stabilizer 2.

The heat transfer composition of the invention can preferably comprise Refrigerant 30 and Stabilizer 2.

The heat transfer composition of the invention can preferably comprise Refrigerant 31 and Stabilizer 2.

The heat transfer composition of the invention can preferably comprise Refrigerant 32 and Stabilizer 2.

The heat transfer composition of the invention can preferably comprise Refrigerant 33 and Stabilizer 2.

The heat transfer composition of the invention can preferably comprise Refrigerant 34 and Stabilizer 2.

The heat transfer composition of the invention can preferably comprise Refrigerant 35 and Stabilizer 2.

The heat transfer composition of the invention can preferably comprise Refrigerant 36 and Stabilizer 2.

The heat transfer composition of the invention can preferably comprise Refrigerant 37 and Stabilizer 2.

The heat transfer composition of the invention can preferably comprise Refrigerant 38 and Stabilizer 2.

The heat transfer composition of the invention can preferably comprise Refrigerant 39 and Stabilizer 2.

The heat transfer composition of the invention can preferably comprise lubricant, Refrigerant 1 and a stabilizer composition comprising Alkylated Naphthalene 4, wherein the alkylated naphthalene is present in an amount of from 0.1% to about 20%, or about 5% to about 15%, or about 8% to about 12%, with the percentages being based on the weight of the alkylated naphthalene plus the lubricant. A stabilizer as described in this paragraph within the indicated amounts in a heat transfer composition is referred to herein as Stabilizer 8.

The heat transfer composition of the invention can preferably comprise lubricant, Refrigerant 1 and a stabilizer composition comprising Alkylated Naphthalene 5, wherein the alkylated naphthalene is present in an amount of from 0.1% to about 20%, or about 5% to about 15%, or about 8% to about 12%, with the percentages being based on the weight of the alkylated naphthalene plus the lubricant. A stabilizer as described in this paragraph within the indicated amounts in a heat transfer composition is referred to herein as Stabilizer 9.

The heat transfer composition of the invention can preferably comprise lubricant, Refrigerant 1 and a stabilizer composition comprising farnesene, Alkylated Napthalene 4 and BHT, wherein the farnesene is provided in an amount of from about 0.0001% by weight to about 5% by weight, the Alkylated Napthalene 4 is provided in an amount of from about 0.0001% by weight to about 10% by weight, and the BHT is provided in an amount of from about 0.0001% by weight to about 5% by weight, with the percentages being based on the weight of the stabilizers plus the weight of the lubricant. A stabilizer as described in this paragraph within the indicated amounts in a heat transfer composition is referred to herein as Stabilizer 10.

The heat transfer composition of the invention can preferably comprise Refrigerant 2 and Stabilizer 10.

The heat transfer composition of the invention can preferably comprise Refrigerant 3 and Stabilizer 10.

The heat transfer composition of the invention can preferably comprise Refrigerant 4 and Stabilizer 10.

The heat transfer composition of the invention can preferably comprise Refrigerant 5 and Stabilizer 10.

The heat transfer composition of the invention can preferably comprise Refrigerant 6 and Stabilizer 10.

The heat transfer composition of the invention can preferably comprise Refrigerant 7 and Stabilizer 10.

The heat transfer composition of the invention can preferably comprise Refrigerant 8 and Stabilizer 10.

The heat transfer composition of the invention can preferably comprise Refrigerant 9 and Stabilizer 10.

The heat transfer composition of the invention can preferably comprise Refrigerant 10 and Stabilizer 10.

The heat transfer composition of the invention can preferably comprise Refrigerant 11 and Stabilizer 10.

The heat transfer composition of the invention can preferably comprise Refrigerant 12 and Stabilizer 10.

The heat transfer composition of the invention can preferably comprise Refrigerant 13 and Stabilizer 10.

The heat transfer composition of the invention can preferably comprise Refrigerant 14 and Stabilizer 10.

The heat transfer composition of the invention can preferably comprise Refrigerant 15 and Stabilizer 10.

The heat transfer composition of the invention can preferably comprise Refrigerant 16 and Stabilizer 10.

The heat transfer composition of the invention can preferably comprise Refrigerant 17 and Stabilizer 10.

The heat transfer composition of the invention can preferably comprise Refrigerant 18 and Stabilizer 10.

The heat transfer composition of the invention can preferably comprise Refrigerant 19 and Stabilizer 10.

The heat transfer composition of the invention can preferably comprise Refrigerant 20 and Stabilizer 10.

The heat transfer composition of the invention can preferably comprise Refrigerant 21 and Stabilizer 10.

The heat transfer composition of the invention can preferably comprise Refrigerant 22 and Stabilizer 10.

The heat transfer composition of the invention can preferably comprise Refrigerant 23 and Stabilizer 10.

The heat transfer composition of the invention can preferably comprise Refrigerant 24 and Stabilizer 10.

The heat transfer composition of the invention can preferably comprise Refrigerant 25 and Stabilizer 10.

The heat transfer composition of the invention can preferably comprise Refrigerant 26 and Stabilizer 10.

The heat transfer composition of the invention can preferably comprise Refrigerant 27 and Stabilizer 10.

The heat transfer composition of the invention can preferably comprise Refrigerant 28 and Stabilizer 10.

The heat transfer composition of the invention can preferably comprise Refrigerant 29 and Stabilizer 10.

The heat transfer composition of the invention can preferably comprise Refrigerant 30 and Stabilizer 10.

The heat transfer composition of the invention can preferably comprise Refrigerant 31 and Stabilizer 10.

The heat transfer composition of the invention can preferably comprise Refrigerant 32 and Stabilizer 10.

The heat transfer composition of the invention can preferably comprise Refrigerant 33 and Stabilizer 10.

The heat transfer composition of the invention can preferably comprise Refrigerant 34 and Stabilizer 10.

The heat transfer composition of the invention can preferably comprise Refrigerant 35 and Stabilizer 10.

The heat transfer composition of the invention can preferably comprise Refrigerant 36 and Stabilizer 10.

The heat transfer composition of the invention can preferably comprise Refrigerant 37 and Stabilizer 10.

The heat transfer composition of the invention can preferably comprise Refrigerant 38 and Stabilizer 10.

The heat transfer composition of the invention can preferably comprise Refrigerant 39 and Stabilizer 10.

The heat transfer composition of the invention can more preferably comprise any of the inventive refrigerants, including each of Refrigerants 1-39 and a stabilizer composition comprising farnesene, Alkylated Napthalene 4 and BHT, wherein the farnesene is provided in an amount of from 0.001% by weight to about 2.5% by weight, the Alkylated Napthalene 4 is provided in an amount of from 0.001% by weight to about 10% by weight, and the BHT is provided in an amount of from 0.001% by weight to about 2.5% by weight, with the percentages being based on the weight of the stabilizers plus the weight of the refrigerant.

The heat transfer composition of the invention can more preferably comprise any of the inventive refrigerants, including each of Refrigerants 1-39 and a stabilizer composition comprising farnesene, Alkylated Napthalene 4 and BHT, wherein the farnesene is provided in an amount of from 0.001% by weight to about 2.5% by weight, the Alkylated Napthalene 4 is provided in an amount of from 1.5% by weight to about 4.5% by weight, and the BHT is provided in an amount of from 0.001% by weight to about 2.5% by weight, with the percentages being based on the weight of the stabilizers plus the weight of the refrigerant.

The heat transfer composition of the invention can more preferably comprise any of the inventive refrigerants, including each of Refrigerants 1-39 and a stabilizer composition comprising farnesene, Alkylated Napthalene 4 and BHT, wherein the farnesene is provided in an amount of from 0.001% by weight to about 2.5% by weight, the Alkylated Napthalene 4 is provided in an amount of from 2.5% by weight to 3.5% by weight, and the BHT is provided in an amount of from 0.001% by weight to about 2.5% by weight, with the percentages being based on the weight of the stabilizers plus the weight of the refrigerant.

The heat transfer composition of the invention can more preferably comprise any of the inventive refrigerants, including each of Refrigerants 1-39 and a stabilizer composition comprising farnesene, Alkylated Naphthalene 5 and BHT, wherein the farnesene is provided in an amount of from about 0.001% by weight to about 2.5% by weight based on the weight of the heat transfer composition, the Alkylated Napthalene 5 is provided in an amount of from about 0.001% by weight to about 2.5% by weight based on the weight of the heat transfer composition, and the BHT is provided in an amount of from about 0.001% by weight to about 2.5% by weight based on the weight of heat transfer composition.

The heat transfer composition of the invention can most preferably comprise any of the inventive refrigerants and a stabilizer composition comprising farnesene, Alkylated Napthalene 4 and BHT, wherein the farnesene is provided in an amount of from about 0.01% by weight to about 1% by weight based on the weight of the heat transfer composition, the Alkylated Napthalene 4 is provided in an amount of from about 0.01% by weight to about 1% by weight based on the weight of the heat transfer composition, and the BHT is provided in an amount of from about 0.01% by weight to about 1% by weight based on the weight of heat transfer composition.

Each of the heat transfer compositions of the invention as described herein, including those heat transfer compositions that include each of Refrigerants 1-39, may additionally comprise a lubricant. In general, the heat transfer composition comprises a lubricant, in amounts preferably of from about 0.1% by weight to about 5%, or from 0.1% by weight to about 1% by weight, or from 0.1% by weight to about 0.5% by weight, based on the weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs) and poly(alpha-olefin) (PAO) that are used in refrigeration machinery may be used with the refrigerant compositions of the present invention.

Preferably the lubricants are selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), polyethers, most preferably from polyol esters (POEs).

Commercially available polyvinyl ethers include those lubricants sold under the trade designations FVC32D and FVC68D, from Idemitsu.

Commercially available mineral oils include Witco LP 250 (registered trademark) from Witco, Suniso 3GS from Witco and Calumet R015 from Calumet. Commercially available alkylbenzene lubricants include Zerol 150 (registered trademark) and Zerol 300 (registered trademark) from Shrieve Chemical. Commercially available POEs include neopentyl glycol dipelargonate which is available as Emery 2917 (registered trademark) and Hatcol 2370 (registered trademark) and pentaerythritol derivatives including those sold under the trade designations Emkarate RL32-3MAF and Emkarate RL68H by CPI Fluid Engineering. Emkarate RL32-3MAF and Emkarate RL68H are preferred POE lubricants having the properties identified below:

| Property | RL32-3MAF | RL68H |
|---|---|---|
| Viscosity @ 40° C. (ASTM D445), cSt | about 31 | about 67 |
| Viscosity @ 100° C. (ASTM D445), cSt | about 5.6 | about 9.4 |
| Pour Point (ASTM D97), ° C. | about −40 | about −40 |

A lubricant consisting essentially of a POE having a viscosity at 40° C. measured in accordance with ASTM D445 of from about 30 to about 70 is referred to herein as Lubricant 1.

A preferred heat transfer composition comprises Refrigerant 2 and Lubricant 1.

A preferred heat transfer composition comprises Refrigerant 3 and Lubricant 1.

A preferred heat transfer composition comprises Refrigerant 4 and Lubricant 1.

A preferred heat transfer composition comprises Refrigerant 5 and Lubricant 1.

A preferred heat transfer composition comprises Refrigerant 6 and Lubricant 1

A preferred heat transfer composition comprises Refrigerant 7 and Lubricant 1.

A preferred heat transfer composition comprises Refrigerant 8 and Lubricant 1.

A preferred heat transfer composition comprises Refrigerant 9 and Lubricant 1.

A preferred heat transfer composition comprises Refrigerant 10 and Lubricant 1.

A preferred heat transfer composition comprises Refrigerant 11 and Lubricant 1.

A preferred heat transfer composition comprises Refrigerant 12 and Lubricant 1.

A preferred heat transfer composition comprises Refrigerant 13 and Lubricant 1.

A preferred heat transfer composition comprises Refrigerant 14 and Lubricant 1.

A preferred heat transfer composition comprises Refrigerant 15 and Lubricant 1.

A preferred heat transfer composition comprises Refrigerant 16 and Lubricant 1.

A preferred heat transfer composition comprises Refrigerant 17 and Lubricant 1.

A preferred heat transfer composition comprises Refrigerant 18 and Lubricant 1.

A preferred heat transfer composition comprises Refrigerant 19 and Lubricant 1.

A preferred heat transfer composition comprises Refrigerant 20 and Lubricant 1.

A preferred heat transfer composition comprises Refrigerant 21 and Lubricant 1.

A preferred heat transfer composition comprises Refrigerant 22 and Lubricant 1.

A preferred heat transfer composition comprises Refrigerant 23 and Lubricant 1.

A preferred heat transfer composition comprises Refrigerant 24 and Lubricant 1.

A preferred heat transfer composition comprises Refrigerant 25 and Lubricant 1

A preferred heat transfer composition comprises Refrigerant 26 and Lubricant 1.

A preferred heat transfer composition comprises Refrigerant 27 and Lubricant 1.

A preferred heat transfer composition comprises Refrigerant 28 and Lubricant 1.

A preferred heat transfer composition comprises Refrigerant 29 and Lubricant 1.

A preferred heat transfer composition comprises Refrigerant 30 and Lubricant 1.

A preferred heat transfer composition comprises Refrigerant 31 and Lubricant 1.

A preferred heat transfer composition comprises Refrigerant 32 and Lubricant 1.

A preferred heat transfer composition comprises Refrigerant 33 and Lubricant 1.

A preferred heat transfer composition comprises Refrigerant 34 and Lubricant 1.

A preferred heat transfer composition comprises Refrigerant 35 and Lubricant 1.

A preferred heat transfer composition comprises Refrigerant 36 and Lubricant 1.

A preferred heat transfer composition comprises Refrigerant 37 and Lubricant 1.

A preferred heat transfer composition comprises Refrigerant 38 and Lubricant 1.

A preferred heat transfer composition comprises Refrigerant 39 and Lubricant 1.

The heat transfer composition of the invention may consist essentially of or consist of a Refrigerants 1-39, a stabilizer composition of the present invention, including each of Stabilizers 1-10, and a lubricant as described herein.

A preferred heat transfer composition comprises Refrigerant 1 and from about 0.1% to about 5%, or from about 0.1% to about 1%, or from about 0.1% to about 0.5%, of a lubricant, wherein said percentage is based on the weight of the lubricant in the heat transfer composition.

A preferred heat transfer composition comprises Refrigerant 1 and from about 0.1% to about 5%, or from about 0.1% to about 1%, or from about 0.1% to about 0.5%, of a polyol ester (POE) lubricant having a viscosity at 40° C. measured in accordance with ASTM D445 of from about 30 cSt to about 70 cSt, based on the weight of the heat transfer composition. Polyol ester (POE) lubricant having a viscosity at 40° C. measured in accordance with ASTM D445 of from about 30 cSt to about 70 cSt is referred to for convenience as Lubricant 2.

The amount of Lubricant 1 in the heat transfer compositions of the present invention, including those heat transfer compositions containing each of Refrigerants 1-39, preferably is present in an amount of from about 0.1% to about 5% based on the total weight of the heat transfer composition.

The amount of Lubricant 1 in the heat transfer compositions of the present invention, including those heat transfer compositions containing each of Refrigerants 1-39, preferably is present in an amount of from about 0.1% to about 1% based on the total weight of the heat transfer composition.

The amount of Lubricant 1 in the heat transfer compositions of the present invention, including those heat transfer compositions containing each of Refrigerants 1-39, preferably is present in an amount of from about 0.1% to about 0.5%, based on the total weight of the heat transfer composition.

A preferred heat transfer composition comprises Refrigerant 2 and Lubricant 2.

A preferred heat transfer composition comprises Refrigerant 3 and Lubricant 2.

A preferred heat transfer composition comprises Refrigerant 4 and Lubricant 2.

A preferred heat transfer composition comprises Refrigerant 5 and Lubricant 2.

A preferred heat transfer composition comprises Refrigerant 6 and Lubricant 2

A preferred heat transfer composition comprises Refrigerant 7 and Lubricant 2.

A preferred heat transfer composition comprises Refrigerant 8 and Lubricant 2.

A preferred heat transfer composition comprises Refrigerant 9 and Lubricant 2.

A preferred heat transfer composition comprises Refrigerant 10 and Lubricant 2.

A preferred heat transfer composition comprises Refrigerant 11 and Lubricant 2.

A preferred heat transfer composition comprises Refrigerant 12 and Lubricant 2.

A preferred heat transfer composition comprises Refrigerant 13 and Lubricant 2.

A preferred heat transfer composition comprises Refrigerant 14 and Lubricant 2.

A preferred heat transfer composition comprises Refrigerant 15 and Lubricant 2.

A preferred heat transfer composition comprises Refrigerant 16 and Lubricant 2.

A preferred heat transfer composition comprises Refrigerant 17 and Lubricant 2.

A preferred heat transfer composition comprises Refrigerant 18 and Lubricant 2.

A preferred heat transfer composition comprises Refrigerant 19 and Lubricant 2.

A preferred heat transfer composition comprises Refrigerant 20 and Lubricant 2.

A preferred heat transfer composition comprises Refrigerant 21 and Lubricant 2.

A preferred heat transfer composition comprises Refrigerant 22 and Lubricant 2.

A preferred heat transfer composition comprises Refrigerant 23 and Lubricant 2.

A preferred heat transfer composition comprises Refrigerant 24 and Lubricant 2.

A preferred heat transfer composition comprises Refrigerant 25 and Lubricant 2

A preferred heat transfer composition comprises Refrigerant 26 and Lubricant 2.

A preferred heat transfer composition comprises Refrigerant 27 and Lubricant 2.

A preferred heat transfer composition comprises Refrigerant 28 and Lubricant 2.

A preferred heat transfer composition comprises Refrigerant 29 and Lubricant 2.

A preferred heat transfer composition comprises Refrigerant 30 and Lubricant 2.

A preferred heat transfer composition comprises Refrigerant 31 and Lubricant 2.

A preferred heat transfer composition comprises Refrigerant 32 and Lubricant 2.

A preferred heat transfer composition comprises Refrigerant 33 and Lubricant 2.

A preferred heat transfer composition comprises Refrigerant 34 and Lubricant 2.

A preferred heat transfer composition comprises Refrigerant 35 and Lubricant 2.

A preferred heat transfer composition comprises Refrigerant 36 and Lubricant 2.

A preferred heat transfer composition comprises Refrigerant 37 and Lubricant 2.

A preferred heat transfer composition comprises Refrigerant 38 and Lubricant 2.

A preferred heat transfer composition comprises Refrigerant 39 and Lubricant 2.

The heat transfer composition of the invention can preferably comprise Refrigerant 1, Stabilizer 1, and Lubricant 1.

The heat transfer composition of the invention can preferably comprise Refrigerant 2, Stabilizer 1, and Lubricant 1.

The heat transfer composition of the invention can preferably comprise Refrigerant 3, Stabilizer 1, and Lubricant 1.

The heat transfer composition of the invention can preferably comprise Refrigerant 4, Stabilizer 1, and Lubricant 1.

The heat transfer composition of the invention can preferably comprise Refrigerant 5, Stabilizer 1, and Lubricant 1.

The heat transfer composition of the invention can preferably comprise Refrigerant 6, Stabilizer 1, and Lubricant 1.

The heat transfer composition of the invention can preferably comprise Refrigerant 7, Stabilizer 1, and Lubricant 1.

The heat transfer composition of the invention can preferably comprise Refrigerant 8, Stabilizer 1, and Lubricant 1.

The heat transfer composition of the invention can preferably comprise Refrigerant 9, Stabilizer 1 and Lubricant 1.

The heat transfer composition of the invention can preferably comprise Refrigerant 10, Stabilizer 1, and Lubricant 1.

The heat transfer composition of the invention can preferably comprise Refrigerant 11, Stabilizer 1, and Lubricant 1.

The heat transfer composition of the invention can preferably comprise Refrigerant 12, Stabilizer 1, and Lubricant 1.

The heat transfer composition of the invention can preferably comprise Refrigerant 13, Stabilizer 1, and Lubricant 1.

The heat transfer composition of the invention can preferably comprise Refrigerant 14, Stabilizer 1, and Lubricant 1.

The heat transfer composition of the invention can preferably comprise Refrigerant 15, Stabilizer 1, and Lubricant 1.

The heat transfer composition of the invention can preferably comprise Refrigerant 16, Stabilizer 1, and Lubricant 1.

The heat transfer composition of the invention can preferably comprise Refrigerant 17, Stabilizer 1, and Lubricant 1.

The heat transfer composition of the invention can preferably comprise Refrigerant 18, Stabilizer 1, and Lubricant 1.

The heat transfer composition of the invention can preferably comprise Refrigerant 19, Stabilizer 1, and Lubricant 1.

The heat transfer composition of the invention can preferably comprise Refrigerant 20, Stabilizer 1, and Lubricant 1.

The heat transfer composition of the invention can preferably comprise Refrigerant 21, Stabilizer 1, and Lubricant 1.

The heat transfer composition of the invention can preferably comprise Refrigerant 22, Stabilizer 1, and Lubricant 1.

The heat transfer composition of the invention can preferably comprise Refrigerant 23, Stabilizer 1, and Lubricant 1.
The heat transfer composition of the invention can preferably comprise Refrigerant 24, Stabilizer 1, and Lubricant 1.
The heat transfer composition of the invention can preferably comprise Refrigerant 25, Stabilizer 1, and Lubricant 1.
The heat transfer composition of the invention can preferably comprise Refrigerant 26, Stabilizer 1, and Lubricant 1.
The heat transfer composition of the invention can preferably comprise Refrigerant 27, Stabilizer 1, and Lubricant 1.
The heat transfer composition of the invention can preferably comprise Refrigerant 28, Stabilizer 1, and Lubricant 1.
The heat transfer composition of the invention can preferably comprise Refrigerant 29, Stabilizer 1, and Lubricant 1.
The heat transfer composition of the invention can preferably comprise Refrigerant 30, Stabilizer 1, and Lubricant 1.
The heat transfer composition of the invention can preferably comprise Refrigerant 31, Stabilizer 1, and Lubricant 1.
The heat transfer composition of the invention can preferably comprise Refrigerant 32, Stabilizer 1, and Lubricant 1.
The heat transfer composition of the invention can preferably comprise Refrigerant 33, Stabilizer 1, and Lubricant 1.
The heat transfer composition of the invention can preferably comprise Refrigerant 34, Stabilizer 1, and Lubricant 1.
The heat transfer composition of the invention can preferably comprise Refrigerant 35, Stabilizer 1, and Lubricant 1.
The heat transfer composition of the invention can preferably comprise Refrigerant 36, Stabilizer 1, and Lubricant 1.
The heat transfer composition of the invention can preferably comprise Refrigerant 37, Stabilizer 1, and Lubricant 1.
The heat transfer composition of the invention can preferably comprise Refrigerant 38, Stabilizer 1, and Lubricant 1.
The heat transfer composition of the invention can preferably comprise Refrigerant 39, Stabilizer 1, and Lubricant 1.
Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference.

The applicants have found that the compositions of the invention are capable of achieving a difficult to achieve combination of properties including particularly low GWP. Thus, the compositions of the invention have a Global Warming Potential (GWP) of not greater than about 1500, preferably not greater than about 1000, more preferably not greater than about 750. In a particularly preferred feature of the invention, the composition of the invention has a Global Warming Potential (GWP) of not greater than about 750.

In addition, the compositions of the invention have a low Ozone Depletion Potential (ODP). Thus, the compositions of the invention have an Ozone Depletion Potential (ODP) of not greater than 0.05, preferably not greater than 0.02, more preferably about zero.

In addition, the compositions of the invention show acceptable toxicity and preferably have an Occupational Exposure Limit (OEL) of greater than about 400.

Methods, Uses and Systems

The heat transfer compositions disclosed herein are provided for use in heat transfer applications, including air conditioning applications, with highly preferred air conditioning applications including residential air conditioning, commercial air conditioning applications (such as roof top applications, VRF applications and chillers.

The present invention also includes methods for providing heat transfer including methods of air conditioning, with highly preferred air conditioning methods including providing residential air conditioning, providing commercial air conditioning (such as methods of providing roof top air conditioning, methods of providing VRF air conditioning and methods of providing air conditioning using chillers.

The present invention also includes heat transfer systems, including air conditioning systems, with highly preferred air conditioning systems including residential air conditioning, commercial air conditioning systems (such as roof top air conditioning systems, VRF air conditioning systems and air conditioning chiller systems).

The invention also provides uses of the heat transfer compositions, methods using the heat transfer compositions and systems containing the heat transfer compositions in connection with refrigeration, heat pumps and chillers (including portable water chillers and central water chillers).

Any reference to the heat transfer composition of the invention refers to each and any of the heat transfer compositions as described herein. Thus, for the following discussion of the uses, methods, systems or applications of the composition of the invention, the heat transfer composition may comprise or consist essentially of any of the refrigerants described herein, including: (i) each of Refrigerants 1-39; (ii) any combination of each of Refrigerants 1-39 and each of Stabilizers 1-10; (iii) any combination of each of Refrigerants 1-39 and any lubricant, including Lubricants 1-3; and (iv), and any combination of each of Refrigerants 1-39 and each of Stabilizers 1-10 and any lubricant, including Lubricants 1-3. For heat transfer systems of the present invention that include a compressor and lubricant for the compressor in the system, the system can comprises a loading of refrigerant and lubricant such that the lubricant loading in the system is from about 5% to 60% by weight, or from about 10% to about 60% by weight, or from about 20% to about 50% by weight, or from about 20% to about 40% by weight, or from about 20% to about 30% by weight, or from about 30% to about 50% by weight, or from about 30% to about 40% by weight. As used herein, the term "lubricant loading" refers to the total weight of lubricant contained in the system as a percentage of total of lubricant and refrigerant contained in the system. Such systems may also include a lubricant loading of from about 5% to about 10% by weight, or about 8% by weight of the heat transfer composition.

The heat transfer systems according to the present invention can comprise a compressor, an evaporator, a condenser and an expansion device, in fluid communication with each other, a refrigerant of the present invention, including any one of Refrigerants 1-39, a lubricant, including Lubricants 1-3, and a sequestration material in the system, wherein said sequestration material preferably comprises:
  i. copper or a copper alloy, or
  ii. activated alumina, or
  iii. a zeolite molecular sieve comprising copper, silver, lead or a combination thereof, or
  iv. an anion exchange resin, or
  v. a moisture-removing material, preferably a moisture-removing molecular sieve, or
  vi. a combination of two or more of the above.

For the purpose of convenience, when a heat transfer system or a heat transfer method includes at least one of sequestration materials (i)-(v) as described herein, such a material is referred to herein for convenience as Sequestration Material 1.

For the purpose of convenience, when a heat transfer system or a heat transfer method includes a sequestration material comprising at least two materials with each material selected from a different of the (i)-(v) categories as described herein, such a material is referred to herein for convenience as Sequestration Material 2.

For the purpose of convenience, when a heat transfer system or a heat transfer method includes a sequestration material that includes a material from each of categories (ii)-(v) as described herein, such a material is referred to herein for convenience as Sequestration Material 3.

For the purpose of convenience, when a heat transfer system or a heat transfer method includes a sequestration material that includes a material from each of categories (ii)-(v) as described herein, and wherein the material from category (iii) comprises silver, such a material is referred to herein for convenience as Sequestration Material 4.

The heat transfer systems according to the present invention can comprise a compressor, an evaporator, a condenser and an expansion device, in fluid communication with each other, a refrigerant of the invention, including each of Refrigerants 1-39, a lubricant, and a Sequestration Material 1.

The heat transfer systems according to the present invention can comprise a compressor, an evaporator, a condenser and an expansion device, in fluid communication with each other, a refrigerant of the present invention, including each of Refrigerants 1-39, a lubricant, and a Sequestration Material 2.

The heat transfer systems according to the present invention can comprise a compressor, an evaporator, a condenser and an expansion device, in fluid communication with each other, a refrigerant of the present invention, including each of Refrigerants 1-39, a lubricant, and a Sequestration Material 3.

The heat transfer systems according to the present invention can comprise a compressor, an evaporator, a condenser and an expansion device, in fluid communication with each other, a refrigerant of the present invention, including each of Refrigerants 1-39, a lubricant, and a Sequestration Material 4.

The heat transfer systems of the present invention include systems which include an oil separator downstream of the compressor, and systems preferably include one or more sequestration materials of the present invention, including each of Sequestration Materials 1-4, wherein said sequestration materials are located inside the oil separator, or in some cases outside but downstream of the oil separator, such that the liquid lubricant contacts the sequestration material(s).

The present invention also includes one or more of the sequestration materials, including Sequestration Materials 1-4, being located in the refrigerant liquid which exits the condenser.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a refrigerant according to the present invention, including each of Refrigerants 1-39;

(b) optionally but preferably providing lubricant for said compressor; and (b) exposing at least a portion of said refrigerant and/or at least a portion of said lubricant to Sequestration Material 1.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a refrigerant according to the present invention, including each of Refrigerants 1-39;

(b) optionally but preferably providing lubricant for said compressor; and (b) exposing at least a portion of said refrigerant and/or at least a portion of said lubricant to Sequestration Material 2.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a refrigerant according to the present invention, including each of Refrigerants 1-39;

(b) optionally but preferably providing lubricant for said compressor; and (b) exposing at least a portion of said refrigerant and/or at least a portion of said lubricant to Sequestration Material 3.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a refrigerant according to the present invention, including each of Refrigerants 1-39;

(b) optionally but preferably providing lubricant for said compressor; and (b) exposing at least a portion of said refrigerant and/or at least a portion of said lubricant to Sequestration Material 4.

The present invention also includes heat transfer methods according to any of the preceeding four paragraphs wherein said exposing temperature is preferably above about 10° C.

In other aspects of the present invention, Sequestration Material 1 is configured such that each of the at least two materials are included together in a filter element. As the term is used herein, "filter element" refers to any device, system, article or container in which each of the sequestration materials are located in close physical proximity, and preferably at essentially the same location within the system.

In other aspects of the present invention, Sequestration Material 1 is used in the present heat transfer systems and the present heat transfer methods is configured such that each of the at least two materials are included together in a solid core. As the term is used herein, "solid core" refers to relatively porous solid which contains and/or has embedded therein two or more of sequestration materials such that such materials are accessible to fluids passing through said any solid core.

In preferred embodiments the one or more sequestration materials are substantially homogeneously distributed throughout the solid core.

In preferred embodiments, the solid core of the present invention is included in or comprises a filter element.

In preferred embodiments, Sequestration Material 1 is configured such that each of the at least two materials are included in a solid core.

In preferred embodiments, Sequestration Material 2 is configured such that each of the at least two materials are included together in a filter element.

In preferred embodiments, Sequestration Material 2 is configured such that all of materials are included in a solid core.

In preferred embodiments, Sequestration Material 3 is configured such that each of the at least two materials are included together in a filter element.

In preferred embodiments, Sequestration Material 3 is configured such that all of materials are included in a solid core.

In preferred embodiments, Sequestration Material 4 is configured such that each of the at least two materials are included together in a filter element.

In preferred embodiments, Sequestration Material 4 is configured such that all of materials are included in a solid core.

Sequestration Materials:

With respected to sequestration materials, the systems of the present invention preferably include a sequestration material, including each of Sequestration Materials 1-4, in contact with at least a portion of a refrigerant according to the present invention, including each of Refrigerants 1-39, and/or with at least a portion of the lubricant, including each of Lubricants 1-4, wherein the temperature of said sequestration material and/or the temperature of said refrigerant and/or the temperature of the lubricant when in said contact are at a temperature that is preferably at least about 10° C. Any and all of the refrigerants and any and all of the sequestration materials as described herein can be used in the systems of the present invention.

a. Copper/Copper Alloy Sequestration Material

The sequestration material may be copper, or a copper alloy, preferably copper. The copper alloy may comprise, in addition to copper, one or more further metals, such as tin, aluminium, silicon, nickel or a combination thereof. Alternatively, or in addition, the copper alloy may comprise one or more non-metal elements, e.g. carbon, nitrogen, silicon, oxygen or a combination thereof.

It will be appreciated that the copper alloy may comprise varying amounts of copper. For example, the copper alloy may comprise at least about 5 wt %, at least about 15 wt %, at least about 30 wt %, at least about 50 wt %, at least about 70 wt % or at least about 90 wt % of copper, based on the total weight of the copper alloy. It will also be appreciated that the copper alloy may comprise from about 5 wt % to about 95 wt %, from about 10 wt % to about 90 wt %, from about 15 wt % to about 85 wt %, from about 20 wt % to about 80 wt %, form about 30 wt % to about 70 wt %, or from about 40 wt % to about 60 wt % of copper, based on the total weight of the copper alloy.

Alternatively, copper may be used as a sequestration material. The copper metal may contain impurity levels of other elements or compounds. For example, the copper metal may contain at least about 99 wt %, more preferably at least about 99.5 wt %, more preferably at least about 99.9 wt % of elemental copper.

The copper or copper alloy may be in any form which allows the refrigerant to contact the surface of the copper or copper alloy. Preferably, the form of the copper or copper alloy is selected to maximize the surface area of the copper or copper alloy (i.e. to maximize the area which is in contact with the refrigerant).

For example, the metal may be in the form of a mesh, wool, spheres, cones, cylinders etc. The term "sphere" refers to a three dimensional shape where the difference between the largest diameter and the smallest diameter is about 10% or less of the largest diameter.

The copper or copper alloy may have a BET surface area of at least about 10 $m^2/g$, at least about 20 $m^2/g$, at least about 30 $m^2/g$, at least about 40 $m^2/g$ or at least about 50 $m^2/g$. The BET-surface area may be measured in accordance with ASTM D6556-10.

When the sequestration material comprises copper or a copper alloy, the BET surface area of the copper or copper alloy may be from about 0.01 to about 1.5 $m^2$ per kg of refrigerant, preferably from about 0.02 to about 0.5 $m^2$ per kg of refrigerant. For example, the copper or copper alloy may have a surface area of about 0.08 $m^2$ per kg of refrigerant.

b. Zeolite Molecular Sieve Sequestration Material

The sequestration material may comprise a zeolite molecular sieve (. The zeolite molecular sieve comprises copper, silver, lead or a combination thereof, preferably at least silver.

In preferred embodiments, the zeolite molecular sieve contains an amount of metal, and preferably in certain embodiments silver, of from about 1% to about 30% by weight, or preferably from about 5% to about 20% by weight, based on the total weight of the zeolite.

The metal (i.e. copper, silver and/or lead) may be present in a single oxidation state, or in a variety of oxidation states (e.g. a copper zeolite may comprise both Cu(I) and Cu(II)).

The zeolite molecular sieve may comprise metals other than silver, lead, and/or copper.

The zeolite may have openings which have a size across their largest dimension of from about 5 to 40 Å. For example, the zeolite may have openings which have a size across their largest dimension of about 35 Å or less. Preferably, the zeolite has openings which have a size across their largest dimension of from about 15 to about 35 Å. Zeolite such as IONSIV D7310-C has activated sites that applicants have found to effectively remove specific decomposition products in accordance with the present invention.

When the sequestration material comprises a zeolite molecular sieve comprising copper, silver, lead or a combination thereof, the molecular sieve (e.g. zeolite) may be present in an amount of from about 1 wt % to about 30 wt %, such as from about 2 wt % to about 25 wt % relative to the total amount of molecular sieve (e.g. zeolite), refrigerant and lubricant (if present) in heat transfer system being treated In preferred embodiments, the sequestration material comprises a zeolite molecular sieve comprising silver, and in such embodiments the molecular sieve may be present in an amount of at least 5% parts by weight (pbw), preferably from about 5 pbw to about 30 pbw, or from about 5 pbw to about 20 pbw, per 100 parts by weight of lubricant (pphl) based on the total amount of molecular sieve (e.g. zeolite) and lubricant in the heat transfer system being treated. The preferred embodiments as described in this paragraph have been found to have exceptional ability to remove fluoride from heat transfer compositions as described herein. Furthermore in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprising silver, and in such embodiments the molecular sieve (e.g. zeolite) may be present in an amount of at least 10 pphl, preferably from about 10 pphl to about 30 pphl, or from about 10 pphl to about 20 pphl by weight relative to the total amount of molecular sieve (e.g. zeolite), and lubricant in the heat transfer system being treated. The preferred embodiments as described in this paragraph have been found to have exceptional ability to remove iodide from heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprises silver, and in such embodiments the molecular sieve may be present in an amount of at least pphl, preferably from about 15 pphl to about 30 pphl, or from about 15 pphl to about 20 pphl by weight relative to the total amount of molecular sieve, and lubricant in the heat transfer system being treated. The preferred embodiments as described in this paragraph have been found to have exceptional ability to reduce TAN levels in the heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

Preferably, the zeolite molecular sieve is present in an amount of at least about 15 pphl, or at least about 18 pphl relative to the total amount of molecular sieve and lubricant in the system. Therefore, the molecular sieve may be present in an amount of from about 15 pphl to about 30 pphl, or from about 18 pphl to about 25 pphl relative to the total amount of molecular sieve and lubricant present in the system.

It will be appreciated that the zeolite may be present in an amount of about 5 pphl or about 21 pphl relative to the total amount of molecular sieve, and lubricant in the system.

The amount of zeolite molecular sieve described herein refers to the dry weight of the molecular sieve. As used herein, the term "dry weight" of the sequestration materials means that the material has 50 ppm or less of moisture.

Anion Exchange Resins

The sequestration material may comprise an anion exchange resin.

Preferably, the anion exchange resin is a strongly basic anion exchange resin. The strongly basic anion exchange resin may be a type 1 resin or a type 2 resin. Preferably, the anion exchange resin is a type 1 strongly basic anion exchange resin.

The anion exchange resin generally comprises a positively charged matrix and exchangeable anions. The exchangeable anions may be chloride anions ($Cl^-$) and/or hydroxide anions ($OH^-$).

The anion exchange resin may be provided in any form. For example, the anion exchange resin may be provided as beads. The beads may have a size across their largest dimension of from about 0.3 mm to about 1.2 mm, when dry.

When the sequestration material comprises an anion exchange resin, the anion exchange resin may be present in an amount of from about 1 pphl to about 60 pphl, or from about 5 pphl to about 60 pphl, or from about 20 pphl to about 50 pphl, or from about 20 pphl to about 30 pphl, or from about 1 pphl to about 25 pphl, such as from about 2 pphl to about 20 pphl based on the total amount of anion exchange resin and lubricant in the system.

Preferably, the anionic exchange resin is present in an amount of at least about 10 pphl, or at least about 15 pphl relative to the total amount of anionic exchange resin and lubricant in the system. Therefore, the anion exchange resin may be present in an amount of from about 10 pphl to about 25 pphl, or from about 15 pphl to about 20 pphl relative to the total amount of anion exchange resin and lubricant in the system.

It will be appreciated that the anion exchange resin may be present in an amount of about 4 pphl or about 16 pphl based on the total amount of anion exchange resin and lubricant present in the system.

Applicants have found an unexpectedly advantageous ability of industrial grade weakly base anion exchange adsorbent resins, including in particular the material sold under the trade designation Amberlyst A21 (Free Base) to act as a sequestration material. As used herein, the term weak base anion resin refers to resins in the free base form, which are preferably e functionalized with a tertiary amine (uncharged). Tertiary amine contains a free lone pair of electrons on the nitrogen, which results in it being readily protonated in presence of an acid. In preferred embodiments, the ion exchange resin as used according to the present invention is protonated by the acid, then attracts and binds the anionic counter ion for full acid removal, without contributing any additional species back into solution.

Amberlyst A21 is a preferred material in that applicants have found it to be advantageous because it provides a macroporous structure makes it physically very stable and resistant to breakage, and applicants have found that it can withstand high flow rates of the refrigeration system over relatively long periods of time, including preferably over the lifetime of the system.

The amount of anion exchange resin described herein refers to the dry weight of the anion exchange resin. As used herein, the term "dry weight" of the sequestration materials means that the material has 50 ppm or less of moisture.

As used herein, pphl of a particular sequestration material means the parts per hundred of the particular sequestration material by weight based on the total weight of that particular sequestration material and lubricant in the system.

c. Moisture Removing Material

A preferred sequestration material is a moisture removing material. In preferred embodiments the moisture removing material comprises, consists essentially of or consists of a moisture-removing molecular sieve. Preferred moisture-removing molecular sieves include those commonly known as sodium aluminosilicate molecular sieves, and such materials are preferably crystalline metal aluminosilicates having a three dimensional interconnecting network of silica and alumina tetrahedra. Applicants have found that such materials are effective in the systems of the present invention to remove moisture and are most preferably classified according to pore size as types 3A, 4A, 5A and 13X.

The amount that the moisture removing material, and particularly the moisture-removing molecular sieve, and even more preferably sodium aluminosilicate molecular sieve, is preferably from about 15 pphl to about 60 pphl by weight, and even more preferably from about 30 pphl to 45 pphl by weight.

d. Activated Alumina

Examples of activated alumina that applicants have found to be effective according to the present invention and commercially available include those sodium activated aluminas sold under the trade designation F200 by BASF and by Honeywell/UOP under the trade designation CLR-204. Applicants have found that activated alumina in general and the above-mentioned sodium activated aluminas in particular are especially effective for sequestering the types of acidic detrimental materials that are produced in connection with the refrigerant compositions and heat transfer methods and systems of the present invention.

When the sequestration material comprises activated alumina, the activated alumina may be present in an amount of from about 1 pphl to about 60 pphl, or from about 5 pphl to about 60 pphl by weight.

e. Combinations of Sequestration Materials

The composition of the invention may comprise a combination of sequestration materials.

For example, the sequestration material may comprise at least (i) copper or a copper alloy, and (ii) a molecular sieve (e.g. a zeolite) comprising copper, silver, lead or a combination thereof.

In preferred embodiments, which produce unexpected results, including when the exposure is conducted at temperatures both above and below 30 C, the sequestration material may comprise (i) a molecular sieve (e.g. a zeolite) comprising copper, silver, lead or a combination thereof, and (ii) an anion exchange resin.

Alternatively, the sequestration material may comprise (i) copper or a copper alloy, and (ii) an anion exchange resin.

When the combination of sequestration materials comprises an anion exchange resin, the anion exchange resin preferably is present in an amount of from about 1 pphl to about 25 pphl, such as from about 2 pphl to about 20 pphl based on the total amount of anion exchange resin and lubricant in the system.

Preferably, when the combination of sequestration materials comprises an anion exchange resin, the anion exchange resin is present in an amount of at least about 10 pphl, or at least about 15 pphl based on the total amount of anionic exchange resin and lubricant present in the system. Thus, the anion exchange resin may be present in an amount of from about 10 pphl to about 25 pphl, or from about 15 pphl to about 20 pphl relative to the total amount of anion exchange resin and lubricant present in the system).

It will be appreciated that the anion exchange resin may be present in an amount of about 4 pphl or about 16 pphl relative to the total amount of anionic exchange resin and lubricant present in the system).

The amount of anion exchange resin described herein refers to the dry weight of the anion exchange resin. As used herein, the term "dry weight" of the sequestration materials means that the material has 50 ppm or less of moisture.

When the combination of sequestration materials comprises a molecular sieve (e.g. a zeolite) comprising copper, silver, lead or a combination thereof, the molecular sieve (e.g. zeolite) may be present in an amount of from about 1 pphl to about 30 pphl, such as from about 2 pphl to about 25 pphl based on the total amount of molecular sieve (e.g. zeolite) and lubricant present in the system.

Preferably, when the combination of sequestration materials comprises a molecular sieve (e.g. zeolite), the molecular sieve (e.g. zeolite) is present in an amount of at least about 15 pphl, or at least about 18 pphl relative to the total amount of molecular sieve (e.g. zeolite) and lubricant present in the system. Therefore, the molecular sieve (e.g. zeolite) may be present in an amount of from about 15 pphl to about 30 pphl, or from about 18 pphl to about 25 pphl relative to the total amount of molecular sieve (e.g. zeolite) and lubricant present in the system. It will be appreciated that the molecular sieve (e.g. zeolite) may be present in an amount of about 5 pphl or about 21 pphl based on the total amount of molecular sieve (e.g. zeolite) and lubricant present in the system.

The amount of molecular sieve (e.g. zeolite) described herein refers to the dry weight of the metal zeolite.

When the combination of sequestration materials comprises copper or a copper alloy, the copper or copper alloy may have a surface area of from about 0.01 $m^2$ to about 1.5 $m^2$ per kg of refrigerant, or from about 0.02 $m^2$ to about 0.5 $m^2$ per kg of refrigerant.

It will be appreciated that the copper or copper alloy may have a surface area of about 0.08 $m^2$ per kg of refrigerant.

When a combination of sequestration materials is present, the materials may be provided in any ratio relative to each other.

For example, when the sequestration material comprises an anion exchange resin and a molecular sieve (e.g. a zeolite), the weight ratio (when dry) of anion exchange resin to molecular sieve (e.g. zeolite) is preferably in the range of from about 10:90 to about 90:10, from about 20:80 to about 80:20, from about 25:75 to about 75:25, from about 30:70 to about 70:30, or from about 60:40 to about 40:60. Exemplary weight ratios of anion exchange resin to metal zeolite include about 25:75, about 50:50 and about 75:25

Uses, Equipment and Systems

In preferred embodiments, residential air conditioning systems and methods have refrigerant evaporating temperatures in the range of from about 0° C. to about 10° C. and the condensing temperature is in the range of about 40° C. to about 70° C.

In preferred embodiments, residential air conditioning systems and methods used in a heating mode have refrigerant evaporating temperatures in the range of from about −20° C. to about 3° C. and the condensing temperature is in the range of about 35° C. to about 50° C.

In preferred embodiments, commercial air conditioning systems and methods have refrigerant evaporating temperatures in the range of from about 0° C. to about 10° C. and the condensing temperature is in the range of about 40° C. to about 70° C.

In preferred embodiments, hydraulic system systems and methods have refrigerant evaporating temperatures in the range of from about −20° C. to about 3° C. and the condensing temperature is in the range of about 50° C. to about 90° C.

In preferred embodiments, medium temperature systems and methods have refrigerant evaporating temperatures in the range of from about −12° C. to about 0° C. and the condensing temperature is in the range of about 40° C. to about 70° C.

In preferred embodiments, low temperature systems and methods have refrigerant evaporating temperatures in the range of from about −40° C. to about −12° C. and the condensing temperature is in the range of about 40° C. to about 70° C.

In preferred embodiments, rooftop air conditioning systems and methods have refrigerant evaporating temperatures in the range of from about 0° C. to about 10° C. and the condensing temperature is in the range of about 40° C. to about 70° C.

In preferred embodiments, VRF systems and methods have refrigerant evaporating temperatures in the range of from about 0° C. to about 10° C. and the condensing temperature is in the range of about 40° C. to about 70° C.

The present invention includes the use of a heat transfer composition comprising Refrigerant 1, in a residential air conditioning system.

The present invention therefore includes the use of a heat transfer composition comprising Refrigerant 2, in a residential air conditioning system.

The present invention therefore includes the use of a heat transfer composition comprising Refrigerant 3, in a residential air conditioning system.

The present invention therefore includes the use of a heat transfer composition comprising Refrigerant 4, in a residential air conditioning system.

The present invention therefore includes the use of a heat transfer composition comprising Refrigerant 5, in a residential air conditioning system.

The present invention therefore includes the use of a heat transfer composition comprising Refrigerant 6, in a residential air conditioning system.

The present invention therefore includes the use of a heat transfer composition comprising Refrigerant 7, in a residential air conditioning system.

The present invention therefore includes the use of a heat transfer composition comprising Refrigerant 8, in a residential air conditioning system.

The present invention therefore includes the use of a heat transfer composition comprising Refrigerant 9, in a residential air conditioning system.

The present invention therefore includes the use of a heat transfer composition comprising Refrigerant 10, in a residential air conditioning system.

The present invention therefore includes the use of a heat transfer composition comprising Refrigerant 11, in a residential air conditioning system.

The present invention therefore includes the use of a heat transfer composition comprising Refrigerant 12, in a residential air conditioning system.

The present invention therefore includes the use of a heat transfer composition comprising Refrigerant 13, in a residential air conditioning system.

The present invention therefore includes the use of a heat transfer composition comprising Refrigerant 14, in a residential air conditioning system.

The present invention therefore includes the use of a heat transfer composition comprising Refrigerant 15, in a residential air conditioning system.

The present invention therefore includes the use of a heat transfer composition comprising Refrigerant 16, in a residential air conditioning system.

The present invention therefore includes the use of a heat transfer composition comprising Refrigerant 17, in a residential air conditioning system.

The present invention therefore includes the use of a heat transfer composition comprising Refrigerant 18, in a residential air conditioning system.

The present invention therefore includes the use of a heat transfer composition comprising Refrigerant 19, in a residential air conditioning system.

The present invention therefore includes the use of a heat transfer composition comprising Refrigerant 20, in a residential air conditioning system.

The present invention therefore includes the use of a heat transfer composition comprising Refrigerant 21, in a residential air conditioning system.

The present invention therefore includes the use of a heat transfer composition comprising Refrigerant 22, in a residential air conditioning system.

The present invention therefore includes the use of a heat transfer composition comprising Refrigerant 23, in a residential air conditioning system.

The present invention therefore includes the use of a heat transfer composition comprising Refrigerant 24, in a residential air conditioning system.

The present invention therefore includes the use of a heat transfer composition comprising Refrigerant 25, in a residential air conditioning system.

The present invention therefore includes the use of a heat transfer composition comprising Refrigerant 26, in a residential air conditioning system.

The present invention therefore includes the use of a heat transfer composition comprising Refrigerant 27, in a residential air conditioning system.

The present invention therefore includes the use of a heat transfer composition comprising Refrigerant 28, in a residential air conditioning system.

The present invention therefore includes the use of a heat transfer composition comprising Refrigerant 29, in a residential air conditioning system.

The present invention therefore includes the use of a heat transfer composition comprising Refrigerant 30, in a residential air conditioning system.

The present invention therefore includes the use of a heat transfer composition comprising Refrigerant 31, in a residential air conditioning system.

The present invention therefore includes the use of a heat transfer composition comprising Refrigerant 32, in a residential air conditioning system.

The present invention therefore includes the use of a heat transfer composition comprising Refrigerant 33, in a residential air conditioning system.

The present invention therefore includes the use of a heat transfer composition comprising Refrigerant 34, in a residential air conditioning system.

The present invention therefore includes the use of a heat transfer composition comprising Refrigerant 35, in a residential air conditioning system.

The present invention therefore includes the use of a heat transfer composition comprising Refrigerant 36, in a residential air conditioning system.

The present invention therefore includes the use of a heat transfer composition comprising Refrigerant 37, in a residential air conditioning system.

The present invention therefore includes the use of a heat transfer composition comprising Refrigerant 38, in a residential air conditioning system.

The present invention therefore includes the use of a heat transfer composition comprising Refrigerant 39, in a residential air conditioning system.

The present invention therefore includes the use of a heat transfer composition comprising Refrigerant 1, in a chiller system.

The present invention therefore includes the use of a heat transfer composition comprising Refrigerant 2, in a chiller system.

The present invention therefore includes the use of a heat transfer composition comprising Refrigerant 3, in a chiller system.

The present invention therefore includes the use of a heat transfer composition comprising Refrigerant 4, in a chiller system.

The present invention therefore includes the use of a heat transfer composition comprising Refrigerant 5, in a chiller system.

The present invention therefore includes the use of a heat transfer composition comprising Refrigerant 6, in a chiller system.

The present invention therefore includes the use of a heat transfer composition comprising Refrigerant 7, in a chiller system.

The present invention therefore includes the use of a heat transfer composition comprising Refrigerant 8, in a chiller system.

The present invention therefore includes the use of a heat transfer composition comprising Refrigerant 9, in a chiller system.

The present invention therefore includes the use of a heat transfer composition comprising Refrigerant 10, in a chiller system.

The present invention therefore includes the use of a heat transfer composition comprising Refrigerant 11, in a chiller system.

The present invention therefore includes the use of a heat transfer composition comprising Refrigerant 12, in a chiller system.

The present invention therefore includes the use of a heat transfer composition comprising Refrigerant 13, in a chiller system.

The present invention therefore includes the use of a heat transfer composition comprising Refrigerant 14, in a chiller system.

The present invention therefore includes the use of a heat transfer composition comprising Refrigerant 15, in a chiller system.

The present invention therefore includes the use of a heat transfer composition comprising Refrigerant 16, in a chiller system.

The present invention therefore includes the use of a heat transfer composition comprising Refrigerant 17, in a chiller system.

The present invention therefore includes the use of a heat transfer composition comprising Refrigerant 18, in a chiller system.

The present invention therefore includes the use of a heat transfer composition comprising Refrigerant 19, in a chiller system.

The present invention therefore includes the use of a heat transfer composition comprising Refrigerant 20, in a chiller system.

The present invention therefore includes the use of a heat transfer composition comprising Refrigerant 21, in a chiller system.

The present invention therefore includes the use of a heat transfer composition comprising Refrigerant 22, in a chiller system.

The present invention therefore includes the use of a heat transfer composition comprising Refrigerant 23, in a chiller system.

The present invention therefore includes the use of a heat transfer composition comprising Refrigerant 24, in a chiller system.

The present invention therefore includes the use of a heat transfer composition comprising Refrigerant 25, in a chiller system.

The present invention therefore includes the use of a heat transfer composition comprising Refrigerant 26, in a chiller system.

The present invention therefore includes the use of a heat transfer composition comprising Refrigerant 27, in a chiller system.

The present invention therefore includes the use of a heat transfer composition comprising Refrigerant 28, in a chiller system.

The present invention therefore includes the use of a heat transfer composition comprising Refrigerant 29, in a chiller system.

The present invention therefore includes the use of a heat transfer composition comprising Refrigerant 30, in a chiller system.

The present invention therefore includes the use of a heat transfer composition comprising Refrigerant 31, in a chiller system.

The present invention therefore includes the use of a heat transfer composition comprising Refrigerant 32, in a chiller system.

The present invention therefore includes the use of a heat transfer composition comprising Refrigerant 33, in a chiller system.

The present invention therefore includes the use of a heat transfer composition comprising Refrigerant 34, in a chiller system.

The present invention therefore includes the use of a heat transfer composition comprising Refrigerant 35, in a chiller system.

The present invention therefore includes the use of a heat transfer composition comprising Refrigerant 36, in a chiller system.

The present invention therefore includes the use of a heat transfer composition comprising Refrigerant 37, in a chiller system.

The present invention therefore includes the use of a heat transfer composition comprising Refrigerant 38, in a chiller system.

The present invention therefore includes the use of a heat transfer composition comprising Refrigerant 39, in a chiller system.

Examples of commonly used compressors, for the purposes of this invention include reciprocating, rotary (including rolling piston and rotary vane), scroll, screw, and centrifugal compressors. Thus, the present invention provides each and any of the refrigerants and/or heat transfer compositions as described herein for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the refrigerants and/or heat transfer compositions as described herein for use in a heat transfer system comprising a capillary tube, a fixed orifice, a thermal expansion valve or an electronic expansion valve.

For the purposes of this invention, the evaporator and the condenser can each be in the form a heat exchanger, preferably selected from a finned tube heat exchanger, a microchannel heat exchanger, a shell and tube, a plate heat exchanger, and a tube-in-tube heat exchanger. Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The systems of the present invention thus preferably include a sequestration material in contact with at least a portion of a refrigerant and/or at least a portion of a the lubricant according to the present invention wherein the temperature of said sequestration material and/or the temperature of said refrigerant and/or the temperature of said lubricant when in said contact are at a temperature that is preferably at least about 10 C wherein the sequestration material preferably comprises a combination of:

an anion exchange resin,
activated alumina,
a zeolite molecular sieve comprising silver, and a moisture-removing material, preferably a moisture-removing molecular sieve.

As used in this application, the term "in contact with at least a portion" is intended in its broad sense to include each of said sequestration materials and any combination of sequestration materials being in contact with the same or separate portions of the refrigerant and/or the lubricant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

The heat transfer composition of the invention can be used in heating and cooling applications.

In a particular feature of the invention, the heat transfer composition can be used in a method of cooling comprising condensing a heat transfer composition and subsequently evaporating said composition in the vicinity of an article or body to be cooled.

Thus, the invention relates to a method of cooling in a heat transfer system comprising an evaporator, a condenser and a compressor, the process comprising i) condensing a heat transfer composition as described herein; and ii) evaporating the composition in the vicinity of body or article to be cooled;

wherein the evaporator temperature of the heat transfer system is in the range of from about −40° C. to about +10° C.

Alternatively, or in addition, the heat transfer composition can be used in a method of heating comprising condensing the heat transfer composition in the vicinity of an article or body to be heated and subsequently evaporating said composition.

Thus, the invention relates to a method of heating in a heat transfer system comprising an evaporator, a condenser and a compressor, the process comprising i) condensing a heat transfer composition as described herein, in the vicinity of a body or article to be heated and ii) evaporating the composition;

wherein the evaporator temperature of the heat transfer system is in the range of about −30° C. to about 5° C.

The heat transfer composition of the invention is provided for use in air conditioning applications including both transport and stationary air conditioning applications. Thus, any of the heat transfer compositions described herein can be used in any one of:

an air conditioning application including mobile air conditioning, particularly in trains and buses conditioning, a mobile heat pump, particularly an electric vehicle heat pump;

a chiller, particularly a positive displacement chiller, more particularly an air cooled or water cooled direct expansion chiller, which is either modular or conventionally singularly packaged, a residential air conditioning system, particularly a ducted split or a ductless split air conditioning system, a residential heat pump, a residential air to water heat pump/hydronic system, an industrial air conditioning system a commercial air conditioning system, particularly a packaged rooftop unit and a variable refrigerant flow (VRF) system;

a commercial air source, water source or ground source heat pump system.

The heat transfer composition of the invention is provided for use in a refrigeration system. The term "refrigeration system" refers to any system or apparatus or any part or portion of such a system or apparatus which employs a refrigerant to provide cooling. Thus, any of the heat transfer compositions described herein can be used in any one of:

a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Each of the heat transfer compositions described herein, including heat transfer compositions containing any one of Refrigerants 1-39, is particularly provided for use in a residential air-conditioning system (with an evaporator temperature in the range of about 0 to about 10° C., particularly about 7° C. for cooling and/or in the range of about −20 to about 3° C., particularly about 0.5° C. for heating). Alternatively, or additionally, each of the heat transfer compositions described herein, including each of Refrigerants 1-39, is particularly provided for use in a residential air conditioning system with a reciprocating, rotary (rolling-piston or rotary vane) or scroll compressor.

Each of the heat transfer compositions described, including heat transfer compositions containing any one of Refrigerants 1-39, is particularly provided for use in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein, including heat transfer compositions containing any one of Refrigerants 1-39, is particularly provided for use in a residential air to water heat pump hydronic system (with an evaporator temperature in the range of about −20 to about 3° C., particularly about 0.5° C. or with an evaporator temperature in the range of about −30 to about 5° C., particularly about 0.5° C.).

Each of the heat transfer compositions described herein, including heat transfer compositions containing any one of Refrigerants 1-39, is particularly provided for use in a medium temperature refrigeration system (with an evaporator temperature in the range of about −12 to about 0° C., particularly about −8° C.).

Each of the heat transfer compositions described herein, including heat transfer compositions containing any one of Refrigerants 1-39, is particularly provided for use in a low temperature refrigeration system (with an evaporator temperature in the range of about −40 to about −12° C., particularly about from about −40° C. to about −23° C. or preferably about −32° C.).

The heat transfer composition of the invention, including heat transfer compositions containing any one of Refrigerants 1-39, is provided for use in a residential air conditioning system, wherein the residential air-conditioning system is used to supply cool air (said air having a temperature of for example, about 10° C. to about 17° C., particularly about 12° C.) to buildings for example, in the summer.

The heat transfer composition of the invention, including heat transfer compositions containing any one of Refrigerants 1-39, is thus provided for use in a split residential air conditioning system, wherein the residential air-conditioning system is used to supply cool air (said air having a temperature of for example, about 10° C. to about 17° C., particularly about 12° C.).

The heat transfer composition of the invention, including heat transfer compositions containing any one of Refrigerants 1-39, is thus provided for use in a ducted split residential air conditioning system, wherein the residential air-conditioning system is used to supply cool air (said air having a temperature of for example, about 10° C. to about 17° C., particularly about 12° C.).

The heat transfer composition of the invention, including heat transfer compositions containing any one of Refrigerants 1-39, is thus provided for use in a window residential air conditioning system, wherein the residential air-conditioning system is used to supply cool air (said air having a temperature of for example, about 10° C. to about 17° C., particularly about 12° C.).

The heat transfer composition of the invention, including heat transfer compositions containing any one of Refrigerants 1-39, is thus provided for use in a portable residential air conditioning system, wherein the residential air-conditioning system is used to supply cool air (said air having a temperature of for example, about 10° C. to about 17° C., particularly about 12° C.).

The residential air conditions systems as described herein, including in the immediately preceeding paragraphs, preferably have an air-to-refrigerant evaporator (indoor coil), a compressor, an air-to-refrigerant condenser (outdoor coil), and an expansion valve. The evaporator and condenser can be round tube plate fin, a finned tube or microchannel heat exchanger. The compressor can be a reciprocating or rotary (rolling-piston or rotary vane) or scroll compressor. The expansion valve can be a capillary tube, thermal or electronic expansion valve. The refrigerant evaporating temperature is preferably in the range of 0 to 10° C. The condensing temperature is preferably in the range of 40 to 70° C.

The heat transfer composition of the invention, including heat transfer compositions containing any one of Refrigerants 1-39, is provided for use in a residential heat pump system, wherein the residential heat pump system is used to supply warm air (said air having a temperature of for example, about 18° C. to about 24° C., particularly about 21° C.) to buildings in the winter. It can be the same system as the residential air-conditioning system, while in the heat pump mode the refrigerant flow is reversed and the indoor coil becomes condenser and the outdoor coil becomes evaporator. Typical system types are split and mini-split heat pump system. The evaporator and condenser are usually a round tube plate fin, a finned or microchannel heat exchanger. The compressor is usually a reciprocating or rotary (rolling-piston or rotary vane) or scroll compressor. The expansion valve is usually a thermal or electronic expansion valve. The refrigerant evaporating temperature is preferably in the range of about −20 to about 3° C. or about −30 to about 5° C. The condensing temperature is preferably in the range of about 35 to about 50° C.

The heat transfer composition of the invention, including heat transfer compositions containing any one of Refrigerants 1-39, is provided for use in a commercial air-conditioning system wherein the commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0 to about 10° C. The condensing temperature is preferably in the range of about 40 to about 70° C.

The heat transfer composition of the invention, including heat transfer compositions containing any one of Refrigerants 1-39, is provided for use in a residential air-to-water heat pump hydronic system, wherein the residential air-to-water heat pump hydronic system is used to supply hot water (said water having a temperature of for example about 50° C. or about 55° C.) to buildings for floor heating or similar applications in the winter. The hydronic system usually has a round tube plate fin, a finned tube or microchannel evaporator to exchange heat with ambient air, a reciprocating, scroll or rotary compressor, a plate, tube-in-tube or shell-in-tube condenser to heat the water, and a thermal or electronic expansion valve. The refrigerant evaporating temperature is preferably in the range of about −20 to about 3° C., or −30 to about 5° C. The condensing temperature is preferably in the range of about 50 to about 90° C.

The heat transfer composition of the invention, including heat transfer compositions containing any one of Refrigerants 1-39, is provided for use in a medium temperature refrigeration system, wherein the refrigerant has and evaporating temperature preferably in the range of about −12 to about 0° C., and in such systems the refrigerant has a condensing temperature preferably in the range of about 40 to about 70° C., or about 20 to about 70° C.

The present invention thus provides a medium temperature refrigeration system used to chill food or beverages, such as in a refrigerator or a bottle cooler, wherein the refrigerant has an evaporating temperature preferably in the range of about −12 to about 0° C., and in such systems the refrigerant has a condensing temperature preferably in the range of about 40 to about 70° C., or about 20 to about 70° C.

The medium temperature systems of the present invention, including the systems as described in the immediately preceeding paragraphs, preferably have an air-to-refrigerant evaporator to provide chilling, for example to the food or beverage contained therein, a reciprocating, scroll or screw or rotary compressor, an air-to-refrigerant condenser to exchange heat with the ambient air, and a thermal or electronic expansion valve. The heat transfer composition of the invention, including heat transfer compositions containing any one of Refrigerants 1-39, is provided for use in a low temperature refrigeration system, wherein the refrigerant has an evaporating temperature that is preferably in the range of about −40 to about −12° C. and the refrigerant has a condensing temperature that is preferably in the range of about 40 to about 70° C., or about 20 to about 70° C.

The present invention thus provides a low temperature refrigeration system used to provide cooling in a freezer wherein the refrigerant has an evaporating temperature that is preferably in the range of about −40 to about −12° C. and the refrigerant has a condensing temperature that is preferably in the range of about 40 to about 70° C., or about 20 to about 70° C.

The present invention thus also provides a low temperature refrigeration system used to provide cooling in an cream machine refrigerant has an evaporating temperature that is preferably in the range of about −40 to about −12° C. and the refrigerant has a condensing temperature that is preferably in the range of about 40 to about 70° C., or about 20 to about 70° C.

The low temperature systems of the present invention, including the systems as described in the immediately preceeding paragraphs, preferably have an air-to-refrigerant evaporator to chill the food or beverage, a reciprocating, scroll or rotary compressor, an air-to-refrigerant condenser to exchange heat with the ambient air, and a thermal or electronic expansion valve.

The present invention therefore provides the use of a heat transfer composition comprising Refrigerant 1 and from 10 to 60 wt. % of a polyol ester (POE) lubricant based on the weight of the heat transfer composition, in a chiller.

The present invention therefore provides the use of a heat transfer composition comprising Refrigerant 2 and from 10 to 60 wt. % of a polyol ester (POE) lubricant based on the weight of the heat transfer composition, in a chiller.

The present invention therefore provides the use of a heat transfer composition comprising Refrigerant S and from 10 to 60 wt. % of a polyol ester (POE) lubricant based on the weight of the heat transfer composition, in a chiller.

The present invention therefore provides the use of a heat transfer composition comprising Refrigerant 4 and from 10 to 60 wt. % of a polyol ester (POE) lubricant based on the weight of the heat transfer composition, in a chiller.

The present invention therefore provides the use of a heat transfer composition comprising Refrigerant 5 and from 10 to 60 wt. % of a polyol ester (POE) lubricant based on the weight of the heat transfer composition, in a chiller.

The present invention therefore provides the use of a heat transfer composition comprising Refrigerant 1 and a stabilizer composition comprising farnesene and Alkylated Naphthalene 4, and BHT wherein the farnesene is provided in an amount of from about 0.001% by weight to about 5% by weight, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition, in a chiller.

The present invention therefore provides the use of a heat transfer composition comprising Refrigerant 2 and a stabilizer composition comprising farnesene and Alkylated Naphthalene 4, and BHT wherein the farnesene is provided in an amount of from about 0.001% by weight to about 5% by weight based on the weight of the heat transfer composition, the Alkylated Naphthalene 4, is provided in an amount of from about 0.001% by weight to about 5% by weight based on the weight of the heat transfer composition and the BHT is provided in an amount of from about 0.001% by weight to about 5% by weight based on the weight of heat transfer composition, in a chiller.

The present invention therefore provides the use of a heat transfer composition comprising Refrigerant 3 and a stabilizer composition comprising farnesene and Alkylated Naphthalene 4 and BHT wherein the farnesene is provided in an amount of from about 0.001% by weight to about 5% by weight based on the weight of the heat transfer composition, the Alkylated Naphthalene 4, is provided in an amount of from about 0.001% by weight to about 5% by weight based on the weight of the heat transfer composition and the BHT is provided in an amount of from about 0.001% by weight to about 5% by weight based on the weight of heat transfer composition in a chiller.

The present invention therefore provides the use of a heat transfer composition comprising Refrigerant 4 and a stabilizer composition comprising farnesene and Alkylated Naphthalene 4, and BHT wherein the farnesene is provided in an amount of from about 0.001% by weight to about 5% by weight based on the weight of the heat transfer composition, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition in a chiller.

The present invention therefore provides the use of a heat transfer composition comprising a Refrigerant Sand a stabilizer composition comprising farnesene and Alkylated Naphthalene 4, and BHT wherein the farnesene is provided in an amount of from about 0.001% by weight to about 5% by weight based on the weight of the heat transfer composition, the Alkylated Naphthalene 4, is provided in an amount of from about 0.001% by weight to about 5% by weight based on the weight of the heat transfer composition and the BHT is provided in an amount of from about 0.001% by weight to about 5% by weight based on the weight of heat transfer composition in a chiller.

For the purposes of this invention, each heat transfer composition in accordance with the present invention is provided for use in a chiller with an evaporating temperature in the range of about 0 to about 10° C. and a condensing temperature in the range of about 40 to about 70° C. The chiller is provided for use in air conditioning or refrigeration, and preferably for commercial air conditioning. The chiller is preferably a positive displacement chiller, more particularly an air cooled or water cooled direct expansion chiller, which is either modular or conventionally singularly packaged.

The present invention therefore provides the use of a heat transfer composition comprising Refrigerant 1 in stationary air conditioning, particularly residential air conditioning, industrial air conditioning or commercial air conditioning.

The present invention therefore provides the use of a heat transfer composition comprising Refrigerant 2 in stationary air conditioning, particularly residential air conditioning, industrial air conditioning or commercial air conditioning.

The present invention therefore provides the use of a heat transfer composition comprising Refrigerant 3 in stationary air conditioning, particularly residential air conditioning, industrial air conditioning or commercial air conditioning.

The present invention therefore provides the use of a heat transfer composition comprising Refrigerant 4 in stationary air conditioning, particularly residential air conditioning, industrial air conditioning or commercial air conditioning.

The present invention therefore provides the use of a heat transfer composition comprising Refrigerant 5 in stationary air conditioning, particularly residential air conditioning, industrial air conditioning or commercial air conditioning.

The present invention therefore provides the use of a heat transfer composition comprising Refrigerant 1 and from 10 to 60 wt. % of a polyol ester (POE) lubricant based on the weight of the heat transfer composition, in stationary air conditioning, particularly residential air conditioning, industrial air conditioning or commercial air conditioning.

The present invention therefore provides the use of a heat transfer composition comprising Refrigerant 2 and from 10 to 60 wt. % of a polyol ester (POE) lubricant based on the weight of the heat transfer composition, in stationary air conditioning, particularly residential air conditioning, industrial air conditioning or commercial air conditioning.

The present invention therefore provides the use of a heat transfer composition comprising Refrigerant Sand from 10 to 60 wt. % of a polyol ester (POE) lubricant based on the weight of the heat transfer composition, in stationary air conditioning, particularly residential air conditioning, industrial air conditioning or commercial air conditioning.

The present invention therefore provides the use of a heat transfer composition comprising Refrigerant 4; and from 10 to 60 wt. % of a polyol ester (POE) lubricant based on the weight of the heat transfer composition, in stationary air conditioning, particularly residential air conditioning, industrial air conditioning or commercial air conditioning.

The present invention therefore provides the use of a heat transfer composition comprising Refrigerant 5 and from 10 to 60 wt. % of a polyol ester (POE) lubricant based on the weight of the heat transfer composition, in stationary air conditioning, particularly residential air conditioning, industrial air conditioning or commercial air conditioning.

The present invention therefore provides the use of a heat transfer composition comprising Refrigerant 1 and a stabilizer composition comprising farnesene and Alkylated Naphthalene 4, and BHT wherein the farnesene is provided in an amount of from about 0.001% by weight to about 5% by weight based on the weight of the heat transfer composition, the Alkylated Naphthalene 4, is provided in an amount of from about 0.001% by weight to about 5% by weight based on the weight of the heat transfer composition and the BHT is provided in an amount of from about 0.001% by weight to about 5% by weight based on the weight of heat transfer composition, in stationary air conditioning, particularly residential air conditioning, industrial air conditioning or commercial air conditioning.

The present invention therefore provides the use of a heat transfer composition comprising Refrigerant 2 and a stabilizer composition comprising farnesene and Alkylated Naphthalene 4 and BHT wherein the farnesene is provided in an amount of from about 0.001% by weight to about 5% by weight based on the weight of the heat transfer composition, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition in stationary air conditioning, particularly residential air conditioning, industrial air conditioning or commercial air conditioning.

The present invention therefore provides the use of a heat transfer composition comprising Refrigerant Sand a stabilizer composition comprising farnesene and Alkylated Naphthalene 4 and BHT wherein the farnesene is provided in an amount of from about 0.001% by weight to about 5% by weight based on the weight of the heat transfer composition, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition in stationary air conditioning, particularly residential air conditioning, industrial air conditioning or commercial air conditioning.

The present invention therefore provides the use of a heat transfer composition comprising Refrigerant 4 and a stabilizer composition comprising farnesene and Alkylated Naphthalene 4 and BHT wherein the farnesene is provided in an amount of from about 0.001% by weight to about 5% by weight based on the weight of the heat transfer composition, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition in stationary air conditioning, particularly residential air conditioning, industrial air conditioning or commercial air conditioning.

The present invention therefore provides the use of a heat transfer composition comprising Refrigerant 5 and a stabilizer composition comprising farnesene and Alkylated Naphthalene 4 and BHT wherein the farnesene is provided in an amount of from about 0.001% by weight to about 5% by weight based on the weight of the heat transfer composition, the Alkylated Naphthalene 4 is provided in an amount of from about 0.001% by weight to about 5% by weight based on the weight of the heat transfer composition and the BHT is provided in an amount of from about 0.001% by weight to about 5% by weight based on the weight of heat transfer composition in stationary air conditioning, particularly residential air conditioning, industrial air conditioning or commercial air conditioning.

The present invention therefore provides the use of a heat transfer composition comprising Refrigerant 1 Stabilizer 10 and Lubricant 1 in stationary air conditioning, particularly residential air conditioning, industrial air conditioning or commercial air conditioning.

The present invention therefore provides the use of a heat transfer composition comprising Refrigerant 2, Stabilizer 10 and Lubricant 1 in stationary air conditioning, particularly residential air conditioning, industrial air conditioning or commercial air conditioning.

The present invention therefore provides the use of a heat transfer composition comprising Refrigerant 3, Stabilizer 10 and Lubricant 1 in stationary air conditioning, particularly residential air conditioning, industrial air conditioning or commercial air conditioning.

The present invention therefore provides the use of a heat transfer composition comprising Refrigerant 4, Stabilizer 10 and Lubricant 1 in stationary air conditioning, particularly residential air conditioning, industrial air conditioning or commercial air conditioning.

The present invention therefore provides the use of a heat transfer composition comprising Refrigerant 5, Stabilizer 10 and Lubricant 1 in stationary air conditioning, particularly residential air conditioning, industrial air conditioning or commercial air conditioning.

The present invention therefore provides the use of a heat transfer composition comprising Refrigerant 6, Stabilizer 10 and Lubricant 1 in stationary air conditioning, particularly residential air conditioning, industrial air conditioning or commercial air conditioning.

The present invention therefore provides the use of a heat transfer composition comprising Refrigerant 7, Stabilizer 10 and Lubricant 1 in stationary air conditioning, particularly residential air conditioning, industrial air conditioning or commercial air conditioning.

The present invention therefore provides the use of a heat transfer composition comprising Refrigerant 8, Stabilizer 10 and Lubricant 1 in stationary air conditioning, particularly residential air conditioning, industrial air conditioning or commercial air conditioning.

The present invention therefore provides the use of a heat transfer composition comprising Refrigerant 9, Stabilizer 10 and Lubricant 1 in stationary air conditioning, particularly residential air conditioning, industrial air conditioning or commercial air conditioning.

The present invention therefore provides the use of a heat transfer composition comprising Refrigerant 10, Stabilizer 10 and Lubricant 1 in stationary air conditioning, particularly residential air conditioning, industrial air conditioning or commercial air conditioning.

The present invention therefore provides the use of a heat transfer composition comprising Refrigerant 11, Stabilizer 10 and Lubricant 1 in stationary air conditioning, particularly residential air conditioning, industrial air conditioning or commercial air conditioning.

The present invention therefore provides the use of a heat transfer composition comprising Refrigerant 12, Stabilizer 10 and Lubricant 1 in stationary air conditioning, particularly residential air conditioning, industrial air conditioning or commercial air conditioning.

The present invention therefore provides the use of a heat transfer composition comprising Refrigerant 13, Stabilizer 10 and Lubricant 1 in stationary air conditioning, particularly residential air conditioning, industrial air conditioning or commercial air conditioning.

The present invention therefore provides the use of a heat transfer composition comprising Refrigerant 14, Stabilizer 10 and Lubricant 1 in stationary air conditioning, particularly residential air conditioning, industrial air conditioning or commercial air conditioning.

The present invention therefore provides the use of a heat transfer composition comprising Refrigerant 15, Stabilizer 10 and Lubricant 1 in stationary air conditioning, particularly residential air conditioning, industrial air conditioning or commercial air conditioning.

The present invention therefore provides the use of a heat transfer composition comprising Refrigerant 16, Stabilizer 10 and Lubricant 1 in stationary air conditioning, particularly residential air conditioning, industrial air conditioning or commercial air conditioning.

The present invention therefore provides the use of a heat transfer composition comprising Refrigerant 17, Stabilizer 10 and Lubricant 1 in stationary air conditioning, particularly residential air conditioning, industrial air conditioning or commercial air conditioning.

The present invention therefore provides the use of a heat transfer composition comprising Refrigerant 18, Stabilizer 10 and Lubricant 1 in stationary air conditioning, particularly residential air conditioning, industrial air conditioning or commercial air conditioning.

The present invention therefore provides the use of a heat transfer composition comprising Refrigerant 19, Stabilizer 10 and Lubricant 1 in stationary air conditioning, particularly residential air conditioning, industrial air conditioning or commercial air conditioning.

The present invention therefore provides the use of a heat transfer composition comprising Refrigerant 20, Stabilizer 10 and Lubricant 1 in stationary air conditioning, particularly residential air conditioning, industrial air conditioning or commercial air conditioning.

The present invention therefore provides the use of a heat transfer composition comprising Refrigerant 21, Stabilizer 10 and Lubricant 1 in stationary air conditioning, particularly residential air conditioning, industrial air conditioning or commercial air conditioning.

The present invention therefore provides the use of a heat transfer composition comprising Refrigerant 22, Stabilizer 10 and Lubricant 1 in stationary air conditioning, particularly residential air conditioning, industrial air conditioning or commercial air conditioning.

The present invention therefore provides the use of a heat transfer composition comprising Refrigerant 23, Stabilizer 10 and Lubricant 1 in stationary air conditioning, particularly residential air conditioning, industrial air conditioning or commercial air conditioning.

The present invention therefore provides the use of a heat transfer composition comprising Refrigerant 24, Stabilizer 10 and Lubricant 1 in stationary air conditioning, particularly residential air conditioning, industrial air conditioning or commercial air conditioning.

The present invention therefore provides the use of a heat transfer composition comprising Refrigerant 25, Stabilizer 10 and Lubricant 1 in stationary air conditioning, particularly residential air conditioning, industrial air conditioning or commercial air conditioning.

The present invention therefore provides the use of a heat transfer composition comprising Refrigerant 26, Stabilizer 10 and Lubricant 1 in stationary air conditioning, particularly residential air conditioning, industrial air conditioning or commercial air conditioning.

The present invention therefore provides the use of a heat transfer composition comprising Refrigerant 27, Stabilizer 10 and Lubricant 1 in stationary air conditioning, particularly residential air conditioning, industrial air conditioning or commercial air conditioning.

The present invention therefore provides the use of a heat transfer composition comprising Refrigerant 28, Stabilizer 10 and Lubricant 1 in stationary air conditioning, particularly residential air conditioning, industrial air conditioning or commercial air conditioning.

The present invention therefore provides the use of a heat transfer composition comprising Refrigerant 29, Stabilizer 10 and Lubricant 1 in stationary air conditioning, particularly residential air conditioning, industrial air conditioning or commercial air conditioning.

The present invention therefore provides the use of a heat transfer composition comprising Refrigerant 30, Stabilizer 10 and Lubricant 1 in stationary air conditioning, particularly residential air conditioning, industrial air conditioning or commercial air conditioning.

The present invention therefore provides the use of a heat transfer composition comprising Refrigerant 31, Stabilizer 10 and Lubricant 1 in stationary air conditioning, particularly residential air conditioning, industrial air conditioning or commercial air conditioning.

The present invention therefore provides the use of a heat transfer composition comprising Refrigerant 32, Stabilizer 10 and Lubricant 1 in stationary air conditioning, particularly residential air conditioning, industrial air conditioning or commercial air conditioning.

The present invention therefore provides the use of a heat transfer composition comprising Refrigerant 33, Stabilizer 10 and Lubricant 1 in stationary air conditioning, particularly residential air conditioning, industrial air conditioning or commercial air conditioning.

The present invention therefore provides the use of a heat transfer composition comprising Refrigerant 34, Stabilizer 10 and Lubricant 1 in stationary air conditioning, particularly residential air conditioning, industrial air conditioning or commercial air conditioning.

The present invention therefore provides the use of a heat transfer composition comprising Refrigerant 35, Stabilizer 10 and Lubricant 1 in stationary air conditioning, particularly residential air conditioning, industrial air conditioning or commercial air conditioning.

The present invention therefore provides the use of a heat transfer composition comprising Refrigerant 36, Stabilizer 10 and Lubricant 1 in stationary air conditioning, particularly residential air conditioning, industrial air conditioning or commercial air conditioning.

The present invention therefore provides the use of a heat transfer composition comprising Refrigerant 37, Stabilizer 10 and Lubricant 1 in stationary air conditioning, particularly residential air conditioning, industrial air conditioning or commercial air conditioning.

The present invention therefore provides the use of a heat transfer composition comprising Refrigerant 38, Stabilizer 10 and Lubricant 1 in stationary air conditioning, particularly residential air conditioning, industrial air conditioning or commercial air conditioning.

The present invention therefore provides the use of a heat transfer composition comprising Refrigerant 39, Stabilizer 10 and Lubricant 1 in stationary air conditioning, particularly residential air conditioning, industrial air conditioning or commercial air conditioning.

The present invention therefore provides the use of a heat transfer composition comprising Refrigerant 1, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 2, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 3, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 4, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 5, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 6, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 7, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 8, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 9, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 10, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 11, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 12, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 13, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 14, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 15, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 16, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 17, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 18, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 19, Stabilizer 10 and Lubricant 1 in stationary air conditioning, particularly residential air conditioning, industrial air conditioning or commercial air conditioning.

The present invention therefore provides the use of a heat transfer composition comprising Refrigerant 20, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 21, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 22, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 23, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 24, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 25, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 26, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 27, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 28, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 29, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 30, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 31, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 32, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 33, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 34, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 35, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 36, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 37, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 38, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising Refrigerant 39, Stabilizer 10 and Lubricant 1 in stationary air conditioning system, particularly residential air conditioning system, industrial air conditioning system or commercial air conditioning system, wherein the system includes Sequestration Material 3.

The present invention therefore provides the use of a heat transfer composition comprising a refrigerant of the present invention, including each of Refrigerant 1-39, a stabilizer of the present invention, including each of Stabilizer 1-10 and a lubricant, including Lubricants 1-4, in commercial refrigeration systems, particularly in a commercial refrigerator systems, commercial freezer systems, ice machine systems or vending machine systems, wherein the system includes a sequestration material of the present invention, including each Sequestration Material 1-4.

The present invention therefore provides the use of a heat transfer composition comprising Refrigerant 39, Stabilizer 10 and Lubricant 1 in commercial refrigeration systems, particularly in a commercial refrigerator systems, commercial freezer systems, ice machine systems or vending machine systems, wherein the system includes Sequestration Material 3.

For the purposes of the uses set out above, the stabilizer composition can comprise farnesene, Alkylated Naphthalene 4, and BHT. Preferably, the stabilizer composition consists essentially of farnesene, Alkylated Naphthalene 4, and BHT. Preferably, the stabilizer composition consists of farnesene, Alkylated Naphthalene 4 and BHT.

The heat transfer composition disclosed herein is provided as a low Global Warming (GWP) replacement for the refrigerant R-410A. The heat transfer compositions and the refrigerants of the present invention (including each of Refrigerants 1-39 and all heat transfer compositions containing Refrigerants 1-39)) therefore can be used as a retrofit refrigerant/heat transfer composition or as a replacement refrigerant/heat transfer composition.

The present invention thus includes methods of retrofitting existing heat transfer system designed for and containing R-410A refrigerant, without requiring substantial engineering modification of the existing system, particularly without modification of the condenser, the evaporator and/or the expansion valve.

The present invention thus also includes methods of using a refrigerant or heat transfer composition of the present invention as a replacement for R-410A, and in particular as a replacement for R-410A in residential air conditioning refrigerant, without requiring substantial engineering modification of the existing system, particularly without modification of the condenser, the evaporator and/or the expansion valve.

The present invention thus also includes methods of using a refrigerant or heat transfer composition of the present invention as a replacement for R-410A, and in particular as a replacement for R-410A in a residential air conditioning system.

The present invention thus also includes methods of using a refrigerant or heat transfer composition of the present invention as a replacement for R-410A, and in particular as a replacement for R-410A in a chiller system.

There is therefore provided a method of retrofitting an existing heat transfer system that contains R-410A refrigerant, said method comprising replacing at least a portion of the existing R-410A refrigerant with a heat transfer composition or a refrigerant of the present invention.

The step of replacing preferably comprises removing at least a substantial portion of, and preferably substantially all of, the existing refrigerant (which can be but is not limited to R-410A) and introducing a heat transfer composition or a refrigerant of the present invention, including each of Refrigerants 1-39 without any substantial modification of the system to accommodate the refrigerant of the present invention.

Alternatively, the heat transfer composition or refrigerant can be used in a method of retrofitting an existing heat transfer system designed to contain or containing R410A refrigerant, wherein the system is modified for the refrigerant of the invention.

Alternatively, the heat transfer composition or refrigerant can be used as a replacement in a heat transfer system which is designed to contain or is suitable for use with R-410A refrigerant.

It will be appreciated that when the heat transfer composition is used as a low Global Warming replacement for R-410A or is used in a method of retrofitting an existing heat transfer system or is used in a heat transfer system which is suitable for use with R-410A refrigerant, the heat transfer composition may consist essentially of the refrigerant of the invention. Alternatively, the invention encompasses the use of the refrigerant of the invention as a low Global Warming replacement for R-410A or is used in a method of retrofitting an existing heat transfer system or is used in a heat transfer system which is suitable for use with R-410A refrigerant as described herein.

It will be appreciated by the skilled person that when the heat transfer composition is provided for use in a method of retrofitting an existing heat transfer system as described above, the method preferably comprises removing at least a portion of the existing R-410A refrigerant from the system. Preferably, the method comprises removing at least about 5%, about 10%, about 25%, about 50% or about 75% by weight of the R-410A from the system and replacing it with the heat transfer compositions of the invention.

The compositions of the invention may be employed as a replacement in systems which are used or are suitable for use with R-410A refrigerant, such as existing or new heat transfer systems.

The compositions of the present invention exhibit many of the desirable characteristics of R-410A but have a GWP that is substantially lower than that of R-410A while at the same time having operating characteristics i.e. capacity and/or efficiency (COP) that are substantially similar to or substantially match, and preferably are as high as or higher than R-410A. This allows the claimed compositions to replace R-410A in existing heat transfer systems without requiring any significant system modification for example of the condenser, the evaporator and/or the expansion valve. The composition can therefore be used as a direct replacement for R-410A in heat transfer systems.

The composition of the invention therefore preferably exhibit operating characteristics compared with R-410A wherein the efficiency (COP) of the composition is from 95 to 105% of the efficiency of R-410A in the heat transfer system.

The composition of the invention therefore preferably exhibit operating characteristics compared with R-410A wherein the capacity is from 95 to 105% of the capacity of R-410A in the heat transfer system.

The composition of the invention therefore preferably exhibit operating characteristics compared with R-410A wherein the efficiency (COP) of the composition is from 95 to 105% of the efficiency of R-410A in the heat transfer system and wherein the capacity is from 95 to 105% of the capacity of R-410A in the heat transfer system.

Preferably, the composition of the invention preferably exhibit operating characteristics compared with R-410A wherein:
  the efficiency (COP) of the composition is from 100 to 105% of the efficiency of R-410A; and/or
  the capacity is from 98 to 105% of the capacity of R-410A.

in heat transfer systems, in which the compositions of the invention are to replace the R-410A refrigerant.

In order to enhance the reliability of the heat transfer system, it is preferred that the composition of the invention further exhibits the following characteristics compared with R-410A:

the discharge temperature is not greater than 10° C. higher than that of R-410A; and/or the compressor pressure ratio is from 95 to 105% of the compressor pressure ratio of R-410A in heat transfer systems, in which the composition of the invention is used to replace the R-410A refrigerant.

It will be appreciated that R-410A is an azeotrope-like composition. Thus, in order for the claimed compositions to be a good match for the operating characteristics of R-410A, the claimed compositions desirably show a low level of glide. Thus, the compositions of the claimed invention may provide an evaporator glide of less than 2° C., preferably less than 1.5° C.

The existing heat transfer compositions used with R-410A are preferably air conditioning heat transfer systems including both mobile and stationary air conditioning systems. As used here, the term mobile air conditioning systems means mobile, non-passenger car air conditioning systems, such as air conditioning systems in trucks, buses and trains. Thus, each of the heat transfer compositions as described herein can be used to replace R-410A in any one of:

an air conditioning system including a mobile air conditioning system, particularly air conditioning systems in trucks, buses and trains, a mobile heat pump, particularly an electric vehicle heat pump;

a chiller, particularly a positive displacement chiller, more particularly an air cooled or water cooled direct expansion chiller, which is either modular or conventionally singularly packaged, a residential air conditioning system, particularly a ducted split or a ductless split air conditioning system, a residential heat pump, a residential air to water heat pump/hydronic system, an industrial air conditioning system and a commercial air conditioning system particularly a packaged rooftop unit and a variable refrigerant flow (VRF) system;

a commercial air source, water source or ground source heat pump system

The composition of the invention is alternatively provided to replace R410A in refrigeration systems. Thus, each of the heat transfer compositions as described herein can be used to replace R10A in any one of:

a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Each of the heat transfer compositions described herein, including each of Refrigerants 1-Refrigerants 39, is particularly provided to replace R-410A in a residential air-conditioning system (with an evaporator temperature in the range of about 0 to about 10° C., particularly about 7° C. for cooling and/or in the range of about −20 to about 3° C. or 30 to about 5° C., particularly about 0.5° C. for heating). Alternatively, or additionally, each of the heat transfer compositions described herein including each of Refrigerants 1-Refrigerants 39, is particularly provided to replace R-410A in a residential air conditioning system with a reciprocating, rotary (rolling-piston or rotary vane) or scroll compressor.

Each of the heat transfer compositions described herein including each of Refrigerants 1-Refrigerants 39, is particularly provided to replace R-410A in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein including each of Refrigerants 1-Refrigerants 39, is particularly provided to replace R-410A in a residential air to water heat pump hydronic system (with an evaporator temperature in the range of about −20 to about 3° C. or about −30 to about 5° C., particularly about 0.5° C.).

Each of the heat transfer compositions described herein including each of Refrigerants 1-Refrigerants 39, is particularly provided to replace R-410A in a medium temperature refrigeration system (with an evaporator temperature in the range of about −12 to about 0° C., particularly about −8° C.).

Each of the heat transfer compositions described herein including each of Refrigerants 1-Refrigerants 39, is particularly provided to replace R-410A in a low temperature refrigeration system (with an evaporator temperature in the range of about −40 to about −12° C., particularly from about −40° C. to about −23° C. or preferably about −32° C.).

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising any of the refrigerants of the present invention (including any of Refrigerants 1-39), said refrigerant comprising at least about 97% by weight of a blend of three compounds, said blend consisting of:

49% by weight difluoromethane (HFC-32), 11.5% by weight pentafluoroethane (HFC-125), and 39.5% by weight trifluoroiodomethane ($CF_3I$) and optionally a stabilizer composition according to any of the stabilizer compositions described herein, including particularly Stabilizer 1.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising any heat transfer composition according to the present invention, including each heat transfer composition containing any of Refrigerants 1-39.

The invention further provides a heat transfer system comprising a compressor, a condenser and an evaporator in fluid communication, and a heat transfer composition in said system, said heat transfer composition comprising a refrigerant according to any one of the refrigerants described here including each of Refrigerants 1-Refrigerants 39.

Particularly, the heat transfer system is a residential air-conditioning system (with an evaporator temperature in the range of about 0 to about 10° C., particularly about 7° C. for cooling and/or in the range of about −20 to about 3° C. or about −30 to about 5° C., particularly about 0.5° C. for heating).

Particularly, the heat transfer system is an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Particularly, the heat transfer system is a residential air to water heat pump hydronic system (with an evaporator temperature in the range of about −20 to about 3° C. or about −30 to about 5° C., particularly about 0.5° C.).

The heat transfer system can be a refrigeration system, such as a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Example 1—Flammabilty Testing

The refrigerant composition identified in Table 1 below as Refrigerant A was tested as described herein.

TABLE 1

Refrigerant A Composition

| Refrigerant | R32 (wt. %) | R125 (wt. %) | CF3I (wt. %) |
|---|---|---|---|
| A | 49% | 11.5% | 39.5% |

The flammability testing was performed per ASHRAE's current Standard 34-2016 test protocol (condition and apparatus) using the current method ASTM E681-09 annex A1. Mixtures were made by evacuating the flask and using partial pressures in filling to the desire concentration. The air was introduced rapidly to assist in mixing and allowed to come to temperature equilibrium after mixing to allow the mixture to become stagnate before ignition was attempted The Refrigerant A evaluated in Table 1 above was found to satisfy the Non-Flammability test.

Examples 2-30 Heat Transfer Performance

Refrigerant A as described in Table 1 in Example 1 above was subjected to thermodynamic analysis to determine its ability to match the operating characteristics of R-4104A in various refrigeration systems. The analysis was performed using experimental data collected for properties of the two binary pairs CF3I with each of HFC-32 and HFC-125. In particular, the vapor/liquid equilibrium behavior of CF3I was determined and studied in a series of binary pairs with each of HFC-32 and R125. The composition of each binary pair was varied over a series of relative percentages in the experimental evaluation and the mixture parameters for each binary pair were regressed to the experimentally obtained data. The assumptions used to conduct the analysis were the following: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

Example 2.—Residential Air-Conditioning System (Cooling)

A residential air-conditioning system configured to supply cool air (about 12° C.) to buildings in the summer is tested. Residential air condition systems include split air conditioning systems, mini-split air conditioning systems, and window air-conditioning system, and the testing described herein is representative of the results from such systems. The experimental system includes an air-to-refrigerant evaporator (indoor coil), a compressor, an air-to-refrigerant condenser (outdoor coil), and an expansion valve. The operating conditions for the test are:
1. Condensing temperature=about 46° C., (corresponding outdoor ambient temperature of about 35° C.)
2. Condenser sub-cooling=about 5.5° C.
3. Evaporating temperature=about 7° C., (corresponding indoor ambient temperature of about 26.7° C.)
4. Evaporator Superheat=about 5.5° C.
5. Isentropic Efficiency=70%
6. Volumetric Efficiency=100%
7. Temperature Rise in Suction Line=about 5.5° C.

The performance results from the testing are reported in Table 2 below:

TABLE 2

Performance in Residential Air-Conditioning System (Cooling)

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| A | 98% | 102% | 99% | 95% | 7.8 | 1.11 |

Table 2 shows the thermodynamic performance of a residential air-conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 3. Residential Heat Pump System (Heating)

A residential heat pump system configured to supply warm air (about 21° C.) to buildings in the winter is tested.

The experimental system includes a residential air-conditioning system, however, when the system is in the heat pump mode the refrigerant flow is reversed and the indoor coil becomes a condenser and the outdoor coil becomes an evaporator. Residential heat pump systems include split air conditioning systems, mini-split air conditioning systems, and window air-conditioning system, and the testing described herein is representative of the results from such systems. The operating conditions for the test are:
1. Condensing temperature=about 41° C. (corresponding indoor ambient temperature of about 21.1° C.)
2. Condenser sub-cooling=about 5.5° C.
3. Evaporating temperature=about 0.5° C. (corresponding outdoor ambient temperature=8.3° C.)
4. Evaporator Superheat=about 5.5° C.
5. Isentropic Efficiency=70%
6. Volumetric Efficiency=100%
7. Temperature Rise in Suction Line=about 5.5° C.

The performance results from the testing are reported in Table 3 below:

TABLE 3

Performance in Residential Heat pump System (Heating)

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| A | 97% | 101% | 99% | 95% | 8.4 | 1.05 |

Table 3 shows the thermodynamic performance of a residential heat pump system operating with Refrigerant A of the present invention compared to R-410A in the same system. In particular, Refrigerant A exhibits a 97% capacity relative to R-410A and an efficiency of 101% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 4. Commercial Air-Conditioning System—Chiller

A commercial air-conditioning systems (chillers) configured to supply warm air (about 21° C.) to buildings in the winter is tested. Such systems supply chilled water (about 7° C.) to large buildings such as offices, hospitals, etc., and depending on the specific application, the chiller system may be running all year long. The testing described herein is representative of the results from such systems.

The operating conditions for the test are:

1. Condensing temperature=about 46° C. (corresponding outdoor ambient temperature=35° C.)

2. Condenser sub-cooling=about 5.5° C.

3. Evaporating temperature=about 4.5° C. (corresponding chilled leaving water temperature=about 7° C.)

4. Evaporator Superheat=about 5.5° C.

5. Isentropic Efficiency=70%
6. Volumetric Efficiency=100%
7. Temperature Rise in Suction Line=about 2° C.

The performance results from the testing are reported in Table 4 below:

TABLE 4

Performance in Commercial Air-Conditioning System - Air-Cooled Chiller

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| A | 98% | 102% | 99% | 95% | 8.1 | 1.08 |

Table 4 shows the thermodynamic performance of a of a commercial air-cooled chiller system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 5.—Residential Air-to-Water Heat Pump Hydronic System

A residential air-to-water heat pump hydronic system configured to supply hot water (about 50° C.) to buildings for floor heating or similar applications in the winter is tested. The testing described herein is representative of the results from such systems.

The operating conditions for the test are:
1. Condensing temperature=about 60° C. (corresponding indoor leaving water temperature=about 50° C.)
2. Condenser sub-cooling=about 5.5° C.
3. Evaporating temperature=about 0.5° C. (corresponding outdoor ambient temperature=about 8.3° C.)
4. Evaporator Superheat=about 5.5° C.
5. Isentropic Efficiency=70%
6. Volumetric Efficiency=100%
7. Temperature Rise in Suction Line=2° C.

The performance results from the testing are reported in Table 5 below:

TABLE 5

Performance in Residential Air-to-Water Heat Pump Hydronic System

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.06 |
| A | 100% | 103% | 98% | 94% | 11.6 | 0.94 |

Table 5 shows the thermodynamic performance of a residential air-to-water heat pump hydronic system operating with Refrigerant A of the present invention compared to R-410A in the same system. In particular, Refrigerant A exhibits a 100% capacity relative to R-410A and an efficiency of 103% compared to R-410A. This indicates that Refrigerant A is a drop-in or near drop-in as a replacement for R-410A in such systems and as a retrofit for R-410A in such systems. Further, Refrigerant A shows a 98% pressure ratio compared to R-410A, which indicates that the compressor efficiencies are sufficiently similar to R-410A that no changes to the compressor used with R-410A are needed. In addition, Refrigerant A shows a compressor discharge temperature rise close to 10° C. compared to R-410A. The evaporator glide of less than 2° C. for Refrigerant A indicates the evaporator glide does not affect system performance.

Example 6. Medium Temperature Refrigeration System

A medium temperature refrigeration system configured to chill food or beverages such as in a refrigerator and bottle cooler is tested. The experimental system includes an air-to-refrigerant evaporator to chill the food or beverage, a compressor, an air-to-refrigerant condenser to exchange heat with the ambient air, and an expansion valve. The testing described herein is representative of the results from such systems.

The operating conditions for the test are:

1. Condensing temperature=about 45° C. (corresponding outdoor ambient temperature=about 35° C.)

2. Condenser sub-cooling=about 5.5° C.

3. Evaporating temperature=about −8° C. (corresponding box temperature=1.7° C.)

4. Evaporator Superheat=about 5.5° C.

5. Isentropic Efficiency=65%
6. Volumetric Efficiency=100%
7. Temperature Rise in Suction Line=10° C.

The performance results from the testing are reported in Table 6 below:

TABLE 6

Performance in Medium Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.07 |
| A | 100% | 102% | 98% | 95% | 12.5 | 0.92 |

Table 6 shows the thermodynamic performance of a medium temperature refrigeration system operating with Refrigerant A of the present invention compared to R-410A in the same system. In particular, Refrigerant A exhibits a 100% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 98% pressure ratio compared to R-410A, which indicates that the compressor efficiencies are sufficiently similar to R-410A that no changes to the compressor used with R-410A are needed. In addition, Refrigerant A shows a compressor discharge temperature rise close to 10° C. compared to R-410A. The evaporator glide of less than 2° C. for Refrigerant A indicates the evaporator glide does not affect system performance.

Example 7. Low Temperature Refrigeration System

A low temperature refrigeration system configured to freeze food such as in an ice cream machine and a freezer is tested. The experimental system includes an air-to-refrigerant evaporator to cool or freeze the food or beverage, a compressor, an air-to-refrigerant condenser to exchange heat with the ambient air, and a expansion valve. The testing described herein is representative of the results from such systems. The operating conditions for the test are:
1. Condensing temperature=about 55° C. (corresponding outdoor ambient temperature=about 35° C.)
2. Condenser sub-cooling=about 5° C.
3. Evaporating temperature=about −23° C. (corresponding box temperature=1.7° C.)
4. Evaporator Superheat=about 5.5° C.
5. Isentropic Efficiency=60%
6. Volumetric Efficiency=100%
7. Temperature Rise in Suction Line=1° C.

The performance results from the testing are reported in Table 7 below:

TABLE 7

Performance in Low Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.05 |
| 1 | 104% | 105% | 97% | 94% | 20.2 | 0.69 |

Table 7 shows the thermodynamic performance of a low temperature refrigeration system operating with Refrigerant A of the present invention compared to R-410A in the same system. In particular, Refrigerant A exhibits a 104% capacity relative to R-410A and an efficiency of 105% compared to R-410A. Further, Refrigerant A shows a 94% pressure ratio compared to R-410A. The evaporator glide of less than 2° C. for Refrigerant A indicates the evaporator glide does not affect system performance.

Example 8. Commercial Air-Conditioning System—Packaged Rooftops

A packaged rooftop commercial air conditioning system configured to supply cooled or heated air to buildings is tested. The experimental system includes a packaged rooftop air-conditioning/heat pump systems and has an air-to-refrigerant evaporator (indoor coil), a compressor, an air-to-refrigerant condenser (outdoor coil), and an expansion valve. The testing described herein is representative of the results from such systems. The operating conditions for the test are:

1. Condensing temperature=about 46° C. (corresponding outdoor ambient temperature=about 35° C.)
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

The performance results from the testing are reported in Table 8 below:

TABLE 8

Performance in Commercial Air-Conditioning System - Packaged Rooftops

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| 1 | 98% | 102% | 99% | 95% | 8.1 | 1.08 |

Table 8 shows the thermodynamic performance of a rooftop commercial air conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature less than 10° C. compared to R-410A, which indicates good compressor reliability and that there is no risk of oil breakdown or motor burn-out. The evaporator glide of less than 2° C. for Refrigerant A indicates the evaporator glide does not affect system performance.

Example 9—Commercial Air-Conditioning System—Variable Refrigerant Flow Systems A commercial air-conditioning system with variable refrigerant flow is configured to supply cooled or heated air to buildings is tested. The experimental system includes multiple (4 or more) air-to-refrigerant evaporators (indoor coils), a compressor, an air-to-refrigerant condenser (outdoor coil), and an expansion valve. The testing described herein is representative of the results from such systems. The operating conditions for the test are:
1. Condensing temperature=about 46° C., Corresponding outdoor ambient temperature=35° C.
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

TABLE 9

Performance in Commercial Air-Conditioning System - Variable Refrigerant Flow Systems

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| A | 98% | 102% | 99% | 95% | 8.1 | 1.08 |

Table 9 shows the thermodynamic performance of a VRF commercial air conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature less than 10° C. compared to R-410A, which indicates good compressor reliability and that there is no risk of oil breakdown or motor burn-out. The evaporator glide of less than 2° C. for Refrigerant A indicates the evaporator glide does not affect system performance.

Example 10—Stabilizers for Heat Transfer Compositions Comprising Refrigerant and Lubricant Heat transfer compositions of the present invention are tested in accordance with ASHRAE Standard 97—"Sealed Glass Tube Method to Test the Chemical Stability of Materials for Use within Refrigerant Systems" to simulate long-term stability of the heat transfer compositions by accelerated aging. After testing, the level of halides is considered to reflect the stability of the refrigerant under conditions of use in the heat transfer composition and total acid number (TAN) is considered to reflect the stability of the lubricant stability under conditions of use in the heat transfer composition.

The following experiment is carried out to show the effect of the addition of stabilizers according to the present invention on a refrigerant/lubricant composition. Sealed tubes are prepared containing 50% by weight of the indicated refrigerant and 50% by weight of the indicated lubricant, each of which has been degassed. Each tube contains a coupon of steel, copper, aluminum and bronze. The stability is tested by placing the sealed tube in an oven maintained at about 175° C. for 14 days. In each case the lubricants tested were an ISO 32 POE having a viscosity at 40° C. of about 32 cSt (Lubricant A) an ISO 68 POE having a viscosity at 40° C. of about 68 cSt (Lubricant B), with each lubricant having a moisture content of less than 300 ppm. The following refrigerants described in Table 10 A are tested:

TABLE 10A

| Refrigerant | HFC-32 (wt %) | HFC-125 (wt %) | CF3I (wt %) | Moisture, ppm |
|---|---|---|---|---|
| A | 50 | 11.5 | 38.5 | less than 30 |
| B | 49 | 11.5 | 39.5 | less than 30 |
| C | 47 | 11 | 41.5 | less than 30 |

The test is run for each lubricant and refrigerant pair in the absence of any stabilizer, and the results are as follows:
 Lubricant Visual—opaque or black
 Metals Visual—dull
 Solids Present—Yes
 Halides >100 ppm
 TAN >10 mgKOH/g The following stabilizer's described in Table 10B, with the weight percent in the table being the weight percent of the indicated stabilizer in the stabilizer package, are tested in an amount based on the total weight of the stabilizer plus refrigerant of from about 1.5% to about 10%.

TABLE 10B

| Stabilizer | Alkylated Napthalene 5 (wt %) | BHT (wt %) | Franasene wt %) | Isobutylene (wt %) |
|---|---|---|---|---|
| A | 100 | 0 | 0 | 0 |
| B | 0 | 100 | 0 | 0 |
| C | 0 | 0 | 100 | 0 |
| D | 0 | 0 | 0 | 100 |
| E | 33.3 | 33.3 | 33.3 | 0 |
| F | 33.3 | 33.3 | 0 | 33.3 |

The results of the testing with these stabilizers and lubricant A are reported below in Table 10C

TABLE 10C

TEST RESULTS

| Refrigerant No. | Stabilizer | Visual | Metals | Solids | Halides, ppm | Tan, mbKOH/g |
|---|---|---|---|---|---|---|
| A | A | Clear, colorless | Shiny | No | <300 ppm | <3 |
| A | B | Clear, colorless | Shiny | No | <300 ppm | <3 |
| A | C | Clear, colorless | Shiny | No | <300 ppm | <3 |
| A | D | Clear, colorless | Shiny | No | <300 ppm | <3 |
| A | E | Clear, colorless | Shiny | No | <300 ppm | <3 |
| A | F | Clear, colorless | Shiny | No | <300 ppm | <3 |
| B | A | Clear, colorless | Shiny | No | <300 ppm | <3 |
| B | B | Clear, colorless | Shiny | No | <300 ppm | <3 |
| B | C | Clear, colorless | Shiny | No | <300 ppm | <3 |
| B | D | Clear, colorless | Shiny | No | <300 ppm | <3 |
| B | E | Clear, colorless | Shiny | No | <300 ppm | <3 |
| B | F | Clear, colorless | Shiny | No | <300 ppm | <3 |
| C | A | Clear, colorless | Shiny | No | <300 ppm | <3 |
| C | B | Clear, colorless | Shiny | No | <300 ppm | <3 |
| C | C | Clear, colorless | Shiny | No | <300 ppm | <3 |
| C | D | Clear, colorless | Shiny | No | <300 ppm | <3 |
| C | E | Clear, colorless | Shiny | No | <300 ppm | <3 |
| C | F | Clear, colorless | Shiny | No | <300 ppm | <3 |
| B | F | Clear, colorless | Shiny | No | <300 ppm | <3 |

This testing shows that the lubricant in each of these tests was clear and colorless, the metals were shiny (unchanged), and there were no solids present, the halide and TAN levels were in acceptable limits, all of which indicates that the stabilizers were effective.

The same testing with same refrigerants and the same stabilizers is run with Lubricant B, and similar results are achieved.

Example 11—Miscibility with POE Oil

Miscibility of ISO POE-32 oil (having a viscosity at about 32 cSt at a temperature of 40° C.) is tested for different weight ratios of lubricant and refrigerant and different temperatures for R-410A refrigerant and for Refrigerant A as specified in Table 1 for Example 1 above. The results of this testing are reported in Table 11 below:

TABLE 11

| Liquid Refrigerant Mass Percentage in the Refrigerant and Lubricant Mixture, % | R-410A Miscibility Temperature Range | | Refrigerant A of the present invention |
|---|---|---|---|
| | Lower Limit, ° C. | Upper Limit, ° C. | |
| 60 | about −26 | NA | Fully miscible |
| 70 | about −23 | about 55 | Fully miscible |

TABLE 11-continued

| Liquid Refrigerant Mass Percentage in the Refrigerant and Lubricant Mixture, % | R-410A Miscibility Temperature Range | | Refrigerant A of the present invention |
|---|---|---|---|
| | Lower Limit, ° C. | Upper Limit, ° C. | |
| 80 | about −22 | about 48 | Fully miscible |
| 90 | about −31 | about 50 | Fully miscible |

As can be seen from the table above, R-410A is immiscible with POE oil below about −22° C., and R-410A cannot therefore be used in low temperature refrigeration applications without make provisions to overcome the accumulation of POE oil in the evaporator. Furthermore, R-410A is immiscible with POE oil above 50° C., which will cause problems in the condenser and liquid line (e.g. the separated POE oil will be trapped and accumulated) when R-410A is used in high ambient conditions. Conversely, applicants have surprisingly and unexpectedly found that refrigerants of the present invention are fully miscible with POE oil across a temperature range of −40° C. to 80° C., thus providing a substantial and unexpected advantage when used in such systems.

Example 12—Residential Air-Conditioning System (Cooling) With Sequestration and Heat Transfer Composition with Stabilizer Example 2 is repeated, except an oil separator is included in the system and several sequestration materials consisting independently of Sequestration Materials 1-4 are included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 13—Residential Heat Pump System (Heating) with Sequestration and Heat Transfer Composition with Stabilizer Example 3 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 14—Commercial Air-Conditioning System (Chiller) With Sequestration and Heat Transfer Composition with Stabilizer Example 4 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 15—Residential Air-to-Water Heat Pump Hydronic System with Sequestration and Heat Transfer Composition with Stabilizer Example 5 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 16—Medium Temperature Refrigeration System with Sequestration and Heat Transfer Composition with Stabilizer Example 6 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 17—Low Temperature Refrigeration System with Sequestration and Heat Transfer Composition with Stabilizer Example 7 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 18—Commercial Air-Conditioning System—Packaged Rooftops with Sequestration and Heat Transfer Composition with Stabilizer Example 8 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 19—Commercial Air-Conditioning System—Variable Refrigerant Flow Systems with Sequestration and Heat Transfer Composition with Stabilizer Example 9 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 20—Sequestration Material Comprising Silver Zeolite

The ability of a zeolite comprising silver to act as a sequestration material was tested. The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The oil sample was then placed in Fischer-Porter tubes with the zeolite. The amount of dry zeolite relative to the sample (lubricant) was measured. The tubes were then maintained at either 15° C. or 50° C. for 114 hours (4.75 days). The tubes were shaken every two hours to ensure proper mixing of the zeolite and the sample.

The Total Acid Number (TAN), iodide ppm and fluoride ppm of the sample were measured at the start (i.e. after degradation of the $CF_3I$ and POE oil, and before combination with the zeolite), and at the end (i.e. after combination with the zeolite, and at the end of the 114 hours at 15° C. or 50° C.). TAN, fluoride and iodide concentration were measured according to the same methods as descried in Example 10.

The results of the tests are set out in Table 20.

TABLE 20

Effect of zeolite on TAN, fluoride and iodide concentration

| Temp. | Amount of zeolite relative to sample (pphl) | TAN Start | TAN End | Fluoride (ppm) Start | Fluoride (ppm) End | Iodide (ppm) Start | Iodide (ppm) End |
|---|---|---|---|---|---|---|---|
| 15° C. | 4.8 pphl | 30.0 | 29.4 | 94.8 | 61.5 | 57.4 | 14.2 |
|  | 20.5 pphl | 30.0 | 24.7 | 94.8 | 46.4 | 57.4 | 5.5 |
| 50° C. | 5.4 pphl | 30.0 | 29.7 | 94.8 | 45.2 | 57.4 | 8.1 |
|  | 22.1 pphl | 30.0 | 23.3 | 94.8 | 39.2 | 57.4 | 0.1 |

* pphl means parts by weight per hundred parts of lubricant

The above tests demonstrate the ability of the zeolite to effectively "recover" a composition of POE oil and a $CF_3I$ refrigerant after it has degraded.

The results demonstrate that the zeolite was able to reduce the iodide and the fluoride level of the degraded sample at both 15° C. and 50° C. when using either about 5 pphl zeolite or about 21 pphl zeolite. However, the zeolite performed better at 50° C. than at 15° C., and at about 21 pphl zeolite than at about 5 pphl zeolite. Surprisingly, very little iodide was detected at about 21 pphl zeolite at 50° C.

The results also show that, at a concentration of about 21 pphl zeolite, the TAN was reduced at both 15° C. and at 50° C.

Example 21

The ability of an anion exchange resin to act as a sequestration material was tested.

Two different anion exchange resins were tested.

First Resin

The first resin was a strongly basic (type 1) anion exchange resin with chloride exchangeable ions (Dowex® 1X8 chloride form).

| Product Name | Dowex ® 1X8 chloride form |
|---|---|
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The first resin was used without modification.

Second Resin

The second resin was a strongly basic (type 1) anion exchange resin with chloride exchangeable ions (Dowex® 1X8 chloride form).

| Product Name | Dowex ® 1X8 chloride form |
|---|---|
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The second resin was converted from the chloride form to the hydroxide form prior to use in the following example by slowly washing the resin for at least 1 hour with 5 to 10 bed volumes of 4% NaOH, followed by washing with deionized water until the pH of the effluent is 7, ±0.5. The pH was measured using litmus paper.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The sample was then placed in Fischer-Porter tubes with the anion exchange resin. The amount of dry resin relative to the sample was measured. The tubes were then maintained at either 15° C. or 50° C. for 114 hours (4.75 days). The tubes were shaken every two hours to ensure proper mixing of the resin and the sample.

The Total Acid Number (TAN), iodide ppm and fluoride ppm of the sample were measured at the start (i.e. after degradation of the $CF_3I$ and POE oil, and before combination with the resin), and at the end (i.e. after combination with the resin, and at the end of the 114 hours at 15° C. or 50° C.). TAN, fluoride and iodide concentration were measured according to the same methods as Example 10.

The results are set out in Table 21 below.

TABLE 21

Effect of anion exchange resin on TAN, fluoride and iodide concentration

| Material | Temp. | Amount of IE relative to sample (lubricant) | TAN Start | TAN End | Fluoride (ppm) Start | Fluoride (ppm) End | Iodide (ppm) Start | Iodide (ppm) End |
|---|---|---|---|---|---|---|---|---|
| First resin | 15° C. | 3.9 pphl | 30.0 | 30.7 | 94.8 | 65.5 | 57.4 | 32.4 |
|  |  | 16.0 pphl | 30.0 | 30.9 | 94.8 | 61.9 | 57.4 | 19.9 |
|  | 50° C. | 4.5 pphl | 30.0 | 31.1 | 94.8 | 55.2 | 57.4 | 25.8 |
|  |  | 16.7 pphl | 30.0 | 39.4 | 94.8 | 44.7 | 57.4 | 17.5 |

TABLE 21-continued

Effect of anion exchange resin on TAN, fluoride and iodide concentration

| Material | Temp. | Amount of IE relative to sample (lubricant) | TAN Start | TAN End | Fluoride (ppm) Start | Fluoride (ppm) End | Iodide (ppm) Start | Iodide (ppm) End |
|---|---|---|---|---|---|---|---|---|
| Second resin | 15° C. | 3.8 pphl | 30.0 | 26.0 | 94.8 | 54.3 | 57.4 | 15.0 |
| | | 15.2 pphl | 30.0 | 14.5 | 94.8 | 44.3 | 57.4 | 4.5 |
| | 50° C. | 4.8 pphl | 30.0 | 26.8 | 94.8 | 46.2 | 57.4 | 7.6 |
| | | 16.7 pphl | 30.0 | 13.1 | 94.8 | 22.6 | 57.4 | 2.5 |

* pphl means parts by weight per hundred parts of lubricant

The above tests demonstrate the ability of anion exchange resins to effectively "recover" a composition of POE oil and a $CF_3I$ refrigerant after it has degraded.

The results demonstrate that both resins were able to reduce the iodide and the fluoride level of the degraded sample at both 15° C. and 50° C. when using either about 4 pphl resin or about 16 pphl resin. Both resins performed better at 50° C. than at 15° C., and at about 16 pphl resin than about 4 pphl zeolite.

The second resin was able to reduce the TAN of the sample at both temperatures (i.e. 15° C. and at 50° C.), and at both concentrations of resin (i.e. at about 4 pphl and about 16 pphl resin).

Example 22

Example 22 is repeated except that the following two anion resins were used:

A—An industrial grade weak base anion exchange resin sold under the trade designation Amberlyst A21 (Free Base) having the following characteristics:

| | |
|---|---|
| Product Name | Amberlyst A21 |
| Composition | Moisture content, 58-62% |
| Limit | 100° C. max. temp. |
| Ionic Form | Free Base (FB) |
| Matrix | Macroporous |
| Particle size | 490-690 μm |
| Concentration of active sites | >4.6 eq/kg >1.3 eq/L |

B—An industrial grade weak basic anion exchange resin sold under the trade designation Amberlyst A22 having the following characteristics:

| | |
|---|---|
| Product Name | Amberlyst A22 |
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

Each of these resins were found to be effect to remove and/or reduce the above-noted materials.

Example 23

The ability of combination of anion exchange resin and zeolite to act as a sequestration material was tested.

Anion Exchange Resin

The resin was a strongly basic (type 1) anion exchange resin with hydroxyl exchangeable ions (Dowex® Marathon™ A, hydroxide form).

| | |
|---|---|
| Product Name | Dowex ® Marathon ™ A, hydroxide form |
| Moisture | 60-72% |
| Matrix | Styrene-divinylbenzene (gel) |
| Particle size | 23-27 mesh |
| Capacity | 1.0 meq/mL by wetted bed volume |

The resin was used without modification.

Zeolite

The zeolite tested was UPO IONSIV D7310-C, available form Honeywell UOP. The openings have a size across their largest dimension of from about 15 to about 35 Å.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil (i.e., lubricant) were taken. The lubricant sample was then placed in Fischer-Porter tubes with the combination of anion exchange resin and zeolite. The amount of dry resin and zeolite relative to the sample were measured. The tubes were then maintained at about 50° C. for 192 hours (8 days). The tubes were shaken every two hours to ensure proper mixing of the resin and the sample.

The Total Acid Number (TAN), iodide ppm and fluoride ppm of the oil were measured at the start (i.e. after degradation of the $CF_3I$ and POE oil, and before combination with the resin and zeolite), and at the end (i.e. after combination with the resin and zeolite, and at the end of the 192 hours at 50° C.). TAN, fluoride and iodide concentration were measured according to the same methods as Example 1.

The results are set out in Table 23 below.

TABLE 23

Effect of anion exchange resin and zeolite on TAN, fluoride and iodide concentration

| Temp. | Zeolite:Ion Exchange (IE) | TAN Start | TAN End | Fluoride (ppm) Start | Fluoride (ppm) End | Iodide (ppm) Start | Iodide (ppm) End |
|---|---|---|---|---|---|---|---|
| 50° C. | 100% IE | 8.71 | 3.20 | 23.3 | 5.4 | 26.9 | <0.05 |
| | 25%:75% | 8.71 | <0.05 | 23.3 | 0.8 | 26.9 | <0.05 |
| | 50%:50% | 8.71 | 0.14 | 23.3 | 3.1 | 26.9 | <0.05 |
| | 75%:25% | 8.71 | 0.96 | 23.3 | 5.4 | 26.9 | <0.05 |
| | 100% Zeolite | 8.71 | 2.93 | 23.3 | 5.3 | 26.9 | <0.05 |

The above tests demonstrate the ability of combination of anion exchange resins and zeolite to effectively "recover" a composition of POE oil and a $CF_3I$ refrigerant after it has degraded. The results demonstrate that both resins were able to reduce the iodide and the fluoride level of the degraded sample at 50° C. when using different ratios of anion exchange resin and zeolite. The zeolite to ion-exchange weight 25:75 showed maximum reduction in the TAN of the sample and also showed highest decrease in iodide and fluoride content (ppm).

Example 24

The level of removal of fluoride, iodide and TAN reduction as a function of the amount of zeolite as a percentage of the heat transfer composition being treated was studied The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil were taken.

A portion of the lubricant sample produced after the breakdown according to the preceeding paragraph was then filled into 5 Parr Cells, with each of the cells having a different amount (by weight) of zeolite based on the weight of the lubricant placed into the cell. The Parr Cells were then maintained at 50° C. and the material in each cell was tested every 24 hours for 15 days. The Parr Cells were shaken every day to ensure proper mixing of the zeolite and the lubricant.

The Total Acid Number (TAN), iodide ppm and fluoride ppm of the oil were measured at the start (i.e. after degradation of the $CF_3I$ and POE oil, and before combination with the zeolite), and after every 24 hours (i.e. after combination with the zeolite, at 50° C.) for 15 days.

The results of the tests are set out in Table 5 below:

TABLE 24

Effect of zeolite on TAN, fluoride and iodide concentration

| Material | Temp. | Zeolite (Pphl) | TAN Start | TAN 5 days | TAN 15 days | Fluoride (ppm) Start | Fluoride (ppm) 5 days | Fluoride (ppm) 15 days | Iodide (ppm) Start | Iodide (ppm) 5 days | Iodide (ppm) 15 days |
|---|---|---|---|---|---|---|---|---|---|---|---|
| Zeolite | 50° C. | 1 | 4.5 | 4.4 | 4.6 | 7.4 | 1.5 | 0.96 | 370 | 240 | 33 |
| | | 5 | 4.5 | 3.6 | 3.5 | 7.4 | <0.8 | <0.8 | 370 | 130 | 13 |
| | | 10 | 4.5 | 2.6 | 2.6 | 7.4 | <0.8 | <0.8 | 370 | 49 | <4 |
| | | 15 | 4.5 | 2.0 | 2.2 | 7.4 | <0.8 | <0.8 | 370 | 26 | <4 |
| | | 20 | 4.5 | 1.8 | 2 | 7.4 | <0.8 | <0.8 | 370 | 38 | <4 |

The above tests demonstrate the ability of the zeolite to effectively "recover" a composition of lubricant, and in particular POE oil, and a $CF_3I$ refrigerant after it has degraded.

The results indicate that amounts of zeolite greater than 10 pphl are more effective in reducing iodide levels to non-detectable limits, and amount of zeolite material greater than 5 pphl is more effective in reducing the fluoride levels to non-detectable limits. The results also show that amount of zeolite greater than 15 pphl is most effective in reducing the TAN.

Example 25—Preferred Ion Exchange Materials

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution.

Applicants have found that Amberlyst A21 is an excellent material for use in accordance with the present invention. It has a macroporous structure makes it physically very stable and resistant to breakage in the present methods and systems, and ii can withstand high flow rates of the refrigeration system over a period of lifetime.

Example 26

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. The matrix of Amberlyst A21 is macroporous. Its macroporous structure makes it physically very stable and resistant to breakage. It can withstand high flow rates of the refrigeration system over a period of lifetime. An industrial grade weak base anion exchange resin sold under the trade designation Amberlyst A21 (Free Base) having the following characteristics:

| | |
|---|---|
| Product Name | Amberlyst A21 |
| Composition | Moisture content, 58-62% |

-continued

| | |
|---|---|
| Limit | 100° C. max. temp. |
| Ionic Form | Free Base (FB) |
| Matrix | Macroporous |
| Particle size | 490-690 μm |
| Concentration of active sites | >4.6 eq/kg<br>>1.3 eq/L |

A mixture of 80 wt % POE oil (POE ISO 32, Emkarate RL 32-3MAF) which comprises a primary anti-oxidant stabilizer BHT in an amount of about 1000 ppm, and 20 wt %

$CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A21. The amount of dry Amberlyst A21 relative to the sample was measured. The parr cells were then maintained at either 50° C. for 20 days. The cells were shaken each day to ensure proper mixing of the Amberlyst A21 and the sample.

The Total Acid Number (TAN), iodide ppm and fluoride ppm of the sample were measured at the start (i.e. after degradation of the $CF_3I$ and POE oil, and before combination with the Amberlyst A21), and at the end (i.e. after combination with the Amberlyst A21). TAN, fluoride and iodide concentration were measured according to the methods as described in the application.

The results of the tests are set out in Table 26.

TABLE 26

Effect of Amberlyst A21 on TAN, fluoride and iodide concentration

| Temp. | Amount of Amberlyst A21 relative to oil sample (wt %) | TAN | | Fluoride (ppm) | | Iodide (ppm) | |
|---|---|---|---|---|---|---|---|
| | | Start | End | Start | End | Start | End |
| 50° C. | 20% | 7.2 | 1.4 | 21 | 1.6 | 620 | 130 |
| | 30% | 7.2 | 0.6 | 21 | 5.2 | 620 | <4 |
| | 40% | 7.2 | 0.4 | 21 | <4 | 620 | <4 |

The above tests demonstrate the ability of the Amberlyst A21 to effectively "recover" a composition of POE oil and a $CF_3I$ refrigerant after it has degraded.

The results demonstrate that the Amberlyst A21 was able to reduce the iodide and the fluoride level below detectable limits of the degraded sample at 50° C. when using 30 wt % Amberlyst A21 and above.

Example 27

The ability of an industrial grade weakly base anion exchange adsorbent resin Amberlyst A22 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. An industrial grade weak basic anion exchange resin sold under the trade designation Amberlyst A22 having the following characteristics:

| Product Name | Amberlyst A22 |
|---|---|
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A22. The amount of dry Amberlyst A22 relative to the sample was measured. The parr cells were then maintained at either 50° C. for 20 days. The cells were shaken each day to ensure proper mixing of the Amberlyst A22 and the sample.

The Total Acid Number (TAN), iodide ppm and fluoride ppm of the sample were measured at the start (i.e. after degradation of the $CF_3I$ and POE oil, and before combination with the Amberlyst A22), and at the end (i.e. after combination with the Amberlyst A22). TAN, fluoride and iodide concentration were measured according to the methods as described in the application.

The results of the tests are set out in Table 27.

TABLE 27

Effect of Amberlyst A22 on TAN, fluoride and iodide concentration

| Temp. | Amount of Amberlyst A22 relative to oil sample (wt %) | TAN | | Fluoride (ppm) | | Iodide (ppm) | |
|---|---|---|---|---|---|---|---|
| | | Start | End | Start | End | Start | End |
| 50° C. | 10% | 4.3 | 1.3 | 6.0 | <0.8 | 170 | 140 |
| | 20% | 4.3 | 0.8 | 6.0 | <0.8 | 170 | 74 |

The above tests demonstrate the ability of the Amberlyst A22 to effectively "recover" a composition of POE oil and a $CF_3I$ refrigerant after it has degraded.

The results demonstrate that the Amberlyst A22 was able to reduce the iodide and the fluoride level of the degraded sample at 50° C. when using 10 wt % and 30 wt % of Amberlyst A22.

Example 28

The ability of an industrial grade weakly base anion exchange adsorbent resin Amberlite IRA96 to act as a sequestration material was tested. Weak Base Anion Resin are in the free base form and are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. The high porosity of this resin allows efficient adsorption of large organic molecules. An industrial grade weak basic anion exchange resin sold under the trade designation Amberlite IRA96 having the following characteristics:

| Product Name | Amberlite IRA96 |
|---|---|
| Composition | Moisture content, 59-65% |
| Limit | 100° C. max. temp. |

| | |
|---|---|
| Ionic Form | Free Base (FB) |
| Structure | Macroporous |
| Matrix | Styrene divinylbenzene copolymer |
| Functional Group | Tertiary amine |
| Particle size | 630-830 μm |
| Concentration of active sites | >1.25 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the AmberliteIRA96. The amount of dry AmberliteIRA96 relative to the sample was measured. The parr cells were then maintained at either 50° C. for 20 days. The cells were shaken each day to ensure proper mixing of the AmberliteIRA96 and the sample.

The Total Acid Number (TAN), iodide ppm and fluoride ppm of the sample were measured at the start (i.e. after degradation of the $CF_3I$ and POE oil, and before combination with the AmberliteIRA96), and at the end (i.e. after combination with the AmberliteIRA96). TAN, fluoride and iodide concentration were measured according to the methods as described in the application.

The results of the tests are set out in Table 28.

TABLE 28

Effect of Amberlite on TAN, fluoride and iodide concentration

| | Amount of AmberliteIRA96 relative to oil | TAN | | Fluoride (ppm) | | Iodide (ppm) | |
|---|---|---|---|---|---|---|---|
| Temp. | sample (wt %) | Start | End | Start | End | Start | End |
| 50° C. | 20% | 6.3 | 0.2 | 30 | <0.8 | 1000 | 130 |
| | 30% | 6.3 | <0.2 | 30 | <0.8 | 1000 | <4 |
| | 40% | 6.3 | <0.2 | 30 | <0.8 | 1000 | <4 |

The above tests demonstrate the ability of the AmberliteIRA96 to effectively "recover" a composition of POE oil and a $CF_3I$ refrigerant after it has degraded.

The results demonstrate that the AmberliteIRA96 was able to reduce the iodide and the fluoride level below detectable limits of the degraded sample at 50° C. when using 30 wt % AmberliteIRA96 and above.

Example 29

The ability of an industrial grade activated alumina F200 to act as a sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with industrial grade activated alumina F200. The amount of activated alumina relative to the sample was measured. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to F200), and at the end (i.e. after exposure to F200). TAN, fluoride and iodide concentration were measured per the methods described in the application.

The results of the tests are set out in Table 29 Å.

TABLE 29

Effect of Activated Alumina F200 on TAN, fluoride and iodide concentration

| | Amount of F200 relative to oil | TAN | | Fluoride (ppm) | | Iodide (ppm) | |
|---|---|---|---|---|---|---|---|
| Temp. | sample (wt %) | Start | End | Start | End | Start | End |
| 50° C. | 20% | 7.2 | 1.6 | 21 | 1.4 | 620 | 72 |
| | 30% | 7.2 | 1.0 | 21 | 1.0 | 620 | 37 |
| | 40% | 7.2 | 1.3 | 21 | 0.9 | 620 | 64 |

Example 30

The ability of combination of a Amberlyst A21 and Zeolite IONSIV D7310-C as sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the sequestration material. The amount of sequestration material relative to the sample was 20% by weight. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to sequestration material), and at the end (i.e. after exposure to sequestration material). TAN, fluoride and iodide concentration were measured per the methods described in the application. The results of the tests are set out in Table 30.

TABLE 30

Effect of Amberlyst A21 and Zeolite IONSIV D7310-C combination on TAN, fluoride and iodide concentration

| | A21:Zeolite | TAN | | Fluoride (ppm) | | Iodide (ppm) | |
|---|---|---|---|---|---|---|---|
| Temp. | (by weight) | Start | End | Start | End | Start | End |
| 50° C. | 100% A21 | 19 | 3.1 | 100 | 2.4 | 570 | 9 |
| | 85:15 | 19 | 3.4 | 100 | 1.8 | 570 | <4 |
| | 75:25 | 19 | 3.8 | 100 | 2.8 | 570 | <4 |
| | 65:35 | 19 | 4.0 | 100 | 1.8 | 570 | <4 |
| | 50:50 | 19 | 5.0 | 100 | 2.4 | 570 | <4 |
| | 100% Zeolite | 19 | 12.0 | 100 | 5.6 | 570 | <4 |

Numbered Embodiments

The invention will now be illustrated by reference to the following numbered embodiments. The subject matter of the numbered embodiments may be additionally combined with subject matter from the description or from one or more of the claims.

1. A refrigerant comprising at least about 97% by weight of the following three compounds, with each compound being present in the following relative percentages based on the total weight of the listed compounds:
49%+/−2% by weight difluoromethane (HFC-32),
11.5%+/−2% by weight pentafluoroethane (HFC-125), and
39.5%+/−2% by weight trifluoroiodomethane (CF3I).

2. A refrigerant comprising at least about 97% by weight of the following three compounds, with each compound being present in the following relative percentages based on the total weight of the listed compounds:
49%+/−1% by weight difluoromethane (HFC-32),
11.5%+/−1% by weight pentafluoroethane (HFC-125), and
39.5%+/−1% by weight trifluoroiodomethane (CF3I).

3. A refrigerant comprising at least about 97% by weight of the following three compounds, with each compound being present in the following relative percentages based on the total weight of the listed compounds:
49%+/−0.5% by weight difluoromethane (HFC-32),
11.5%+/−0.5% by weight pentafluoroethane (HFC-125), and
39.5%+/−0.5% by weight trifluoroiodomethane (CF3I).

4. A refrigerant comprising at least about 97% by weight of the following three compounds, with each compound being present in the following relative percentages based on the total weight of the listed compounds:
49% by weight difluoromethane (HFC-32),
11.5% by weight pentafluoroethane (HFC-125), and
39.5% by weight trifluoroiodomethane (CF3I).

5. A refrigerant consisting essentially of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39% to 40% by weight trifluoroiodomethane (CF3I).

6. A refrigerant consisting essentially of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39% to 40% by weight trifluoroiodomethane (CF3I).

7. A refrigerant consisting essentially of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39% to 40% by weight trifluoroiodomethane (CF3I).

8. A refrigerant consisting essentially of the following three compounds, with each compound being present in the following relative percentages based on the total weight of the listed compounds:
49% by weight difluoromethane (HFC-32),
from 11.6% to 11.9% by weight pentafluoroethane (HFC-125), and
39% to 40% by weight trifluoroiodomethane (CF3I).

9. A refrigerant consisting essentially of the following three compounds, with each compound being present in the following relative percentages based on the total weight of the listed compounds:
49%+/−2% by weight difluoromethane (HFC-32),
11.5%+/−2% by weight pentafluoroethane (HFC-125), and
from 39 to 39.4% by weight trifluoroiodomethane (CF3I) and wherein the refrigerant does not comprise less than about 39.0 relative percent by weight of CF3I based on the total weight of said three compounds.

10. A refrigerant consisting essentially of the following three compounds, with each compound being present in the following relative percentages based on the total weight of the listed compounds:
49%+/−1% by weight difluoromethane (HFC-32),
11.5%+/−1% by weight pentafluoroethane (HFC-125), and
from 39 to 39.4% by weight trifluoroiodomethane (CF3I) and wherein the refrigerant does not comprise less than about 39.0 relative percent by weight of CF3I based on the total weight of said three compounds.

11. A refrigerant consisting essentially of the following three compounds, with each compound being present in the following relative percentages based on the total weight of the listed compounds:
49%+/−0.5% by weight difluoromethane (HFC-32),
11.5%+/−0.5% by weight pentafluoroethane (HFC-125), and
from 39 to 39.4% by weight trifluoroiodomethane (CF3I) and wherein the refrigerant does not comprise less than about 39.0 relative percent by weight of CF3I based on the total weight of said three compounds.

12. A refrigerant consisting essentially of the following three compounds, with each compound being present in the following relative percentages based on the total weight of the listed compounds:
49% by weight difluoromethane (HFC-32),
11.5% by weight pentafluoroethane (HFC-125), and
from 39 to 39.4% by weight trifluoroiodomethane (CF3I) and wherein the refrigerant does not comprise less than about 39.0 relative percent by weight of CF3I based on the total weight of said three compounds.

13. A refrigerant consisting essentially of the following three compounds, with each compound being present in the following relative percentages based on the total weight of the listed compounds:
49%+/−2% by weight difluoromethane (HFC-32),
11.5%+/−2% by weight pentafluoroethane (HFC-125), and
39.1% to 40% by weight trifluoroiodomethane (CF3I) and wherein the refrigerant does not comprise 39.5% relative percent by weight of CF3I based on the total weight of said three compounds.

14. A refrigerant consisting essentially of the following three compounds, with each compound being present in the following relative percentages based on the total weight of the listed compounds:
49%+/−1% by weight difluoromethane (HFC-32),
11.5%+/−1% by weight pentafluoroethane (HFC-125), and
39.1% to 40% by weight trifluoroiodomethane (CF3I) and wherein the refrigerant does not comprise 39.5% relative percent by weight of CF3I based on the total weight of said three compounds.

15. A refrigerant consisting essentially of the following three compounds, with each compound being present in the following relative percentages based on the total weight of the listed compounds:
49%+/−0.5% by weight difluoromethane (HFC-32),
11.5%+/−0.5% by weight pentafluoroethane (HFC-125), and
39.1% to 40% by weight trifluoroiodomethane (CF3I) and wherein the refrigerant does not comprise 39.5% relative percent by weight of CF3I based on the total weight of said three compounds.

16. A refrigerant consisting essentially of the following three compounds, with each compound being present in the following relative percentages based on the total weight of the listed compounds:
49% by weight difluoromethane (HFC-32),
11.5% by weight pentafluoroethane (HFC-125), and
39.1% to 40% by weight trifluoroiodomethane (CF3I)
and wherein the refrigerant does not comprise 39.5% relative percent by weight of CF3I based on the total weight of said three compounds.

17. A refrigerant consisting essentially of the following three compounds, with each compound being present in the following relative percentages based on the total weight of the listed compounds:
49%+/−2% by weight difluoromethane (HFC-32),
from 11.1% to 12% by weight pentafluoroethane (HFC-125), and
39% to 40% by weight trifluoroiodomethane (CF3I).

18. A refrigerant consisting essentially of the following three compounds, with each compound being present in the following relative percentages based on the total weight of the listed compounds:
49%+/−1% by weight difluoromethane (HFC-32),
from 11.1% to 12% by weight pentafluoroethane (HFC-125), and
39% to 40% by weight trifluoroiodomethane (CF3I).

19. A refrigerant consisting essentially of the following three compounds, with each compound being present in the following relative percentages based on the total weight of the listed compounds:
49%+/−0.5% by weight difluoromethane (HFC-32),
from 11.1% to 12% by weight pentafluoroethane (HFC-125), and
39% to 40% by weight trifluoroiodomethane (CF3I).

20. A refrigerant consisting essentially of the following three compounds, with each compound being present in the following relative percentages based on the total weight of the listed compounds:
49% by weight difluoromethane (HFC-32),
from 11.1% to 12% by weight pentafluoroethane (HFC-125), and
39% to 40% by weight trifluoroiodomethane (CF3I).

21. A refrigerant consisting essentially of the following three compounds, with each compound being present in the following relative percentages based on the total weight of the listed compounds:
49%+/−2% by weight difluoromethane (HFC-32),
from 11.1 to 12% by weight pentafluoroethane (HFC-125), and
from 39% to 40% by weight trifluoroiodomethane (CF3I)
and wherein the refrigerant does not comprise 11.5% relative percent by weight of HFC-125 based on the total weight of said three compounds.

22. A refrigerant consisting essentially of the following three compounds, with each compound being present in the following relative percentages based on the total weight of the listed compounds:
49%+/−1% by weight difluoromethane (HFC-32),
from 11.1 to 12% by weight pentafluoroethane (HFC-125), and
from 39% to 40% by weight trifluoroiodomethane (CF3I)
and wherein the refrigerant does not comprise 11.5% relative percent by weight of HFC-125 based on the total weight of said three compounds.

23. A refrigerant consisting essentially of the following three compounds, with each compound being present in the following relative percentages based on the total weight of the listed compounds:
49%+/−0.5% by weight difluoromethane (HFC-32),
from 11.1 to 12% by weight pentafluoroethane (HFC-125), and
from 39% to 40% by weight trifluoroiodomethane (CF3I)
and wherein the refrigerant does not comprise 11.5% relative percent by weight of HFC-125 based on the total weight of said three compounds.

24. A refrigerant consisting essentially of the following three compounds, with each compound being present in the following relative percentages based on the total weight of the listed compounds:
49% by weight difluoromethane (HFC-32),
from 11.1 to 12% by weight pentafluoroethane (HFC-125), and
from 39% to 40% by weight trifluoroiodomethane (CF3I)
and wherein the refrigerant does not comprise 11.5% relative percent by weight of HFC-125 based on the total weight of said three compounds.

25. A refrigerant consisting essentially of the following three compounds, with each compound being present in the following relative percentages based on the total weight of the listed compounds:
49%+/−2% by weight difluoromethane (HFC-32),
from 11.1 to 12% by weight pentafluoroethane (HFC-125), and
from 39.1% to 40% by weight trifluoroiodomethane (CF3I)
and wherein the refrigerant does not comprise 11.5% relative percent by weight of HFC-125 and does not comprise 39.5% of CF3I based on the total weight of said three compounds.

26. A refrigerant consisting essentially of the following three compounds, with each compound being present in the following relative percentages based on the total weight of the listed compounds:
49%+/−1% by weight difluoromethane (HFC-32),
from 11.1 to 12% by weight pentafluoroethane (HFC-125), and
from 39.1% to 40% by weight trifluoroiodomethane (CF3I)
and wherein the refrigerant does not comprise 11.5% relative percent by weight of HFC-125 and does not comprise 39.5% of CF3I based on the total weight of said three compounds.

27. A refrigerant consisting essentially of the following three compounds, with each compound being present in the following relative percentages based on the total weight of the listed compounds:
49%+/−0.5% by weight difluoromethane (HFC-32),
from 11.1 to 12% by weight pentafluoroethane (HFC-125), and
from 39.1% to 40% by weight trifluoroiodomethane (CF3I)
and wherein the refrigerant does not comprise 11.5% relative percent by weight of HFC-125 and does not comprise 39.5% of CF3I based on the total weight of said three compounds.

28. A refrigerant consisting essentially of the following three compounds, with each compound being present in the following relative percentages based on the total weight of the listed compounds:
49% by weight difluoromethane (HFC-32),
from 11.1 to 12% by weight pentafluoroethane (HFC-125), and
from 39.1% to 40% by weight trifluoroiodomethane (CF3I)

and wherein the refrigerant does not comprise 11.5% relative percent by weight of HFC-125 and does not comprise 39.5% of CF3I based on the total weight of said three compounds.

29. A refrigerant consisting essentially of the following three compounds, with each compound being present in the following relative percentages based on the total weight of the listed compounds:
49%+/−0.3% by weight difluoromethane (HFC-32),
11.5%+/−0.3% by weight pentafluoroethane (HFC-125), and
39.5%+/−0.3% by weight trifluoroiodomethane (CF3I).

30. A refrigerant comprising at least about 97% by weight of the following three compounds, with each compound being present in the following relative percentages based on the total weight of the listed compounds:
49%+/−2% by weight difluoromethane (HFC-32),
11.5%+/−2% by weight pentafluoroethane (HFC-125), and
39.5%+/−2% by weight trifluoroiodomethane (CF3I),
wherein the refrigerant satisfies the Non-Flammability Test.

31. A refrigerant comprising at least about 97% by weight of the following three compounds, with each compound being present in the following relative percentages based on the total weight of the listed compounds:
49%+/−1% by weight difluoromethane (HFC-32),
11.5%+/−1% by weight pentafluoroethane (HFC-125), and
39.5%+/−1% by weight trifluoroiodomethane (CF3I),
wherein the refrigerant satisfies the Non-Flammability Test.

32. A refrigerant comprising at least about 97% by weight of the following three compounds, with each compound being present in the following relative percentages based on the total weight of the listed compounds:
49%+/−0.5% by weight difluoromethane (HFC-32),
11.5%+/−0.5% by weight pentafluoroethane (HFC-125), and
39.5%+/−0.5% by weight trifluoroiodomethane (CF3I),
wherein the refrigerant satisfies the Non-Flammability Test.

33. A refrigerant comprising at least about 97% by weight of the following three compounds, with each compound being present in the following relative percentages based on the total weight of the listed compounds:
49% by weight difluoromethane (HFC-32),
11.5% by weight pentafluoroethane (HFC-125), and
39.5% by weight trifluoroiodomethane (CF3I),
wherein the refrigerant satisfies the Non-Flammability Test.

34. A refrigerant consisting essentially of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39% to 40% by weight trifluoroiodomethane (CF3I),
and wherein the refrigerant does not comprise 11.5% by weight of HFC-125 and does not comprise 12% relative percent by weight or greater of HFC-125 based on the total weight of said three compounds.

35. A refrigerant consisting essentially of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39% to 40% by weight trifluoroiodomethane (CF3I),
and wherein the refrigerant does not comprise 11.5% by weight of HFC-125 and does not comprise 12% relative percent by weight or greater of HFC-125 based on the total weight of said three compounds.

36. A refrigerant consisting essentially of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39% to 40% by weight trifluoroiodomethane (CF3I),
and wherein the refrigerant does not comprise 11.5% by weight of HFC-125 and does not comprise 12% relative percent by weight or greater of HFC-125 based on the total weight of said three compounds.

37. A refrigerant consisting essentially of the following three compounds, with each compound being present in the following relative percentages based on the total weight of the listed compounds:
49% by weight difluoromethane (HFC-32),
from 11.6% to 11.9% by weight pentafluoroethane (HFC-125), and
39% to 40% by weight trifluoroiodomethane (CF3I),
and wherein the refrigerant does not comprise 11.5% by weight of HFC-125 and does not comprise 12% relative percent by weight or greater of HFC-125 based on the total weight of said three compounds.

38. A refrigerant consisting essentially of the following three compounds, with each compound being present in the following relative percentages based on the total weight of the listed compounds:
from 47% to 49.5% by weight difluoromethane (HFC-32),
from 11% to 13.5% by weight pentafluoroethane (HFC-125), and
from 39% to 41.5% by weight trifluoroiodomethane (CF3I).

39. A refrigerant consisting essentially of the following three compounds, with each compound being present in the following relative percentages based on the total weight of the listed compounds:
from 47% to 49.5% by weight difluoromethane (HFC-32),
from 11% to 13.5% by weight pentafluoroethane (HFC-125), and
from 39% to 41.5% by weight trifluoroiodomethane (CF3I),
and wherein the refrigerant does not comprise 11.5% by weight of HFC-125 and does not comprise 12% relative percent by weight or greater of HFC-125 based on the total weight of said three compounds.

40. A refrigerant consisting of the following three compounds, with each compound being present in the following relative percentages based on the total weight of the listed compound:
49%+/−2% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

41. A refrigerant consisting of the following three compounds, with each compound being present in the following relative percentages based on the total weight of the listed compound:
49%+/−1% by weight difluoromethane (HFC-32),
from 11.6% to 11.9% by weight pentafluoroethane (HFC-125), and
39.0% to 40% by weight trifluoroiodomethane (CF3I), and wherein the refrigerant does not comprise 39.0% by weight of CF3I and does not comprise 39.5% relative percent by weight or greater of CF3I based on the total weight of said three compounds.

42. A refrigerant consisting of the following three compounds, with each compound being present in the following relative percentages based on the total weight of the listed compound:
49%+/−0.5% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

43. A refrigerant consisting of the following three compounds, with each compound being present in the following relative percentages based on the total weight of the listed compound:
49% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

44. A refrigerant consisting of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

45. A refrigerant consisting of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

46. A refrigerant consisting of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

47. A refrigerant consisting of the following three compounds, with each compound being present in the following relative percentages based on the total weight of the listed compounds:
49% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I and does not comprise 39.5% relative percent by weight or greater of CF3I based on the total weight of said three compounds.

48. A refrigerant consisting of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

49. A refrigerant consisting of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

50. A refrigerant consisting of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

51. A refrigerant consisting of the following three compounds, with each compound being present in the following relative percentages based on the total weight of the listed compounds:
49% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

52. A refrigerant consisting of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

53. A refrigerant consisting of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

54. A refrigerant consisting of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

55. A refrigerant consisting of the following three compounds, with each compound being present in the following relative percentages based on the total weight of the listed compounds:
49% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.0% by weight of CF3I based on the total weight of said three compounds.

56. A refrigerant consisting of the following three compounds, with each compound being present in the following relative percentages based on the total weight of the listed compounds:
49%+/−2% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.5% relative percent by weight or greater of CF3I based on the total weight of said three compounds.

57. A refrigerant consisting of the following three compounds, with each compound being present in the following relative percentages based on the total weight of the listed compounds:
49%+/−1% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.5% relative percent by weight or greater of CF3I based on the total weight of said three compounds.

58. A refrigerant consisting of the following three compounds, with each compound being present in the following relative percentages based on the total weight of the listed compounds:
49%+/−0.5% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.5% relative percent by weight or greater of CF3I based on the total weight of said three compounds.

59. A refrigerant consisting of the following three compounds, with each compound being present in the following relative percentages based on the total weight of the listed compounds:
49% by weight difluoromethane (HFC-32),
from 11.6% to 11.9% by weight pentafluoroethane (HFC-125), and
39.0% to 40% by weight trifluoroiodomethane (CF3I),
and wherein the refrigerant does not comprise 39.5% relative percent by weight or greater of CF3I based on the total weight of said three compounds.

60. A refrigerant consisting of the following three compounds, with each compound being present in the following relative percentages: based on the total weight of the listed compounds
49%+/−2% by weight difluoromethane (HFC-32),
from 11.6% to 11.9% by weight pentafluoroethane (HFC-125), and
39.0% to 40% by weight trifluoroiodomethane (CF3I),
wherein said refrigerant satisfies the Non-Flammability Test.

61. A refrigerant consisting of the following three compounds, with each compound being present in the following relative percentages: based on the total weight of the listed compounds
49%+/−1% by weight difluoromethane (HFC-32),
from 11.6% to 11.9% by weight pentafluoroethane (HFC-125), and
39.0% to 40% by weight trifluoroiodomethane (CF3I),
wherein said refrigerant satisfies the Non-Flammability Test.

62. A refrigerant consisting of the following three compounds, with each compound being present in the following relative percentages based on the total weight of the listed compounds
49%+/−0.5% by weight difluoromethane (HFC-32),
from 11.6% to 11.9% by weight pentafluoroethane (HFC-125), and
39.0% to 40% by weight trifluoroiodomethane (CF3I),
wherein said refrigerant satisfies the Non-Flammability Test.

63. A refrigerant consisting of the following three compounds, with each compound being present in the following relative percentages based on the total weight of the listed compounds
49% by weight difluoromethane (HFC-32),
from 11.6% to 11.9% by weight pentafluoroethane (HFC-125), and
39.0% to 40% by weight trifluoroiodomethane (CF3I),
wherein said refrigerant satisfies the Non-Flammability Test.

64. The refrigerant of any one of Numbered Embodiments 1 to 4 and 30 to 33, wherein the refrigerant comprises at least about 98.5% by weight of the three components.

65. The refrigerant of any one of Numbered Embodiments 1 to 4 and 30 to 33, wherein the refrigerant comprises at least about 99.5% by weight of the three components.

66. The refrigerant of any one of Numbered Embodiments 1 to 4 and 30 to 33, wherein the refrigerant consists essentially of the three components.

67. The refrigerant of any one of Numbered Embodiments 1 to 39, wherein the refrigerant consists of the three components.

68. A heat transfer composition comprising a refrigerant of any one of Numbered Embodiments 1 to 67.

69. The heat transfer composition of Numbered Embodiment 68, wherein the composition comprising one or more of the refrigerants of Numbered Embodiments 1 to 67, in an amount of greater than 40% by weight of the heat transfer composition.

70. The heat transfer composition of Numbered Embodiment 68, wherein the composition comprising one or more of the refrigerants of Numbered Embodiments 1 to 67, in an amount of greater than 50% by weight of the heat transfer composition.

71. The heat transfer composition of Numbered Embodiment 68, wherein the composition comprising one or more of the refrigerants of Numbered Embodiments 1 to 67, in an amount of greater than 70% by weight of the heat transfer composition.

72. The heat transfer composition of Numbered Embodiment 68, wherein the composition comprising one or more of the refrigerants of Numbered Embodiments 1 to 67, in an amount of greater than 80% by weight of the heat transfer composition.

73. The heat transfer composition of Numbered Embodiment 68, wherein the composition comprising one or more of the refrigerants of Numbered Embodiments 1 to 67, in an amount of greater than 90% by weight of the heat transfer composition.

74. The heat transfer composition of Numbered Embodiment 68, wherein the composition consists essentially of one or more of the refrigerants of Numbered Embodiments 1 to 67.

75. The heat transfer composition of Numbered Embodiment 68, wherein the composition consists of one or more of the refrigerants of Numbered Embodiments 1 to 67.

76. The heat transfer compositions of any one of Numbered Embodiments 68 to 74, wherein the composition further comprises one or more component selected from the group consisting of a lubricant, a dye, a solubilizing agent, a compatibilizer, a stabilizer, an antioxidant, a corrosion inhibitor, an extreme pressure additive and an anti-wear additive.

77. The heat transfer composition of any one of Numbered Embodiments 68 to 73, wherein said composition comprises a stabilizer.

78. The heat transfer composition of Numbered Embodiment 77 wherein the stabilizer is provided in an amount of from about 0.1% to about 15% based on the weight of the heat transfer composition.

79. The heat transfer composition of Numbered Embodiments 77 or 78, wherein the stabiliser is at least one of (i) alkylated naphthalene compound(s); (ii) phenol-based compound(s); and (iii) diene-based compound(s).

80. The heat transfer composition of Numbered Embodiment 77 or 78, wherein the stabiliser is a combination of: (i) at least one alkylated naphthalene compound and (ii) at least one phenol-based compound.

81. The heat transfer composition of Numbered Embodiment 77 or 78, wherein the stabiliser is a combination of: (i) at least one alkylated naphthalene compound and (ii) at least diene-based compound.

82. The heat transfer composition of Numbered Embodiment 77 or 78, wherein the stabiliser is a combination of: (i) at least one diene-based compound and (ii) at least one phenol-based compound; and (iii) at least diene-based compound.

83. The heat transfer composition of any one of Numbered Embodiments 77 to 82, wherein the stabiliser additionally includes a phosphorus compound and/or a nitrogen compound and/or an epoxide selected from the group consisting of aromatic epoxides, alkyl epoxides and alkyenyl epoxides.

84. The heat transfer composition of Numbered Embodiment 77 or 78, wherein the stabiliser consists essentially of one or more alkylated naphthalenes and one or more phenol-based compounds.

85. The heat transfer composition of Numbered Embodiment 77 or 78, wherein the stabiliser consists essentially of one or more alkylated naphthalenes and one or more diene-based compounds.

86. The heat transfer composition of Numbered Embodiment 77 or 78, wherein the stabilizer consists essentially of one or more alkylated naphthalenes, one or more diene-based compounds and one or more phenol-based compounds.

87. The heat transfer composition of any one of Numbered Embodiments 79, 80, 81, 84, 85 and 86, wherein the alkylated naphthalene is a compound having the structure:

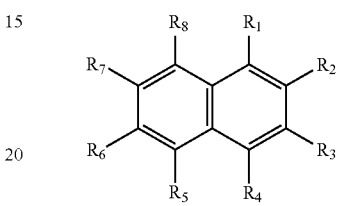

where each R1-R8 is independently selected from linear alkyl group, a branched alkyl group and hydrogen.

88. The heat transfer composition of any one of Numbered Embodiments 79, 80, 81, 84, 85, 86 and 87, wherein the alkylated naphthalene has the properties as set out in Table AN1 for Alkylated Napthalene 1.

89. The heat transfer composition of any one of Numbered Embodiments 79, 80, 81, 84, 85, 86 and 87, wherein the alkylated naphthalene has the properties as set out in Table AN1 for Alkylated Napthalene 2.

90. The heat transfer composition of any one of Numbered Embodiments 79, 80, 81, 84, 85, 86 and 87, wherein the alkylated naphthalene has the properties as set out in Table AN1 for Alkylated Napthalene 3

91. The heat transfer composition of any one of Numbered Embodiments 79, 80, 81, 84, 85, 86 and 87, wherein the alkylated naphthalene has the properties as set out in Table AN1 for Alkylated Napthalene 4

92. The heat transfer composition of any one of Numbered Embodiments 79, 80, 81, 84, 85, 86 and 87, wherein the alkylated naphthalene has the properties as set out in Table AN1 for Alkylated Napthalene 5

93. The heat transfer composition of any one of Numbered Embodiments 79, 80, 81, 84, 85, 86 and 87, wherein the alkylated naphthalene has the properties as set out in Table AN2 for Alkylated Napthalene 6.

94. The heat transfer composition of any one of Numbered Embodiments 79, 80, 81, 84, 85, 86 and 87, wherein the alkylated naphthalene has the properties as set out in Table AN2 for Alkylated Napthalene 7.

95. The heat transfer composition of any one of Numbered Embodiments 79, 80, 81, 84, 85, 86 and 87, wherein the alkylated naphthalene has the properties as set out in Table AN2 for Alkylated Napthalene 8

96. The heat transfer composition of any one of Numbered Embodiments 79, 80, 81, 84, 85, 86 and 87, wherein the alkylated naphthalene has the properties as set out in Table AN2 for Alkylated Napthalene 9

97. The heat transfer composition of any one of Numbered Embodiments 79, 80, 81, 84, 85, 86 and 87, wherein the alkylated naphthalene has the properties as set out in Table AN2 for Alkylated Napthalene 10.

98. The heat transfer composition of any one of Numbered Embodiments 79 to 81 and 84 to 97, wherein the alkylated naphthalene is one or more of NA-LUBE KR-007 Å; KR-008, KR-009; KR-0105, KR-019 and KR-005FG.

99. The heat transfer composition of any one of Numbered Embodiments 79 to 81 and 84 to 97, wherein the alkylated naphthalene is one or more of NA-LUBE KR-007 Å, KR-008, KR-009 and KR-005FG.

100. The heat transfer composition of any one of Numbered Embodiments 79 to 81 and 84 to 97, wherein the alkylated naphthalene is NA-LUBE KR-008.

101. The heat transfer composition of any one of Numbered Embodiments 79 to 81 and 84 to 100, wherein the alkylated naphthalene is present in an amount of from 0.01% to about 10%, where amounts are in percent by weight based on the amount of alkylated naphthalene and the refrigerant in the system.

102. The heat transfer composition of any one of Numbered Embodiments 79 to 81 and 84 to 101, wherein the alkylated naphthalene is present in an amount of from about 1.5% to about 4.5%, where amounts are in percent by weight based on the amount of alkylated naphthalene and refrigerant in the system.

103. The heat transfer composition of any one of Numbered Embodiments 79 to 81 and 84 to 102, wherein the alkylated naphthalene is present in an amount of from about 2.5% to about 3.5%,%, where amounts are in percent by weight based on the amount of alkylated naphthalene and refrigerant in the system.

104. The heat transfer composition of any one of Numbered Embodiments 79 to 81 and 84 to 103, wherein composition additionally comprises a lubricant and the alkylated naphthalene is present in an amount of from 0.1% to about 20%, where amounts are in percent by weight based on the amount of alkylated naphthalene and lubricant in the system.

105. The heat transfer composition of any one of Numbered Embodiments 79 to 81 and 84 to 104, wherein composition additionally comprises a lubricant and the alkylated naphthalene is present in an amount of from about 5% to about 15%, where amounts are in percent by weight based on the amount of alkylated naphthalene and lubricant in the system.

106. The heat transfer composition of any one of Numbered Embodiments 79 to 81 and 84 to 105, wherein composition additionally comprises a lubricant and the alkylated naphthalene is present in an amount of from about 8% to about 12%, where amounts are in percent by weight based on the amount of alkylated naphthalene and lubricant in the system.

107. The heat transfer composition of any one of Numbered Embodiments 104 to 106 wherein the lubricant comprises a POE lubricant.

108. The heat transfer composition of any one of Numbered Embodiments 104 to 107 wherein the lubricant comprises a POE lubricant having a viscosity at 40° C. measured according to ASTM D445C of from about 30 cSt to about 70 cSt.

109. The heat transfer composition of any one of Numbered Embodiments 79, 81, 82, 85 or 86, wherein the diene-based compound includes C3 to C15 dienes and to compounds formed by reaction of any two or more C3 to C4 dienes.

110. The heat transfer composition of Numbered Embodiment 109, wherein the diene based compound is selected from the group consisting of allyl ethers, propadiene, butadiene, isoprene, and terpenes.

111. The heat transfer composition of Numbered Embodiment 110, wherein the terpene is selected from terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1.

112. The heat transfer composition of Numbered Embodiment 111 wherein the stabilizer is farnesene.

113. The heat transfer composition of any one of Numbered Embodiments 109 to 112, wherein the diene based compounds are provided in the heat transfer composition in an amount greater than 0 and preferably from 0.0001% by weight to about 5% by weight, preferably 0.001% by weight to about 2.5% by weight, and more preferably from 0.01% to about 1% by weight wherein the percentage by weight refers to the weight of the heat transfer composition.

114. The heat transfer composition of any one of Numbered Embodiments 79, 80, 81, 84 and 86 wherein the stabilizer is a phenol based compound selected from 4,4'-methylenebis (2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis (4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-butyl-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

115. The heat transfer composition of Numbered Embodiment 114, wherein the phenol based compounds are provided in the heat transfer composition in an amount of greater than 0 and preferably from 0.0001% by weight to about 5% by weight, preferably 0.001% by weight to about 2.5% by weight, and more preferably from 0.01% to about 1% by weight, where percentage by weight refers to the weight of the heat transfer composition.

116. The heat transfer composition of Numbered Embodiment 77 wherein the stabilizer is a nitrogen compound, selected from one or more of diphenylamine, p-phenylenediamine, triethylamine, tributylamine, diisopropylamine, triisopropylamine and triisobutylamine or a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS®1944 (Mayzo Inc) and BLS® 1770 (Mayzo Inc) or an alkyldiphenyl amine such as bis (nonylphenyl amine), dialkylamine such as (N-(1-methylethyl)-2-propylamine, or phenyl-alpha-naphthyl amine (PANA), alkyl-phenyl-alpha-naphthyl-amine (APANA), and bis (nonylphenyl) amine or phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

117. The heat transfer composition of Numbered Embodiment 77 wherein the stabilizer is one or more compounds selected from dinitrobenzene, nitrobenzene, nitromethane, nitrosobenzene, and TEMPO [(2,2,6,6-tetramethylpiperidin-1-yl)oxyl]

118. The heat transfer composition of Numbered Embodiments 116 or 117 wherein the nitrogen compound is provided in the heat transfer composition in an amount of greater than 0 and from 0.0001% by weight to about 5% by weight, preferably 0.001% by weight to about 2.5% by weight, and more preferably from 0.01% to about 1% by weight, where, percentage by weight refers to the weight of the heat transfer composition.

119. The heat transfer composition of Numbered Embodiment 77 or 78 wherein the stabilizer is an epoxide selected from an aromatic epoxide, alkyl epoxide, and alkenyl epoxide.

120. The heat transfer composition of Numbered Embodiment 77 or 78, wherein the stabilizer is isobutylene.

121. The heat transfer composition of Numbered Embodiment 77, comprising a refrigerant as defined in any one of Numbered Embodiments 1 to 67 and a stabilizer composition comprising BHT, wherein said BHT is present in an amount of from about 0.0001% by weight to about 5% by weight based on the weight of heat transfer composition. BHT.

122. The heat transfer composition of Numbered Embodiment 77 comprising a refrigerant as defined in any one of Numbered Embodiments 1 to 67 and a stabilizer composition comprising farnesene, Alkylated Napthalene 4 and BHT, wherein the farnesene is provided in an amount of from about 0.0001% by weight to about 5% by weight based on the weight of the heat transfer composition, the Alkylated Naphthalene 4, is provided in an amount of from about 0.0001% by weight to about 5% by weight based on the weight of the heat transfer composition, and the BHT is provided in an amount of from about 0.0001% by weight to about 5% by weight based on the weight of heat transfer composition.

123. The heat transfer composition of Numbered Embodiment 77 comprising a refrigerant as defined in any one of Numbered Embodiments 1 to 67 and a stabilizer composition comprising farnesene, Alkylated Naphthalene 5 and BHT, wherein the farnesene is provided in an amount of from about 0.0001% by weight to about 5% by weight based on the weight of the heat transfer composition, the Alkylated Naphthalene 5 is provided in an amount of from about 0.0001% by weight to about 5% by weight based on the weight of the heat transfer composition, and the BHT is provided in an amount of from about 0.0001% by weight to about 5% by weight based on the weight of heat transfer composition.

124. The heat transfer composition of Numbered Embodiment 77 comprising a refrigerant as defined in any one of Numbered Embodiments 1 to 67 and a stabilizer composition comprising farnesene, Alkylated Napthalene 4 and BHT, wherein the farnesene is provided in an amount of from about 0.001% by weight to about 2.5% by weight based on the weight of the heat transfer composition, the Alkylated Napthalene 4 5 is provided in an amount of from about 0.001% by weight to about 2.5% by weight based on the weight of the heat transfer composition, and the BHT is provided in an amount of from about 0.001% by weight to about 2.5% by weight based on the weight of heat transfer composition.

125. The heat transfer composition of Numbered Embodiment 77 comprising a refrigerant as defined in any one of Numbered Embodiments 1 to 67 and a stabilizer composition comprising farnesene, Alkylated Naphthalene 5 and BHT, wherein the farnesene is provided in an amount of from about 0.001% by weight to about 2.5% by weight based on the weight of the heat transfer composition, the Alkylated Napthalene 5 is provided in an amount of from about 0.001% by weight to about 2.5% by weight based on the weight of the heat transfer composition, and the BHT is provided in an amount of from about 0.001% by weight to about 2.5% by weight based on the weight of heat transfer composition.

126. The heat transfer composition of Numbered Embodiment 77 comprising a refrigerant as defined in any one of Numbered Embodiments 1 to 67 and a stabilizer composition comprising farnesene, Alkylated Napthalene 4 and BHT, wherein the farnesene is provided in an amount of from about 0.01% by weight to about 1% by weight based on the weight of the heat transfer composition, the Alkylated Napthalene 4 is provided in an amount of from about 0.01% by weight to about 1% by weight based on the weight of the heat transfer composition, and the BHT is provided in an amount of from about 0.01% by weight to about 1% by weight based on the weight of heat transfer composition.

127. The heat transfer composition of Numbered Embodiment 77 comprising a refrigerant as defined in any one of Numbered Embodiments 1 to 67 and a stabilizer composition comprising farnesene, Alkylated Naphthalene 5 and BHT, wherein the farnesene is provided in an amount of from about 0.01% by weight to about 1% by weight based on the weight of the heat transfer composition, the Alkylated Naphthalene 5 is provided in an amount of from about 0.01% by weight to about 1% by weight based on the weight of the heat transfer composition, and the BHT is provided in an amount of from about 0.01% by weight to about 1% by weight based on the weight of heat transfer composition.

128. The heat transfer composition of any one of Numbered Embodiments 68 to 127, further comprising a lubricant.

129. The heat transfer composition of Numbered Embodiment 128, wherein the lubricant is present in an amount of from 0.1 to 5% by weight of the heat transfer composition.

130. The heat transfer composition of Numbered Embodiment 128, wherein the lubricant is present in an amount of from 0.1 to 1% by weight of the heat transfer composition.

131. The heat transfer composition of Numbered Embodiment 128, wherein the lubricant is present in an amount of from 0.1 to 0.5% by weight of the heat transfer composition.

132. The heat transfer composition of any one of Numbered Embodiments 128 to 131, wherein the lubricant is one or more of polyol esters (POEs), polyalkylene glycols (PAGs), silicone oils, mineral oil, alkylbenzenes (ABs), polyvinyl ethers (PVEs) and poly(alpha-olefin) (PAO).

133. The heat transfer composition of any one of Numbered Embodiments 128 to 131, wherein the lubricant is one or more of polyol esters (POEs), polyalkylene glycols (PAGs), mineral oil, alkylbenzenes (ABs) and polyvinyl ethers (PVE).

134. The heat transfer composition of any one of Numbered Embodiments 128 to 131, wherein the lubricant is one or more of polyol esters (POEs), mineral oil, alkylbenzenes (ABs) and polyvinyl ethers (PVE).

135. The heat transfer composition of any one of Numbered Embodiments 128 to 131, wherein the lubricant is one or more of polyol esters (POEs), mineral oil and alkylbenzenes (ABs).

136. The heat transfer composition of any one of Numbered Embodiments 128 to 131, wherein the lubricant is a polyol ester (POE).

137. The heat transfer composition of Numbered Embodiment 136, wherein the lubricant consists essentially of a POE having a viscosity at 40° C. measured in accordance with ASTM D445 of from about 30 to about 70 based on the weight of the heat transfer composition.

138. The heat transfer composition of any one of Numbered Embodiments 136 to 137, comprising from 0.1 to 0.5% by weight of a polyol ester (POE) lubricant, based on the weight of the heat transfer composition.

139. The heat transfer composition of any one of Numbered Embodiments 68 to 138, wherein the composition has a Global Warming Potential (GWP) of not greater than about 1500.

140. The heat transfer composition of any one of Numbered Embodiments 68 to 138, wherein the composition has a Global Warming Potential (GWP) of not greater than about 1000.

141. The heat transfer composition of any one of Numbered Embodiments 68 to 138, wherein the composition has a Global Warming Potential (GWP) of not greater than about 750.

142. The heat transfer composition of any one of Numbered Embodiments 68 to 141, wherein the composition has an Ozone Depletion Potential (ODP) of not greater than 0.05.

143. The heat transfer composition of any one of Numbered Embodiments 68 to 141, wherein the composition has an Ozone Depletion Potential (ODP) of not greater than 0.02.

144. The heat transfer composition of any one of Numbered Embodiments 68 to 141, wherein the composition has an Ozone Depletion Potential (ODP) of about zero.

145. The heat transfer composition of any one of Numbered Embodiments 68 to 144, wherein the composition has an Occupational Exposure Limit (OEL) of greater than about 400.

146. A heat transfer system comprising a compressor, an evaporator, a condenser and an expansion device, in fluid communication with each other and a heat transfer composition as defined in any one of Numbered Embodiments 68 to 145.

147. A heat transfer system comprising a compressor, an evaporator, a condenser and an expansion device, in fluid communication with each other and a heat transfer composition as defined in any one of Numbered Embodiments 68 to 127 and 139 to 145, wherein the heat transfer system comprises a lubricant in an amount of from 5 to 60% by weight of the heat transfer composition.

148. The heat transfer system of Numbered Embodiment 147, wherein the lubricant is present in an amount of from 10 to 60% by weight of the heat transfer composition.

149. The heat transfer system of Numbered Embodiment 147, wherein the lubricant is present in an amount of from 20 to 50% by weight of the heat transfer composition.

150. The heat transfer system of Numbered Embodiment 147, wherein the lubricant is present in an amount of from 20 to 40% by weight of the heat transfer composition.

151. The heat transfer system of Numbered Embodiment 147, wherein the lubricant is present in an amount of from 20 to 30% by weight of the heat transfer composition.

152. The heat transfer system of Numbered Embodiment 147, wherein the lubricant is present in an amount of from 30 to 50% by weight of the heat transfer composition.

153. The heat transfer system of Numbered Embodiment 147, wherein the lubricant is present in an amount of from 30 to 40% by weight of the heat transfer composition.

154. The heat transfer system of Numbered Embodiment 147, wherein the lubricant is present in an amount of from 5 to 10% by weight of the heat transfer composition.

155. The heat transfer system of Numbered Embodiment 147, wherein the lubricant is present in an amount of 8% by weight of the heat transfer composition.

156. The heat transfer system of any one of Numbered Embodiments 147 to 155, wherein the lubricant is one or more of polyol esters (POEs), polyalkylene glycols (PAGs), silicone oils, mineral oil, alkylbenzenes (ABs), polyvinyl ethers (PVEs) and poly(alpha-olefin) (PAO).

157. The heat transfer system of any one of Numbered Embodiments 147 to 155, wherein the lubricant is one or more of polyol esters (POEs), polyalkylene glycols (PAGs), mineral oil, alkylbenzenes (ABs) and polyvinyl ethers (PVE).

158. The heat transfer system of any one of Numbered Embodiments 147 to 155, wherein the lubricant is one or more of polyol esters (POEs), mineral oil, alkylbenzenes (ABs) and polyvinyl ethers (PVE).

159. The heat transfer system of any one of Numbered Embodiments 147 to 155, wherein the lubricant is one or more of polyol esters (POEs), mineral oil and alkylbenzenes (ABs).

160. The heat transfer system of any one of Numbered Embodiments 147 to 155, wherein the lubricant is a polyol ester (POE).

161. The heat transfer system of Numbered Embodiment 160, wherein the lubricant consists essentially of a POE having a viscosity at 40° C. measured in accordance with ASTM D445 of from about 30 to about 70 based on the weight of the heat transfer composition.

162. The heat transfer system of any one of Numbered Embodiments 160 to 161, comprising from 10 to 50% by weight of a polyol ester (POE) lubricant, based on the weight of the heat transfer composition.

163. A heat transfer system comprising a compressor, an evaporator, a condenser and an expansion device, in fluid communication with each other, a heat transfer composition comprising a refrigerant as defined in any one of Numbered Embodiments 1 to 67 and a lubricant as defined in any one of Numbered Embodiments 128 to 138, and a sequestration material, wherein said sequestration material comprises:
   i. copper or a copper alloy, or
   ii. activated alumina, or
   iii. a zeolite molecular sieve comprising copper, silver, lead or a combination thereof, or
   iv. an anion exchange resin, or
   v. a moisture-removing material, preferably a moisture-removing molecular sieve, or
   vi. a combination of two or more of the above.

164. The heat transfer system of Numbered Embodiment 163, wherein the sequestration material comprises two or more of
   i. copper or a copper alloy, or
   ii. activated alumina, or
   iii. a zeolite molecular sieve comprising copper, silver, lead or a combination thereof, or
   iv. an anion exchange resin, or
   v. a moisture-removing material, preferably a moisture-removing molecular sieve.

165. The heat transfer system of Numbered Embodiment 163, wherein the sequestration material comprises
   ii. activated alumina,
   iii. a zeolite molecular sieve comprising copper, silver, lead or a combination thereof,
   iv. an anion exchange resin, and
   v. a moisture-removing material, preferably a moisture-removing molecular sieve.

166. The heat transfer system of Numbered Embodiment 163, wherein the sequestration material comprises
   ii. activated alumina,
   iii. silver
   iv. an anion exchange resin, and
   v. a moisture-removing material, preferably a moisture-removing molecular sieve.
167. The heat transfer system of any one of Numbered Embodiments 163 to 166, wherein said system includes an oil separator downstream of the compressor and wherein the sequestration material is located inside the oil separator, such that the liquid lubricant contacts the sequestration material.
168. The heat transfer system of any one of Numbered Embodiments 163 to 166, wherein said system includes an oil separator downstream of the compressor and wherein the sequestration material is located outside the oil separation and downstream of the oil separator, such that the liquid lubricant contacts the sequestration material.
169. The heat transfer system of any one of Numbered Embodiments 163 to 166 wherein the sequestration material is located in the refrigerant liquid which exits the condenser.
170. A method of transferring heat in a heat transfer system, said method comprising evaporating a refrigerant liquid to produce a refrigerant vapor, compressing in a compressor at least a portion of the refrigerant vapor and condensing a refrigerant vapor in a plurality of repeating cycles, said method comprising:
   (a) providing a refrigerant according to Numbered Embodiments 1 to 67
   (b) optionally but preferably providing lubricant for said compressor; and
   (b) exposing at least a portion of said refrigerant and/or at least a portion of said lubricant to a Sequestration Material as defined in any one of Numbered Embodiments 163 to 166.
171. The method as defined in Numbered Embodiment 170, wherein said at least portion of said refrigerant and/or at least a portion of said lubricant is exposed to the Sequestration Material at a temperature is above about 10° C.
172. The heat transfer system of any one of Numbered Embodiments 163 to 169 wherein the components of the Sequestration Material are included together in a filter element.
173. The heat transfer system of any one of Numbered Embodiments 163 to 169 wherein the components of the Sequestration Material are included together in porous solid which contains and/or has embedded therein two or more of sequestration materials such that such materials are accessible to fluids passing through said solid.
174. The heat transfer system of Numbered Embodiment 173 wherein the porous solid comprises a filter element.
175. The heat transfer system as defined in any one of Numbered Embodiments 163 to 169 and 172 to 174, wherein the sequestration material is copper.
176. The heat transfer system as defined in any one of Numbered Embodiments 163 to 169 and 172 to 174, wherein the sequestration material is a copper alloy, wherein said copper alloy additionally comprises one or more metal elements selected from tin, aluminium, silicon, nickel or a combination thereof or one or more non-metal elements selected from carbon, nitrogen, silicon, oxygen or a combination thereof.
177. The heat transfer system as defined in Numbered Embodiment 176, wherein the copper alloy comprises at least about 5 wt % of copper, based on the total weight of the copper alloy.
178. The heat transfer system as defined in Numbered Embodiment 176, wherein the copper alloy comprises at least about 15 wt % of copper, based on the total weight of the copper alloy.
179. The heat transfer system as defined in Numbered Embodiment 176, wherein the copper alloy comprises at least about 30 wt % of copper, based on the total weight of the copper alloy.
180. The heat transfer system as defined in Numbered Embodiment 176, wherein the copper alloy comprises at least about 50 wt % of copper, based on the total weight of the copper alloy.
181. The heat transfer system as defined in Numbered Embodiment 176, wherein the copper alloy comprises at least about 70 wt % of copper, based on the total weight of the copper alloy.
182. The heat transfer system as defined in Numbered Embodiment 176, wherein the copper alloy comprises at least about 90 wt % of copper, based on the total weight of the copper alloy.
183. The heat transfer system as defined Numbered Embodiment 176, wherein the copper alloy comprises from about 5 wt % to about 95 wt % of copper, based on the total weight of the copper alloy.
184. The heat transfer system as defined in Numbered Embodiment 176, wherein the copper alloy comprises from about 10 wt % to about 90 wt % of copper, based on the total weight of the copper alloy.
185. The heat transfer system as defined in Numbered Embodiment 176, wherein the copper alloy comprises from about 15 wt % to about 85 wt % of copper, based on the total weight of the copper alloy.
186. The heat transfer system as defined in Numbered Embodiment 176, wherein the copper alloy comprises from about 20 wt % to about 80 wt % of copper, based on the total weight of the copper alloy.
187. The heat transfer system as defined in Numbered Embodiment 176, wherein the copper alloy comprises from about 30 wt % to about 70 wt % of copper, based on the total weight of the copper alloy.
188. The heat transfer system as defined in Numbered Embodiment 176, wherein the copper alloy comprises from about 40 wt % to about 60 wt % of copper, based on the total weight of the copper alloy.
189. The heat transfer system as defined in Numbered Embodiment 175, wherein the copper metal contains at least about 99 wt % of elemental copper.
190. The heat transfer system as defined in Numbered Embodiment 175, wherein the copper metal contains at least about 99.5 wt % of elemental copper.
191. The heat transfer system as defined in Numbered Embodiment 175, wherein the copper metal contains at least about 99.9 wt % of elemental copper.
192. The heat transfer system as defined in any one of Numbered Embodiments 163 to 169, 175 and 189 to 191, wherein the metal is in the form of a mesh, wool, spheres, cones or cylinders.
193. The heat transfer system as defined in any one of Numbered Embodiments 175 to 192, wherein the copper or copper alloy has a BET surface area of at least about 10 $m^2/g$, when measured in accordance with ASTM D6556-10.
194. The heat transfer system as defined in any one of Numbered Embodiments 175 to 192, wherein the copper or copper alloy has a BET surface area of at least about 20 $m^2/g$, when measured in accordance with ASTM D6556-10.
195. The heat transfer system as defined in any one of Numbered Embodiments 175 to 192, wherein the copper or copper alloy has a BET surface area of at least about 30 m²/g, when measured in accordance with ASTM D6556-10.
196. The heat transfer system as defined in any one of Numbered Embodiments 175 to 192, wherein the copper or copper alloy has a BET surface area of at least about 40 m²/g, when measured in accordance with ASTM D6556-10.
197. The heat transfer system as defined in any one of Numbered Embodiments 175 to 192, wherein the copper or copper alloy has a BET surface area of at least about 50 m²/g, when measured in accordance with ASTM D6556-10.
198. The heat transfer system as defined in any one of Numbered Embodiments 175 to 192, wherein the BET surface area of the copper or copper alloy is from about 0.01 to about 1.5 m² per kg of refrigerant.
199. The heat transfer system as defined in any one of Numbered Embodiments 175 to 192, wherein the BET surface area of the copper or copper alloy is from about 0.02 to about 0.5 m² per kg of refrigerant.
200. The heat transfer system as defined in any one of Numbered Embodiments 175 to 192, wherein the BET surface area of the copper or copper alloy is 0.08 m² per kg of refrigerant.
201. The heat transfer system as defined in any one of Numbered Embodiments 163 to 169 wherein the sequestration material comprises a zeolite molecular sieve comprising a metal selected from copper, silver, lead or a combination thereof.
202. The heat transfer system as defined in Numbered Embodiment 201, wherein the metal is silver.
203. The heat transfer system as defined in any one of Numbered Embodiments 201 to 202 wherein the zeolite molecular sieve contains the metal in an amount of from about 1% to about 30% by weight based on the total weight of the zeolite.
204. The heat transfer system as defined in any one of Numbered Embodiments 201 to 202 wherein the zeolite molecular sieve contains the metal in an amount of from about 5% to about 20% by weight based on the total weight of the zeolite.
205. The heat transfer system as defined in any one of Numbered Embodiments 201 to 204 wherein the metal is present in a single oxidation state, or in a variety of oxidation states.
206. The heat transfer system as defined in any one of Numbered Embodiments 201 to 205 wherein the zeolite molecular sieve comprises metals other than silver, lead, and/or copper.
207. The heat transfer system as defined in any one of Numbered Embodiments 201 to 206 wherein the zeolite molecular sieve has a size across its largest dimension of from about 5 to 40 Å.
208. The heat transfer system as defined in any one of Numbered Embodiments 201 to 206 wherein the zeolite molecular sieve has a size across its largest dimension of about 35 Å or less.
209. The heat transfer system as defined in any one of Numbered Embodiments 201 to 206 wherein the zeolite molecular sieve has a size across its largest dimension of from about 15 to about 35 Å.
210. The heat transfer system as defined in any one of Numbered Embodiments 201 to 209 wherein the zeolite molecular sieve is present in an amount of from about 1 wt % to about 30 wt %, relative to the total amount of molecular sieve, refrigerant and lubricant (if present) in the heat transfer system.
211. The heat transfer system as defined in any one of Numbered Embodiments 201 to 209 wherein the zeolite molecular sieve is present in an amount of from about 2 wt % to about 25 wt %, relative to the total amount of molecular sieve, refrigerant and lubricant (if present) in the heat transfer system.
212. The heat transfer system as defined in any one of Numbered Embodiments 201 to 209 wherein the zeolite molecular sieve comprises silver, and where the molecular sieve is present in an amount of at least 5% parts by weight (pbw), based on the total amount of molecular sieve (e.g. zeolite) and lubricant in the heat transfer system.
213. The heat transfer system as defined in any one of Numbered Embodiments 201 to 209 wherein the zeolite molecular sieve comprises silver, and where the molecular sieve is present in an amount of from about 5 pbw to about 30 pbw, based on the total amount of molecular sieve (e.g. zeolite) and lubricant in the heat transfer system.
214. The heat transfer system as defined in any one of Numbered Embodiments 201 to 209 wherein the zeolite molecular sieve comprises silver, and where the molecular sieve is present in an amount of from about 5 pbw to about 20 pbw, based on the total amount of molecular sieve (e.g. zeolite) and lubricant in the heat transfer system.
215. The heat transfer system as defined in any one of Numbered Embodiments 201 to 209 wherein the zeolite molecular sieve comprises silver, and where the amount of the silver present in the molecular sieve is from about 1% to about 30% by weight, based on the total weight of the zeolite.
216. The heat transfer system as defined in any one of Numbered Embodiments 201 to 209 wherein the zeolite molecular sieve comprises silver, and where the amount of the silver present in the molecular sieve is from about 5% to about 20% by weight, based on the total weight of the zeolite.
217. The heat transfer system as defined in any one of Numbered Embodiments 201 to 209 wherein the zeolite molecular sieve comprises silver, and the molecular sieve is present in an amount of at least 10 pphl, by weight relative to the total amount of molecular sieve (e.g. zeolite), and lubricant in the heat transfer system.
218. The heat transfer system as defined in any one of Numbered Embodiments 201 to 209 wherein the zeolite molecular sieve comprises silver, and the molecular sieve is present in an amount of from about 10 pphl to about 30 pphl, by weight relative to the total amount of molecular sieve (e.g. zeolite), and lubricant in the heat transfer system.
219. The heat transfer system as defined in any one of Numbered Embodiments 201 to 209 wherein the zeolite molecular sieve comprises silver, and the molecular sieve is present in an amount of from about 10 pphl to about 20 pphl, by weight relative to the total amount of molecular sieve (e.g. zeolite), and lubricant in the heat transfer system.
220. The heat transfer system as defined in any one of Numbered Embodiments 201 to 209 wherein the zeolite molecular sieve comprises silver, and the molecular sieve is present in an amount of from about 15 pphl to about 30 pphl, by weight relative to the total amount of molecular sieve (e.g. zeolite), and lubricant in the heat transfer system.
221. The heat transfer system as defined in any one of Numbered Embodiments 201 to 209 wherein the zeolite molecular sieve comprises silver, and the molecular sieve is present in an amount of from about 15 pphl to about 20 pphl, by weight relative to the total amount of molecular sieve (e.g. zeolite), and lubricant in the heat transfer system.
222. The heat transfer system as defined in any one of Numbered Embodiments 201 to 209 wherein the zeolite molecular sieve comprises silver, and the amount of the silver present in the molecular sieve is from about 1% to about 30% by weight, based on the total weight of the zeolite.
223. The heat transfer system as defined in any one of Numbered Embodiments 201 to 209 wherein the zeolite molecular sieve comprises silver, and the amount of the silver present in the molecular sieve is from about 5% to about 20% by weight, based on the total weight of the zeolite.
224. The heat transfer system as defined in any one of Numbered Embodiments 201 to 209 wherein the zeolite molecular sieve is present in an amount of at least about 15 pphl, relative to the total amount of molecular sieve and lubricant in the system.
225. The heat transfer system as defined in any one of Numbered Embodiments 201 to 209 wherein the zeolite molecular sieve is present in an amount of at least about 18 pphl, relative to the total amount of molecular sieve and lubricant in the system.
226. The heat transfer system as defined in any one of Numbered Embodiments 201 to 209 wherein the zeolite molecular sieve is present in an amount of from about 15 pphl to about 30 pphl, relative to the total amount of molecular sieve and lubricant in the system.
227. The heat transfer system as defined in any one of Numbered Embodiments 201 to 209 wherein the zeolite molecular sieve is present in an amount of from about 18 pphl to about 25 pphl, relative to the total amount of molecular sieve and lubricant in the system.
228. The heat transfer system as defined in any one of Numbered Embodiments 201 to 209 wherein the zeolite molecular sieve is present in an amount of about 5 pphl, relative to the total amount of molecular sieve and lubricant in the system.
229. The heat transfer system as defined in any one of Numbered Embodiments 201 to 209 wherein the zeolite molecular sieve is present in an amount of about 21 pphl, relative to the total amount of molecular sieve and lubricant in the system.
230. The heat transfer system as defined in any one of Numbered Embodiments 163 to 169, wherein the sequestration material comprises an anion exchange resin.
231. The heat transfer system as defined in Numbered Embodiment 230, wherein the anion exchange resin is a type 1 resin strongly basic anion exchange resin.
232. The heat transfer system as defined in Numbered Embodiment 230, wherein the anion exchange resin is a type 2 resin strongly basic anion exchange resin.
233. The heat transfer system as defined in any one of Numbered Embodiments 230 to 232, wherein the anion exchange resin is provided as beads, having a size across their largest dimension of from about 0.3 mm to about 1.2 mm, when dry.
234. The heat transfer system as defined in any one of Numbered Embodiments 230 to 233, wherein the anion exchange resin is present in an amount of from about 1 pphl to about 60 pphl, based on the total amount of anion exchange resin and lubricant in the system.
235. The heat transfer system as defined in any one of Numbered Embodiments 230 to 233, wherein the anion exchange resin is present in an amount of from about 5 pphl to about 60 pphl, based on the total amount of anion exchange resin and lubricant in the system.
236. The heat transfer system as defined in any one of Numbered Embodiments 230 to 233, wherein the anion exchange resin is present in an amount of from about 20 pphl to about 50 pphl, based on the total amount of anion exchange resin and lubricant in the system.
237. The heat transfer system as defined in any one of Numbered Embodiments 230 to 233, wherein the anion exchange resin is present in an amount of from about 20 pphl to about 30 pphl, based on the total amount of anion exchange resin and lubricant in the system.
238. The heat transfer system as defined in any one of Numbered Embodiments 230 to 233, wherein the anion exchange resin is present in an amount of from about 1 pphl to about 25 pphl, based on the total amount of anion exchange resin and lubricant in the system.
239. The heat transfer system as defined in any one of Numbered Embodiments 230 to 233, wherein the anion exchange resin is present in an amount of from about 2 pphl to about 20 pphl, based on the total amount of anion exchange resin and lubricant in the system.
240. The heat transfer system as defined in any one of Numbered Embodiments 230 to 233, wherein the anion exchange resin is present in an amount of at least about 10 pphl, based on the total amount of anion exchange resin and lubricant in the system.
241. The heat transfer system as defined in any one of Numbered Embodiments 230 to 233, wherein the anion exchange resin is present in an amount of at least about 15 pphl, based on the total amount of anion exchange resin and lubricant in the system.
242. The heat transfer system as defined in any one of Numbered Embodiments 230 to 233, wherein the anion exchange resin is present in an amount of from about 10 pphl to about 25 pphl, based on the total amount of anion exchange resin and lubricant in the system.
243. The heat transfer system as defined in any one of Numbered Embodiments 230 to 233, wherein the anion exchange resin is present in an amount of from about 15 pphl to about 20 pphl, based on the total amount of anion exchange resin and lubricant in the system.
244. The heat transfer system as defined in any one of Numbered Embodiments 230 to 233, wherein the anion exchange resin is present in an amount of about 4 pphl based on the total amount of anion exchange resin and lubricant in the system.
245. The heat transfer system as defined in any one of Numbered Embodiments 230 to 233, wherein the anion exchange resin is present in an amount of about 16 pphl based on the total amount of anion exchange resin and lubricant in the system.
246. The heat transfer system as defined in any one of Numbered Embodiments 230 to 245, wherein the anion exchange resin is Amberlyst A21 (Free Base).
247. The heat transfer system as defined in any one of Numbered Embodiments 163 to 166, wherein the sequestration material is a sodium aluminosilicate molecular sieve selected from the group consisting of type 3A, 4A, 5A and 13X.
248. The heat transfer system as defined in Numbered Embodiment 247, wherein the sodium aluminosilicate molecular sieve is provided in an amount from about 15 pphl to about 60 pphl by weight, based on the total amount of sodium aluminosilicate molecular sieve and lubricant in the system.
249. The heat transfer system as defined in any one of Numbered Embodiments 247 to 248, wherein the sodium aluminosilicate molecular sieve is provided in an amount from about 30 pphl to about 45 pphl by weight, based on the total amount of sodium aluminosilicate molecular sieve and lubricant in the system.

250. The heat transfer system as defined in any one of Numbered Embodiments 163 to 166, wherein the sequestration material is activated alumina.

251. The heat transfer system as defined in Numbered Embodiment 250, wherein the activated alumina is a sodium activated alumina.

252. The heat transfer system as defined in any one of Numbered Embodiments 250 to 251, wherein the activated alumina is F200 or CLR-204.

253. The heat transfer system as defined in any one of Numbered Embodiments 250 to 252, wherein the activated alumina is provided in an amount of from about 1 pphl to about 60 pphl based on the total amount of activated alumina and lubricant in the system.

254. The heat transfer system as defined in any one of Numbered Embodiments 250 to 252, wherein the activated alumina is provided in an amount of from about 5 pphl to about 60 pphl based on the total amount of activated alumina and lubricant in the system.

255. The heat transfer system as defined in any one of Numbered Embodiments 163 to 166 wherein the sequestration material comprises at least (i) copper or a copper alloy, and (ii) a molecular sieve (e.g. a zeolite) comprising copper, silver, lead or a combination thereof.

256. The heat transfer system as defined in any one of Numbered Embodiments 163 to 166 wherein the sequestration material comprises (i) a molecular sieve (e.g. a zeolite) comprising copper, silver, lead or a combination thereof, and (ii) an anion exchange resin.

257. The heat transfer system as defined in any one of Numbered Embodiments 163 to 166 wherein the sequestration material comprises (i) copper or a copper alloy, and (ii) an anion exchange resin.

258. The heat transfer system as defined in any one of Numbered Embodiments 256 to 257 wherein the anion exchange resin is present in an amount of from about 1 pphl to about 25 pphl, based on the total amount of anion exchange resin and lubricant in the system.

259. The heat transfer system as defined in any one of Numbered Embodiments 256 to 257 wherein the anion exchange resin is present in an amount of from about 2 pphl to about 20 pphl, based on the total amount of anion exchange resin and lubricant in the system.

260. The heat transfer system as defined in any one of Numbered Embodiments 256 to 257 wherein the anion exchange resin is present in an amount of at least about 10 pphl, based on the total amount of anion exchange resin and lubricant in the system.

261. The heat transfer system as defined in any one of Numbered Embodiments 256 to 257 wherein the anion exchange resin is present in an amount of at least about 15 pphl, based on the total amount of anion exchange resin and lubricant in the system.

262. The heat transfer system as defined in any one of Numbered Embodiments 256 to 257 wherein the anion exchange resin is present in an amount of from about 10 pphl to about 25 pphl, based on the total amount of anion exchange resin and lubricant in the system.

263. The heat transfer system as defined in any one of Numbered Embodiments 256 to 257 wherein the anion exchange resin is present in an amount of from about 15 pphl to about 20 pphl, based on the total amount of anion exchange resin and lubricant in the system.

264. The heat transfer system as defined in any one of Numbered Embodiments 256 to 257 wherein the anion exchange resin is present in an amount of about 4 pphl based on the total amount of anion exchange resin and lubricant in the system.

265. The heat transfer system as defined in any one of Numbered Embodiments 256 to 257 wherein the anion exchange resin is present in an amount of about 16 pphl based on the total amount of anion exchange resin and lubricant in the system.

266. The heat transfer system as defined in any one of Numbered Embodiments 255 to 256 wherein the zeolite molecular sieve comprising copper, silver, lead or a combination thereof, is present in an amount of from about 1 pphl to about 30 pphl, based on the total amount of molecular sieve (e.g. zeolite) and lubricant present in the system.

267. The heat transfer system as defined in any one of Numbered Embodiments 255 to 256 wherein the zeolite molecular sieve is present in an amount of from about 2 pphl to about 25 pphl, based on the total amount of molecular sieve (e.g. zeolite) and lubricant present in the system.

268. The heat transfer system as defined in any one of Numbered Embodiments 255 to 256 wherein the zeolite molecular sieve is present in an amount of at least about 15 pphl, relative to the total amount of molecular sieve and lubricant present in the system.

269. The heat transfer system as defined in any one of Numbered Embodiments 255 to 256 wherein the zeolite molecular sieve is present in an amount of at least about 18 pphl, relative to the total amount of molecular sieve and lubricant present in the system.

270. The heat transfer system as defined in any one of Numbered Embodiments 255 to 256 wherein the zeolite molecular sieve is present in an amount of from about 15 pphl to about 30 pphl, relative to the total amount of molecular sieve (e.g. zeolite) and lubricant present in the system.

271. The heat transfer system as defined in any one of Numbered Embodiments 255 to 256 wherein the zeolite molecular sieve is present in an amount of from about 18 pphl to about 25 pphl, relative to the total amount of molecular sieve (e.g. zeolite) and lubricant present in the system.

272. The heat transfer system as defined in any one of Numbered Embodiments 255 to 256 wherein the zeolite molecular sieve is present in an amount of about 5 pphl relative to the total amount of molecular sieve (e.g. zeolite) and lubricant present in the system.

273. The heat transfer system as defined in any one of Numbered Embodiments 255 to 256 wherein the zeolite molecular sieve is present in an amount of about 21 pphl relative to the total amount of molecular sieve (e.g. zeolite) and lubricant present in the system.

274. The heat transfer system as defined in any one of Numbered Embodiments 255 to 257 wherein the copper or copper alloy has a surface area of from about 0.01 $m^2$ to about 1.5 $m^2$ per kg of refrigerant.

275. The heat transfer system as defined in any one of Numbered Embodiments 255 to 257 wherein the copper or copper alloy has a surface area of from about 0.02 $m^2$ to about 0.5 $m^2$ per kg of refrigerant.

276. The heat transfer system as defined in any one of Numbered Embodiments 255 to 257 wherein the copper or copper alloy has a surface area of about 0.08 $m^2$ per kg of refrigerant.

277. The heat transfer system as defined in Numbered Embodiment 256 wherein when the sequestration material comprises an anion exchange resin and a molecular sieve (e.g. a zeolite), the weight ratio (when dry) of anion exchange resin to molecular sieve (e.g. zeolite) is preferably in the range of from about 10:90 to about 90:10.

278. The heat transfer system as defined in Numbered Embodiments 256 wherein when the sequestration material comprises an anion exchange resin and a molecular sieve (e.g. a zeolite), the weight ratio (when dry) of anion exchange resin to molecular sieve (e.g. zeolite) is preferably in the range of from about 20:80 to about 80:20.

279. The heat transfer system as defined in Numbered Embodiments 256 wherein when the sequestration material comprises an anion exchange resin and a molecular sieve (e.g. a zeolite), the weight ratio (when dry) of anion exchange resin to molecular sieve (e.g. zeolite) is preferably in the range of from about 30:70 to about 70:30.

280. The heat transfer system as defined in Numbered Embodiments 256 wherein when the sequestration material comprises an anion exchange resin and a molecular sieve (e.g. a zeolite), the weight ratio (when dry) of anion exchange resin to molecular sieve (e.g. zeolite) is preferably in the range of from about 60:40 to about 40:60.

281. The heat transfer system as defined in Numbered Embodiments 256 wherein when the sequestration material comprises an anion exchange resin and a metal zeolite, the weight ratios of anion exchange resin to metal zeolite is about 25:75.

282. The heat transfer system as defined in Numbered Embodiments 256 wherein when the sequestration material comprises an anion exchange resin and a metal zeolite, the weight ratios of anion exchange resin to metal zeolite is about 50:50.

283 The heat transfer system as defined in Numbered Embodiments 256 wherein when the sequestration material comprises an anion exchange resin and a metal zeolite, the weight ratios of anion exchange resin to metal zeolite is about 75:25.

284. The heat transfer system as defined in any one of Numbered Embodiments 163, 166 and 171 to 283, wherein said system includes a sequestration in contact with at least a portion of a refrigerant as defined in any one of Numbered Embodiments 1 and 67 and/or at least a portion of a the lubricant as defined in any one of Numbered Embodiments 128 to 138, wherein the temperature of said sequestration material and/or the temperature of said refrigerant and/or the temperature of said lubricant when in said contact are at a temperature that is at least about 10 C.

285. The heat transfer system as defined in Numbered Embodiment 284 wherein the sequestration material preferably comprises a combination of:
an anion exchange resin,
activated alumina,
a zeolite molecular sieve comprising silver, and
a moisture-removing material, preferably a moisture-removing molecular sieve.

286. The heat transfer system as defined in any one of Numbered Embodiment 146 to 166 and 171 to 285, wherein said system is a residential air conditioning system.

287. The heat transfer system as defined in any one of Numbered Embodiments 146 to 166 and 171 to 285, wherein said system is an industrial air conditioning system.

288. The heat transfer system as defined in any one of Numbered Embodiments 146 to 166 and 171 to 285, wherein said system is a commercial air conditioning system.

289. A method of cooling comprising condensing a heat transfer composition as defined in any one of Numbered Embodiments 68 to 145 and subsequently evaporating said composition in the vicinity of an article or body to be cooled.

290. A method of cooling in a heat transfer system comprising an evaporator, a condenser and a compressor, the process comprising i) condensing a heat transfer composition as defined in any one of Numbered Embodiments 68 to 145; and ii) evaporating the composition in the vicinity of body or article to be cooled; wherein the evaporator temperature of the heat transfer system is in the range of from about −40° C. to about +10° C.

291. A method of heating comprising condensing the heat transfer composition as defined in any one of Numbered Embodiments 68 to 145 in the vicinity of an article or body to be heated and subsequently evaporating said composition.

292. A method of heating in a heat transfer system comprising an evaporator, a condenser and a compressor, the process comprising i) condensing a heat transfer composition as defined in any one of Numbered Embodiments 68 to 145, in the vicinity of a body or article to be heated and
ii) evaporating the composition;
wherein the evaporator temperature of the heat transfer system is in the range of about −30° C. to about 5° C.

293. The use of a heat transfer composition as defined in any one of Numbered Embodiments 68 to 145 for use in air conditioning.

294. The use of a heat transfer composition as defined in any one of Numbered Embodiments 68 to 145, in a residential air conditioning system.

295. The use of a heat transfer composition as defined in any one of Numbered Embodiments 68 to 145 in an industrial air conditioning system.

296. The use of a heat transfer composition as defined in any one of Numbered Embodiments 68 to 145, in a commercial air conditioning system.

297. The use of a heat transfer composition as defined in Numbered Embodiment 296, wherein the commercial air conditioning system is a roof top system.

298. The use of a heat transfer composition as defined in Numbered Embodiment 296, wherein the commercial air conditioning system is a variable refrigerant flow system.

299. The use of a heat transfer composition as defined in Numbered Embodiment 296, wherein the commercial air conditioning system is a chiller system.

300. The use of a heat transfer composition as defined in any one of Numbered Embodiments 68 to 145, in a chiller system.

301. The use as set out in Numbered Embodiment 300, wherein the chiller system has a compressor selected from a reciprocating, rotary (including rolling piston and rotary vane), scroll, screw, and centrifugal compressor.

302. The use as defined in Numbered Embodiment 293, in transport air conditioning.

303. The use as defined in Numbered Embodiment 293, in stationary air conditioning.

304. The use as defined in Numbered Embodiment 293, in a mobile heat pump.

305. The use as defined in Numbered Embodiment 293, in a positive displacement chiller.

306 The use as defined in Numbered Embodiment 293, in an air cooled or water cooled direct expansion chiller.

307. The use as defined in Numbered Embodiment 293, in a residential heat pump,

308. The use as defined in Numbered Embodiment 293, in a residential air to water heat pump/hydronic system, 309. The use as defined in Numbered Embodiment 293, in a commercial air source, water source or ground source heat pump system.

310. The use of a heat transfer composition as defined in any one of Numbered Embodiments 65 to 145 in a refrigeration system.
311. The use as defined in Numbered Embodiment 310, in a low temperature refrigeration system,
312. The use as defined in Numbered Embodiment 310, in a medium temperature refrigeration system,
313 The use as defined in Numbered Embodiment 310, in a commercial refrigerator,
314. The use as defined in Numbered Embodiment 310, in a commercial freezer,
315. The use as defined in Numbered Embodiment 310, in an ice machine
316. The use as defined in Numbered Embodiment 310, in a vending machine,
317. The use as defined in Numbered Embodiment 310, in a transport refrigeration system,
318. The use as defined in Numbered Embodiment 310, in a domestic freezer,
319. The use as defined in Numbered Embodiment 310, in a domestic refrigerator,
320. The use as defined in Numbered Embodiment 310, in an industrial freezer,
321. The use as defined in Numbered Embodiment 310, in an industrial refrigerator and
322. The use as defined in Numbered Embodiment 310, in a chiller.
323. The use of a heat transfer composition as defined in any one of Numbered Embodiments 68 to 145 in a residential air conditioning system with a reciprocating, rotary (rolling-piston or rotary vane) or scroll compressor.
324. The use of a heat transfer composition as defined in any one of Numbered Embodiments 68 to 145 in a split residential air conditioning system
325. The use of a heat transfer composition as defined in any one of Numbered Embodiments 68 to 145 in a ducted residential air conditioning system
326. The use of a heat transfer composition as defined in any one of Numbered Embodiments 68 to 145 in a window residential air conditioning system
327. The use of a heat transfer composition as defined in any one of Numbered Embodiments 68 to 145 in a portable residential air conditioning system
328. The use of a heat transfer composition as defined in any one of Numbered Embodiments 68 to 145 in a medium temperature refrigeration system which is a refrigeration system
329. The use of a heat transfer composition as defined in any one of Numbered Embodiments 68 to 145 in a medium temperature refrigeration system which is a bottle cooler.
330. The use of a heat transfer composition as defined in any one of Numbered Embodiments 68 to 145 in a low temperature refrigeration system, wherein said low temperature refrigeration system is a freezer or an ice cream machine.
331. The use of a refrigerant as defined in any one of Numbered Embodiments 68 to 145, for use as a replacement for R410A.
332. A method of retrofitting an existing heat transfer system designed to contain or containing R-410A refrigerant or which is suitable for use with R-410A refrigerant, said method comprising replacing at least a portion of the existing R-410A refrigerant with a heat transfer composition as defined in Numbered Embodiments 68 to 145 or a refrigerant as defined in Numbered Embodiments 1 to 67.
333. The method of Numbered Embodiment 332, wherein the use of the heat transfer composition as defined in Numbered Embodiments 68 to 145 or the refrigerant as defined in Numbered Embodiments 1 to 67 to replace R410A does not require modification of the condenser, the evaporator and/or the expansion valve in the heat transfer system.
334. The method of Numbered Embodiments 332 and 333 wherein the heat transfer composition as defined in Numbered Embodiments 68 to 145 or the refrigerant as defined in Numbered Embodiments 1 to 67 is provided as a replacement for R-410A in a chiller system.
335. The method of Numbered Embodiments 332 and 333 wherein the heat transfer composition as defined in Numbered Embodiments 68 to 145 or the refrigerant as defined in Numbered Embodiments 1 to 67 is provided as a replacement for R-410A in residential air conditioning system.
336. The method of Numbered Embodiments 332 and 333 wherein the heat transfer composition as defined in Numbered Embodiments 68 to 145 or the refrigerant as defined in Numbered Embodiments 1 to 67 is provided as a replacement for R-410A in industrial air conditioning system.
337. The method of Numbered Embodiments 332 and 333 wherein the heat transfer composition as defined in Numbered Embodiments 68 to 145 or the refrigerant as defined in Numbered Embodiments 1 to 67 is provided as a replacement for R-410A in commercial air conditioning system.
338. The method of Numbered Embodiment 337, wherein the commercial air conditioning system is a roof top system.
339. The method of Numbered Embodiment 337 wherein the commercial air conditioning system is a variable refrigerant flow system.
340. The method of Numbered Embodiment 337, wherein the commercial air conditioning system is a chiller system.
341. The method of Numbered Embodiments 332 to 340 comprising removing at least about 5%, by weight of the R-410A from the system and replacing it with the heat transfer compositions the heat transfer composition as defined in Numbered Embodiments 68 to 145 or the refrigerant as defined in Numbered Embodiments 1 to 67
342. The method of Numbered Embodiments 332 to 340 comprising removing at least about 10%, by weight of the R-410A from the system and replacing it with the heat transfer compositions the heat transfer composition as defined in Numbered Embodiments 68 to 145 or the refrigerant as defined in Numbered Embodiments 1 to 67
343. The method of Numbered Embodiments 332 to 340 comprising removing at least about 25%, by weight of the R-410A from the system and replacing it with the heat transfer compositions the heat transfer composition as defined in Numbered Embodiments 68 to 145 or the refrigerant as defined in Numbered Embodiments 1 to 67.
344. The method of Numbered Embodiments 332 to 340 comprising removing at least about 50%, by weight of the R-410A from the system and replacing it with the heat transfer compositions the heat transfer composition as defined in Numbered Embodiments 68 to 145 or the refrigerant as defined in Numbered Embodiments 1 to 67
345 The method of Numbered Embodiments 332 to 340 comprising removing at least about 75%, by weight of the R-410A from the system and replacing it with the heat transfer compositions the heat transfer composition as defined in Numbered Embodiments 68 to 145 or the refrigerant as defined in Numbered Embodiments 1 to 62
346. A refrigerant composition as defined in Numbered Embodiments 1 to 67, which exhibits
exhibit operating characteristics compared with R-410A wherein:
the efficiency (COP) of the composition is from 95 to 105% of the efficiency of R-410A; and/or the capacity is from 95 to 105% of the capacity of R-410A.
in heat transfer systems, in which the refrigerant composition is provided to replace the R-410A refrigerant.

347. A refrigerant composition as defined in Numbered Embodiments 1 to 67, which exhibit operating characteristics compared with R-410A wherein:
the efficiency (COP) of the composition is from 100 to 105% of the efficiency of R-410A; and/or
the capacity is from 98 to 105% of the capacity of R-410A.
in heat transfer systems, in which the refrigerant composition is provided to replace the R-410A refrigerant.

348. A refrigerant composition as defined in Numbered Embodiments 1 to 67, which exhibit operating characteristics compared with R-410A wherein:
the discharge temperature is not greater than 10° C. higher than that of R-410A; and/or
the compressor pressure ratio is from 95 to 105% of the compressor pressure ratio of R-410A
in heat transfer systems, in which the refrigerant composition is provided to replace the R-410A refrigerant.

349. A refrigerant composition as defined in Numbered Embodiments 1 to 67 having an evaporator glide of less than 2° C.

350. A refrigerant composition as defined in Numbered Embodiments 1 to 67 having an evaporator glide of less than 1.5° C.

351. The method of Numbered Embodiments 332 to 345 wherein the heat transfer compositions the heat transfer composition as defined in Numbered Embodiments 68 to 145 or the refrigerant as defined in Numbered Embodiments 1 to 67 are provided to replace R410A in an air conditioning system.

352. The method of Numbered Embodiment 351 wherein the air conditioning system is a mobile air conditioning system.

353. The method of Numbered Embodiment 351 wherein the air conditioning system is a stationary air conditioning system.

354. The method of Numbered Embodiment 351 wherein the air conditioning system is a commercial air conditioning system.

355. The method of Numbered Embodiment 351, in transport air conditioning.

356. The method of Numbered Embodiment 351, in stationary air conditioning.

357. The method of Numbered Embodiment 351, in a mobile heat pump.

358. The method of Numbered Embodiment 351, in a positive displacement chiller.

359. The method of Numbered Embodiment 351, in an air cooled or water cooled direct expansion chiller.

360. The method of Numbered Embodiment 351, in a residential air conditioning system, 361. The method of Numbered Embodiment 351, in a residential heat pump, 362. The method of Numbered Embodiment 351, in a residential air to water heat pump/hydronic system, 363. The method of Numbered Embodiment 351, in a commercial air source, water source or ground source heat pump system.

364. The method of Numbered Embodiments 332 to 345 in a refrigeration system.

365 The method of Numbered Embodiment 364, in a low temperature refrigeration system, 366. The method of Numbered Embodiment 364, in a medium temperature refrigeration system, 367. The method of Numbered Embodiment 364, in a commercial refrigerator, 368. The method of Numbered Embodiment 364, in a commercial freezer, 369. The method of Numbered Embodiment 364, in an ice machine 370. The method of Numbered Embodiment 364, in a vending machine, 371. The method of Numbered Embodiment 364, in a transport refrigeration system, 372. The method of Numbered Embodiment 364, in a domestic freezer, 373. The method of Numbered Embodiment 364, in a domestic refrigerator, 374. The method of Numbered Embodiment 364, in an industrial freezer, 375. The method of Numbered Embodiment 364, in an industrial refrigerator and 376. The method of Numbered Embodiment 364, in a chiller.

377. The method of Numbered Embodiment 364 in a ducted residential air conditioning system 378. The method of Numbered Embodiment 364 in a window residential air conditioning system 379. The method of Numbered Embodiment 364 in a portable residential air conditioning system 380. The method of Numbered Embodiment 364 in a medium temperature refrigeration system which is a refrigeration system 381. The method of Numbered Embodiment 364 in a medium temperature refrigeration system which is a bottle cooler.

382. A heat transfer system comprising a compressor, a condenser and an evaporator in fluid communication, and a heat transfer composition in said system, said heat transfer composition comprising a refrigerant according to any one of the refrigerants as defined in numbered embodiments 1 to 67.

383. The heat transfer system of Numbered Embodiments 382, which is a residential air conditioning system.

384. The heat transfer system of Numbered Embodiments 382, which is a commercial air conditioning system.

385. The heat transfer system of Numbered Embodiments 384, wherein the commercial air conditioning system is a roof top system.

386. The heat transfer system of Numbered Embodiments 384, wherein the commercial air conditioning system is a variable refrigerant flow system.

387. The heat transfer system of Numbered Embodiments 384, wherein the commercial air conditioning system is a chiller system.

Although the invention has been described with reference to preferred embodiments, it will be understood by those skilled in the art that various changes may be made and equivalents substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims added later.

The invention claimed is:

1. A refrigerant consisting of:
   about 49% by weight difluoromethane (HFC-32),
   about 11.5% by weight pentafluoroethane (HFC-125), and
   about 39.5% by weight trifluoroiodomethane (CF3I)
   wherein the percentages are based on the total weight of said three compounds.

2. The refrigerant of claim 1 wherein said refrigerant is non-flammable.

3. A heat transfer composition comprising the refrigerant of claim 2.

4. A heat transfer composition comprising the refrigerant of claim 2 and POE lubricant.

5. The refrigerant of claim 1 wherein said combination consists of:
   49%+/−0.3% by weight of difluoromethane (HFC-32),
   11.5%+/−0.3% by weight pentafluoroethane (HFC-125), and
   39.5%+/−0.3% by weight trifluoroiodomethane (CF3I).

6. The refrigerant of claim 5 wherein said refrigerant is non-flammable.

7. A heat transfer composition comprising the refrigerant of claim 5.

8. A heat transfer composition comprising the refrigerant of claim 5 and POE lubricant.

9. A method of cooling in a heat transfer system comprising an evaporator, a condenser and a compressor, the process comprising:
   i) condensing a refrigerant consisting of:
      about 49% by weight difluoromethane (HFC-32), about 11.5% by weight pentafluoroethane (HFC-125), and about 39.5% by weight trifluoroiodomethane (CF3I), wherein the percentages are based on the total weight of said three compounds;
   ii) evaporating said refrigerant in the vicinity of body or article to be cooled, wherein the evaporating temperature of said refrigerant is in the range of from about 40° C. to about 10° C.

10. The method of claim 9 wherein the evaporating temperature of said refrigerant is in the range of from about −20° C. to about 3° C.

11. The method of claim 9 wherein the evaporating temperature of said refrigerant is in the range of from about 0° C. to about 10° C.

12. The method of claim 9 wherein the evaporating temperature of said refrigerant is in the range of from about −12° C. to about 0° C.

13. The method of claim 9 wherein the evaporating temperature of said refrigerant is in the range of from about −40° C. to about −12° C.

14. A heat transfer system comprising an evaporator, a condenser and a compressor and a refrigerant in the system, said refrigerant consisting of:
   about 49% by weight difluoromethane (HFC-32), about 11.5% by weight pentafluoroethane (HFC-125), and
   about 39.5% by weight trifluoroiodomethane (CF3I), wherein the percentages are based on the total weight of said three compounds.

15. The refrigerant of claim 14 wherein said refrigerant is non-flammable.

16. A heat transfer composition comprising the refrigerant of claim 15 and POE lubricant.

* * * * *